United States Patent
Garel et al.

(10) Patent No.: US 11,711,567 B2
(45) Date of Patent: Jul. 25, 2023

(54) COMPUTER BASED SYSTEM FOR CONFIGURING, MANUFACTURING, TESTING, DIAGNOSING, AND RESETTING TARGET UNIT EQUIPMENT AND METHODS OF USE THEREOF

(71) Applicant: JC Software, LLC, Austin, TX (US)

(72) Inventors: Jason Garel, Austin, TX (US); Thomas Reid, West Yorkshire (GB); Colin Myers, Leeds (GB); Khalid Elibiary, Austin, TX (US)

( * ) Notice: Subject to any disclaimer, the term of this patent is extended or adjusted under 35 U.S.C. 154(b) by 0 days.

(21) Appl. No.: 17/845,927

(22) Filed: Jun. 21, 2022

(65) Prior Publication Data
US 2023/0028513 A1 Jan. 26, 2023

Related U.S. Application Data

(60) Provisional application No. 63/213,162, filed on Jun. 21, 2021.

(51) Int. Cl.
*H04N 21/418* (2011.01)
*G06F 9/455* (2018.01)

(52) U.S. Cl.
CPC ..... *H04N 21/4183* (2013.01); *G06F 9/45504* (2013.01); *G06F 9/45537* (2013.01); *H04N 21/4184* (2013.01)

(58) Field of Classification Search
CPC ............ H04N 21/4183; H04N 21/4184; G06F 9/45504; G06F 9/45537; G06F 11/0778; G06F 11/3055; G06F 11/3089; G06F 3/0482; G06F 9/4406; G06F 3/0481; G06F 3/0488; G06F 3/04886; G06F 11/1417
See application file for complete search history.

(56) References Cited

U.S. PATENT DOCUMENTS

| | | | |
|---|---|---|---|
| 2009/0323801 A1* | 12/2009 | Imajou | H04N 19/105 382/232 |
| 2018/0270249 A1* | 9/2018 | Joshi | H04L 63/105 |

* cited by examiner

*Primary Examiner* — Eric C Wai
(74) *Attorney, Agent, or Firm* — Greenberg Traurig, LLP; Dwayne L. Mason; Jordan A. Lewis

(57) ABSTRACT

In some embodiments, the present disclosure provides an exemplary method that may include the steps of providing a computing device associated with a plurality of user; receiving output data transmitted from a target unit; analyzing the output data; transmitting a plurality of interaction commands; transmitting the plurality of interaction commands to an application or operating system; determining a plurality of identifying key words; dynamically determining a configuration screen image based on an identification of the plurality of identifying key words associated with the plurality of graphical user interface displays; automatically selecting a configuration setting associated with the plurality of interactive image elements based on the configurations screen image; and executing a plurality of ameliorative actions associated with the configuration setting.

20 Claims, 37 Drawing Sheets

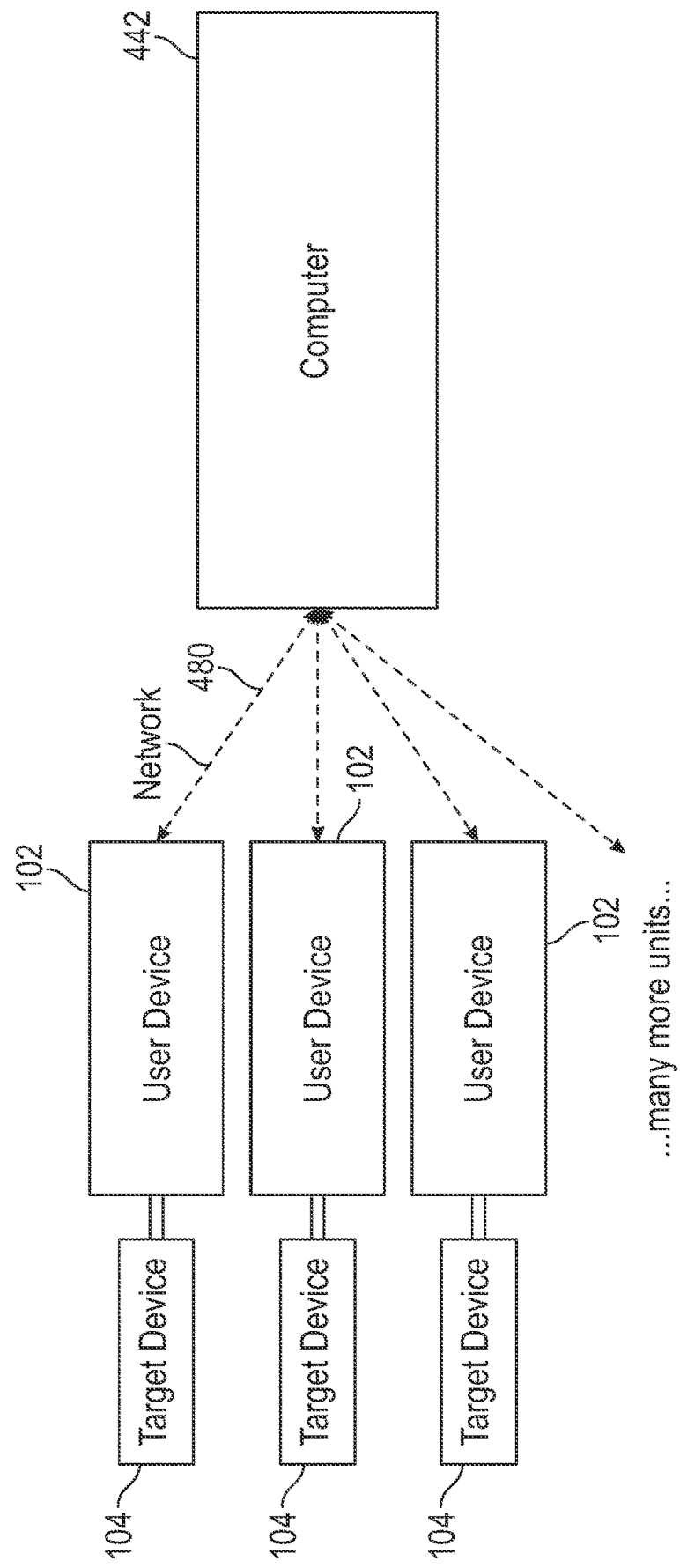

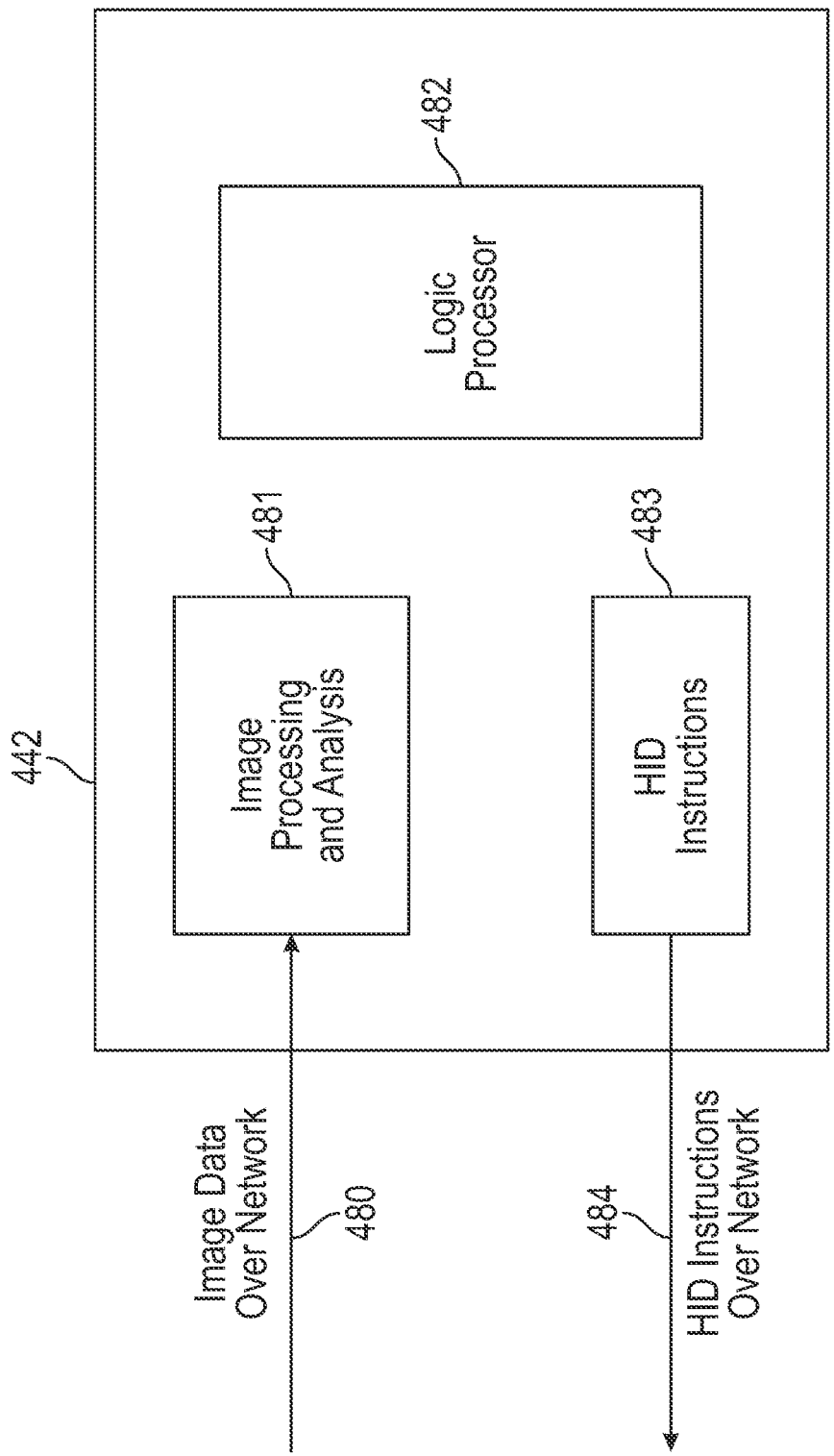

System Console info

Name
XBOXONE

Reset console

☐ Allow optional data collection

Allowing optional data collection shares data from times when no one is signed in.

Serial number
19887723XXXX
Console ID
75980XXX.0b637XXX.5fb3XXXa.f1e36b01.01
OS version
10.0.19041.XXX (xb_flt_2106vb.210608-XXXX)
Shell version
2106.0.2105.XXXXX
Xbox network device ID
FD0099F1F93ACXXX
Global device ID
68961319862 1XXX

⊗
XBOX

```
Lenovo Vantage
L | ThinkPad X1 Yoga 3rd ⓘ
< BACK
Hardware Scan

┌─────────────────────────────────────────────────────┐
│ Result: Pass                                        │
│ Final Result Code: W3Z6MSHBN6SW-CF4BBQ ⓘ            │
│ ( SCAN AGAIN )                                      │
└─────────────────────────────────────────────────────┘

Hardware Components                        Export Log ☐

┼┼┼ Audio Controller  Audio Controller  ›View Details    Pass ⊘
     ┌─────────────────────────────────────────────┐
     │ ⊘ CORB Status Test                        ⓘ │
     │ ⊘ Output Stream Test                      ⓘ │
     │ ⊘ Input Stream Test                       ⓘ │
     └─────────────────────────────────────────────┘
     Result Code: WAC00007000000-WH7PVE ⓘ

⊙ Processor  Intel(R) Core(TM) i7-8650U CPU @ 1.90GHz  ›View Details  Pass ⊘
     ┌─────────────────────────────────────────────┐
     │ ⊘ BT Instruction Test                     ⓘ │
     │ ⊘ x87 Floating Point Test                 ⓘ │
     │ ⊘ MMX Test                                ⓘ │
     │ ⊘ SSE Test                                ⓘ │
     │ ⊘ AES Test                                ⓘ │
     └─────────────────────────────────────────────┘
     Result Code: WCP003E00000-WH7VPE ⓘ

▭ Memory  Physical Memory  ›View Details            Pass ⊘
     ┌─────────────────────────────────────────────┐
     │ ⊘ Quick Random Pattern Test               ⓘ │
     └─────────────────────────────────────────────┘
     Result Code: WME0080000000-WH7VPE ⓘ

▭ Motherboard  Motherboard  ›View Details           Pass ⊘
     ┌─────────────────────────────────────────────┐
     │ ⊘ Chipset Test                            ⓘ │
     │ ⊘ PCI/PCI Test                            ⓘ │
     │ ⓘ RTC Test                                ⓘ │
     │ ⊘ USB Test                                ⓘ │
     └─────────────────────────────────────────────┘
     Result Code: WM80000F00000-WH7VPE ⓘ
```

FIG. 6D

```
tester@testers-MacBook-Pro ~ % system_profiler SPPowerDataType | grep -A3 -B7 *Condition*
Charge Information:
    Charge Remaining (mAh): 4472
    Fully Charged: Yes
    Charging: No
    Full Charge Capacity (mAh): 4516
Health Information:
    Cycle Count: 146
    Condition: Normal
Battery Installed: Yes
Amperage (mA): 0
Voltage (mV): 12631
tester@testers-MacBook-Pro ~ % |
```

New device...

- Model Identifier: MacBookPro16,2
- Serial Number:
- Diagnostics Ref Code / Description
- Processor Type / Speed: Quad-Core Intel Core i5  2 GHz
- Memory Size: 16 GB
- Hard Drive Size: 499.96 GB
- Video Card (Primary/Secondary): Intel Iris Plus Graphics
- Battery Full Charge Capacity (mAh)
- Battery Charge Cycle Count / Condition

| | Fail | STOP | Pass | |
|---|---|---|---|---|
| 1 | System Diagnostics | | NOT STARTED | ▶ |
| 2 | Boot Security Check/Erase Drive | | NOT STARTED | ▶ |
| 3 | Install MacOS (Full) | | NOT STARTED | ▶ |
| 4 | Collect System Info | | RUNNING | ▶ |
| 5 | Run Diagnostics | | NOT STARTED | ▶ |
| 6 | Remove Boot Security | | NOT STARTED | ▶ |
| 7 | Install MacOS (No User) | | NOT STARTED | ▶ |

FIG. 6H ziperase  Tasks  Settings  Advanced  Report
Console Link

New device....

- Model Identifier: MacBookPro16,2
- Serial Number
- Diagnostics Ref Code / Description
- Processor Type / Speed: Quad-Core Intel Core i5    2 GHz
- Memory Size: 16 GB
- Hard Drive Size: 499.96 GB
- Video Card (Primary/Secondary): Intel Iris Plus Graphics
- Battery Full Charge Capacity (mAh): 4516
- Battery Charge Cycle Count / Condition: 146 / Normal

730

| Fail | STOP | Pass |
|---|---|---|
| 1 | System Diagnostics | NOT STARTED |
| 2 | Boot Security Check/Erase Drive | NOT STARTED |
| 3 | Install MacOS (Full) | NOT STARTED |
| 4 | Collect System Info | ↻ RUNNING |
| 5 | Run Diagnostics | NOT STARTED |
| 6 | Remove Boot Security | NOT STARTED |
| 7 | Install MacOS (No User) | NOT STARTED |

```
tester@testers-MacBook-Pro ~ % system_profiler SPPowerDataType | grep -A3 -B7 *Condition*
Charge Information:
    Charge Remaining (mAh): 4472
    Fully Charged: Yes
    Charging: No
    Full Charge Capacity (mAh): 4516
Health Information:
    Cycle Count: 146
    Condition: Normal
Battery Installed: Yes
Amperage (mA): 0
Voltage (mV): 12631
tester@testers-MacBook-Pro ~ %
```

FIG. 7C

- Model Identifier
- Serial Number
- Diagnostics Ref Code / Description
- Processor Type / Speed
- Memory Size
- Hard Drive Size
- Video Card (Primary/Secondary)
- Battery Full Charge Capacity (mAh)
- Battery Charge Cycle Count / Condition New device...

C02D0UMLZH
ADP000

No issues found.

Fail — STOP — Pass

| | | |
|---|---|---|
| 1 | System Diagnostics | DONE |
| 2 | Boot Security Check/Erase Drive | DONE |
| 3 | Install MacOS (Full) | RUNNING |
| 4 | Collect System Info | NOT STARTED |
| 5 | Run Diagnostics | NOT STARTED |
| 6 | Remove Boot Security | NOT STARTED |
| 7 | Install MacOS (No User) | NOT STARTED |

860

870 — Terms and Conditions

Terms and Conditions

Important: Use of your Mac computer, the macOS software and related services is subject to these Terms and Conditions. Please read carefully.

A. macOS Software License Agreement
English

APPLE INC.
SOFTWARE LICENSE AGREEMENT for macOS Catalina
For use of Apple-branded Systems.

Please read this software agreement ("license") carefully before using the apple software. by using the apple software you are agreeing to be bound by the terms of this license. If you do not agree to the terms of the license do not install and or use the apple software and if presented with the option to "agree" or "disagree" to the terms License, Warranty and other important product information are saved on your system, and can be found in About This Mac. The License is also posted at www.apple.com/legal/sla ↓        ↑
Back   Continue

FIG. 7G

COMPUTER BASED SYSTEM FOR CONFIGURING, MANUFACTURING, TESTING, DIAGNOSING, AND RESETTING TARGET UNIT EQUIPMENT AND METHODS OF USE THEREOF

CROSS-REFERENCE TO RELATED APPLICATIONS

None.

TECHNICAL FIELD

The present disclosure is generally directed to computer-based systems for configuring, manufacturing, testing, diagnosing, and resetting target unit equipment and methods of use thereof.

BACKGROUND

In many environments wherein people use, sell and rely upon computer devices, the computer devices may become ineffective over time due to continuous use, one or more programs and utilities running on the device that requires significant computer resources and continuous software updates to perform their intended functions, memory device degradation, outdated or incompatible software, and/or one or more hardware or system failures. Any one of the aforementioned issues can be a significant problem to users and customers that rely upon older and poorly maintained computer devices to function forth their intended purposes.

For example, computer devices such as smartphones, smart televisions, gaming consoles, personal computers (e.g., desktop computers, laptop computers, tablets, fablets, phablets, and handheld devices) all need to be properly maintained such that these computer devices may be relied upon to perform their intended functionality. As these computer devices age, it becomes more difficult to install new programs and operating system updates. Additionally, it takes longer to open existing programs stored on the computer device or downloaded from a remote source, and there may be limited storage space on the computer device and/or defective storage space on the computer device that renders the computer device ineffective for one or more of its intended purposes. For many users and customers, the question becomes, should the computer device be upgraded or replaced. Replacing a computer device is an expensive option that is not available to many user and customers. On the other hand, maintaining and upgrading computer device to bring more speed, reliability and storage space to a computer device can also be a time consuming and costly venture, for example, when resources that are utilized in the day-to-day operations of an entity have to be diverted to maintenance efforts. In some instances, the diversion of these resources causes bottlenecks and delays in other operational areas making the maintenance efforts costly and unprofitable.

For example, conventional maintenance efforts utilized to maintain, reconfigure and/or update one or more computer devices require a user to manually enter commands, via a computer input device (e.g., keyboard, mouse, pointer, etc.), and manually verify that the computer device was reconfigured or updated in the manner intended. These problems persist even in a network environment wherein a remote technician is interacting with a computer device included in a customer's computer network. For example, in instances wherein a remote technician is required to interact with a computer device disposed on a customer's computer network, the computer technician utilizes a keyboard connected to a remote computer connected to a remote network to enter commands into the remote computer and transmit the same over a network to ultimately interact with the computer device to perform one or more functions.

Therefore, a problem arises when conventional sanitizing, updating, manufacturing, diagnosing, resetting, reconfiguring and/or refurbishing efforts concerning computer devices require an operator to click through several menus to put the device in the proper configuration. Additionally, the problem is exacerbated when an operator has to use a computer input device, for each device to be manipulated, to login to a computer device manufacturer's App store to download software updates and/or retrieve information displayed on a screen by the computer device, such as a system serial number, software version number and other important information regarding the device for traceability purposes, conventional activities that are prone to error, and unforeseen and/or unintended process variations that ultimately could cause the computer device to be unsatisfactory and/or inoperable for its intended purpose. Furthermore, conventional processes for sanitizing, updating, manufacturing, diagnosing, resetting, reconfiguring and/or refurbishing a computer device to render the same satisfactory for sale, resale of customer returns or a return to service within its intended environment could take as long as 30 minutes for a single computer device. For example, a device intended for resale could have information, such as personal information, stored on the device that needs to be removed before the device is operable for its intended purpose. This is, a process that is also susceptible to errors and process variation, and/or additional problems if not performed properly.

SUMMARY

In some embodiments, the present disclosure provides an exemplary technically improved computer-based system that includes at least the following components of: a computing device associated with a plurality of users including, a plurality of processors, a video input interface device configured to receive output data transmitted from a target unit, a human interface device configured to emulate a plurality of computer input devices and transmit a plurality of interaction commands provided by the plurality of processors to the target unit, and a data storage device, and the target unit including, a video output interface device, an I/O interface device configured to receive emulated computer input device commands from the computing device to supplement a unit device with additional functionality, where the computing device is configured to control the target unit to reconfigure a plurality of settings associated with the target unit based on the plurality of interaction commands transmitted from the human interface device.

In some embodiments, the present disclosure provides an exemplary technically improved computer-based method that includes at least the following steps: providing, by at least one processor, a computing device associated with a plurality of user, where the computing devices comprises a video input interface, a human interface device, a data storage device, and one or more processors; receiving, using the video input interface, output data transmitted from a target unit; analyzing, by the at least one processor, the output data to confirm a communicable connection between the computing device associated with the plurality of users and the target unit; transmitting, by the at least one processor, a plurality of interaction commands configured to emulate a plurality of computer input devices, and control the target unit to provide a plurality of graphical user interface displays; transmitting, by the at least one processor, the plurality of interaction commands to an application or operating system to obtain desired a configuration state, desired target unit information, and desired effect; determining, by the at least one processor, a plurality of identifying key words associated with the plurality of graphical user interface displays provided by the target unit based on a comparison between a set of known key words and a plurality of image elements associated with the plurality of interaction commands; dynamically determining, by the at least one processor, a configuration screen image based on an identification of the plurality of identifying key words associated with the plurality of graphical user interface displays, wherein the configuration screen image comprises a plurality of interactive image elements that operate to reconfigure the target unit; automatically selecting, by the at least one processor, a configuration setting associated with the plurality of interactive image elements based on the configurations screen image; and executing, by the at least one processor, a plurality of ameliorative actions associated with the configuration setting.

BRIEF DESCRIPTION OF THE DRAWINGS

Various embodiments of the present disclosure may be further explained with reference to the attached drawings, wherein like structures are referred to by like numerals throughout the several views. The drawings shown are not necessarily to scale, with emphasis instead generally being placed upon illustrating the principles of the present disclosure. Therefore, specific structural and functional details disclosed herein are not to be interpreted as limiting, but merely as a representative basis for teaching one skilled in the art to variously employ one or more illustrative embodiments.

A better understanding of one or more embodiments of the present invention may be obtained when the following detailed description of the preferred embodiment is considered in conjunction with the following drawings, in which

FIG. 4A-FIG. 4E depict block diagrams representing exemplary target unit(s) and exemplary system(s) utilized in accordance with one or more embodiments of the present disclosure;

FIG. 6A-FIG. 6H depict an exemplary flowchart and exemplary image screens provided by one or more target units during the execution of a plurality of operation steps associated with the target unit according to one or more embodiments of the present disclosure.

FIG. 7A-FIG. 7G depict an exemplary flowchart and exemplary outputs of the one or more target units during the execution of a plurality of operation steps associated with the target unit according to one or more embodiments of the present disclosure. detailed description of embodiments of the invention.

DETAILED DESCRIPTION

Figure 1:
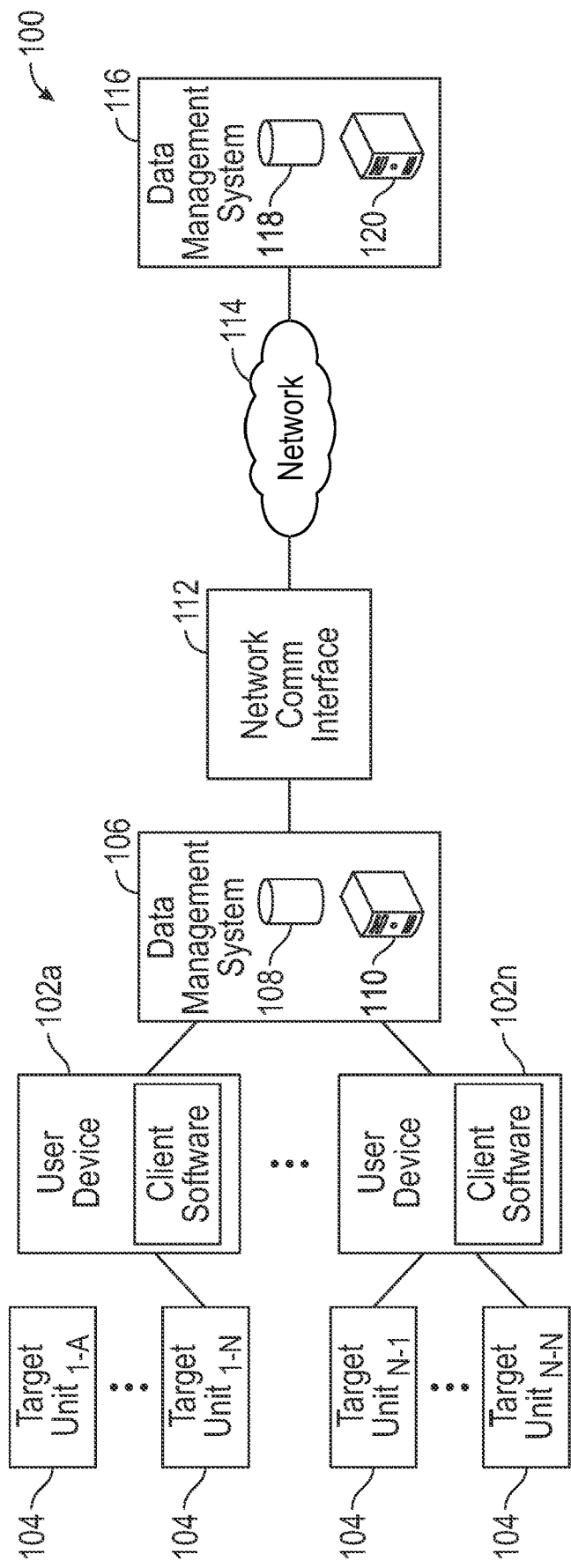
FIG. 1 illustrates an exemplary computer-based system architecture for implementing one or more methods according to embodiments of the present disclosure.

Various detailed embodiments of the present disclosure, taken in conjunction with the accompanying figures, are disclosed herein; however, it is to be understood that the disclosed embodiments are merely illustrative. In addition, each of the examples given in connection with the various embodiments of the present disclosure is intended to be illustrative, and not restrictive.

Throughout the specification, the following terms take the meanings explicitly associated herein, unless the context clearly dictates otherwise. The phrases "in one embodiment," "in one or more embodiments" and "in some embodiments" as used herein do not necessarily refer to the same embodiment(s), though it may. Furthermore, the phrases "in another embodiment," "in one or more other embodiments" and "in some other embodiments" as used herein do not necessarily refer to a different embodiment, although it may. Thus, as described below, various embodiments may be readily combined without departing from the scope or spirit of the present disclosure.

As used herein, the term "user" shall have a meaning of at least one user. In one or more embodiments, the terms "user", "subscriber" "consumer" or "customer" should be understood to refer to a user of an application or applications as described herein and/or a consumer of data supplied by a data provider. By way of example, and not limitation, the terms "user" or "subscriber" may refer to a person who receives data provided by the data or service provider over the Internet in a browser session, or may refer to an automated software application which receives the data and stores or processes the data.

In addition, the term "based on" is not exclusive and allows for being based on additional factors not described, unless the context clearly dictates otherwise. In addition, throughout the specification, the meaning of "a," "an," and "the" include plural references. The meaning of "in" includes "in" and "on."

As used in this application, the terms "component" and "system" are intended to refer to a computer-based entity, either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution, and a component can be localized on one computer and/or distributed between two or more computers.

A computer program (also known as a program, software, software program, software application, script, computer code or code) may be written in any form of programming language, including compiled or interpreted languages, declarative or procedural languages, and it may be deployed in any form, including as a stand-alone program or as a module, component, subroutine, object, or another unit suitable for use in a computing environment. A computer program may, but need not, correspond to a file in a file system. A program may be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program may be deployed to be executed on one computer or on multiple computers that are located at one site or distributed across multiple sites and interconnected by a communication network.

As used herein, the terms "computer engine" and "engine" identify at least one software component and/or a combination of at least one software component and at least one hardware component which are designed/programmed/configured to manage/control other software and/or hardware components (such as the libraries, software development kits (SDKs), objects, etc.). The term "engine" denotes a functional operation that may be embodied either as a stand-alone component or as an integrated configuration of a plurality of subordinate components. Thus, an engine may be implemented as, for example, a single module or as a plurality of modules that operate in cooperation with one another. Moreover, an engine may be implemented as software instructions in memory or separately in any of hardware (e.g., electronic circuitry), firmware, software, or a combination thereof. In one embodiment an engine contains instructions for controlling a processor to execute the functionality described herein.

A data interface (e.g., interface device) may include mechanical, electrical and/or signaling circuitry for communicating data, for example over a network or directly to another device. An interface may be configured to transmit and/or receive data using a variety of different communication protocols and various network connections, e.g., wireless and wired/physical connections. An interface may include circuitry that enables an input device, such as a keyboard, a touch screen or a speech recognition subsystem, to communicate information and command selections to a processor via user interaction with the input device. An interface may also include circuitry that allows an output device, such as a display screen, a speaker, a printer, etc., to receive information and command selections from a processor.

A memory device in one example comprises a computer-readable signal-bearing medium. One example of a computer-readable signal-bearing medium comprises a recordable data storage medium, such as a magnetic, electrical, optical, biological, and/or atomic data storage medium. In another example, a computer-readable signal-bearing medium comprises a modulated carrier signal transmitted over a network coupled. In one example, a memory device includes a series of computer instructions written in or implemented with any of a number of programming languages, as will be appreciated by those skilled in the art.

As used herein, terms "cloud," "Internet cloud," "cloud computing," "cloud architecture," and similar terms correspond to at least one of the following: (1) a large number of computers connected through a real-time communication network (e.g., Internet); (2) providing the ability to run a program or application on many connected computers (e.g., physical machines, virtual machines (VMs)) at the same time; (3) network-based services, which appear to be provided by real server hardware, and are in fact served up by virtual hardware (e.g., virtual servers), simulated by software running on one or more real machines (e.g., allowing to be moved around and scaled up (or down) on the fly without affecting the end user).

In one or more embodiments, the computing system may include clients and servers. A client and server are generally remote from each other and typically interact through a communication network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) may be received from the client device at the server. As used herein, the term "server" should be understood to refer to a service point which provides processing, database, and communication facilities. By way of example, and not limitation, the term "server" may refer to a single, physical processor with associated communications and data storage and database facilities, or it may refer to a networked or clustered complex of processors and associated network and storage devices, as well as operating software and one or more database systems and application software that support the services provided by the server. Cloud servers are examples.

For example, exemplary software specifically programmed in accordance with one or more principles of the present disclosure may be downloadable from a network, for example, a website, as a stand-alone product or as an add-in package for installation in an existing software application. For example, exemplary software specifically programmed in accordance with one or more principles of the present disclosure may also be available as a client-server software application (e.g., via one or more user devices and DMS systems, as disclosed herein), or as a web-enabled software application. For example, exemplary software specifically programmed in accordance with one or more principles of the present disclosure may also be embodied as a software package installed on a hardware device, such as, for example, one or more user devices and DMS systems, as disclosed herein.

In one or more embodiments, exemplary inventive computer-based systems/platforms, exemplary inventive computer-based devices, and/or exemplary inventive computer-based components of the present disclosure may be configured to handle numerous concurrent users that may be, but is not limited to, at least 100 (e.g., but not limited to, 100-999), at least 1,000 (e.g., but not limited to, 1,000-9,999), at least 10,000 (e.g., but not limited to, 10,000-99,999), at least 100,000 (e.g., but not limited to, 100,000-999,999), at least 1,000,000 (e.g., but not limited to, 1,000,000-9,999,999), at least 10,000,000 (e.g., but not limited to, 10,000,000-99,999,999), at least 100,000,000 (e.g., but not limited to, 100,000,000-999,999,999), at least 1,000,000,000 (e.g., but not limited to, 1,000,000,000-10,000,000,000).

The aforementioned examples are, of course, illustrative and not restrictive.

FIG. 1-FIG. 7G illustrate a system, apparatus and method for interfacing with one or more target units to perform one or more functions including, but not limited to, configuring one or more settings of the target units, initializing the target units, aiding in the manufacture of the target units, sanitizing of the target units, erasing all data stored on the target units, erasing all user data stored on the target units, testing one or more target units, diagnosing the health and/or state of one or more hardware components (e.g., memory components, dvd and/or blu-ray player components) included in the one or more target units, resetting one or more software and/or hardware settings included in the one or more target units and/or performing a factory reset to reset one or more software and/or hardware settings included in the target units to a predetermined state. The systems, apparatuses and methods illustrated by FIG. 1-FIG. 7G refer to examples of different embodiments that include various components and steps, which can be considered alternatives or which can be used in conjunction with one another in the various embodiments. The description of the illustrated systems, apparatuses and methods shown in FIG. 1-FIG. 7G is provided for purposes of illustration and should not be considered to limit the scope of the different embodiments disclosed herein.

One embodiment of the present invention will be described with reference to FIG. 1 that shows one example of the type of network environment within which the target unit interaction system may reside and be utilized to perform one or more functions including, but not limited to, configure one or more settings of one or more target units, initialize the target units, sanitize of the target units, erase all data or erase certain user data stored on one or more target units, aid in the manufacture of the target units, test one or more target units, diagnose the health and/or state of one or more hardware components included in the one or more target units, and/or reset one or more software and/or hardware settings included in the one or more target units to another setting (e.g., factory reset). In some embodiments, the exemplary system architecture 100 includes one or more user devices 102a-102n, one or more target units 104 (e.g., target units 1-a through 1-n, target units n-1 through n-n) communicatively connected to respective user devices 102a-102n. In some embodiments, the exemplary system architecture 100 further includes one or more data management systems 106 communicatively connected to the one or more user devices 102 and configured to store, retrieve and/or manage data sent and/or received by one or more user devices 102 during interactivity between the one more user devices 102 and respective one or more target units 104. In some embodiments, the exemplary system architecture 100 includes one or more data management systems 116 that may be communicatively connected to the one or more data management systems 106 and/or the one or more user devices 102 via network 114.

User device 102 is one example of a device that interfaces with one or more target unit to control, configure, manufacture, test, diagnose, and/or reset the one or more target units by transmitting human interface device (HID) commands to the one or more target units without human operator interaction. In some embodiments, user device 102 is configured to bypass and/or minimize human operator interaction with one or more target units when controlling, configuring, manufacturing, testing, diagnosing, and/or resetting the one or more target units. For example, the one or more user devices 102a-102n may include any number of exemplary computer devices. For example, in some embodiments, one or more user devices 102a-102n may include microcontrollers, microprocessors, workstations, PCs, laptops, one or more servers, a desktop computer, a kiosk, any appropriate combination thereof, or any other suitable device that may be configured to perform the functions of one or more user device 102a-102n disclosed herein. In one embodiment, the user device(s) 102 may utilize a website to communicatively couple to one or more data management systems (DMS) 106, and/or a DMS 116 disposed at a remote user's site. In some embodiments, the user device 102 may refer to a computing device.

For example, one or more user devices 102a-102n may include a microcontrollers, workstation and/or a personal computer (PC), as is known in the art, and can execute the associated Mac or Windows programs and/or utilize the respective operating systems (e.g., Windows®, MacOs, Linux, UNIX, Android, or any operating system (OS) that is compatible with a computing device). The workstations can interact with a network such as a LAN, WAN, or other network that connects computers and servers over communication lines such as, for example, TCP/IP, Ethernet, coax, double-coax, etc.). Other computer and electronic communication devices used alone or in combination, such as tablets, smart phones, fablets, laptops, or any display device that allows a user to enter and/or display input data, display results and/or interact with one or more embodiments of the target unit interaction system described herein, can be utilized as the user device as disclosed with some embodiments.

In some embodiments, one or more user devices 102 is a processing device, such as a personal computer, microcontroller or equivalent, that may be configured to simulate human interaction with one or more target units 104 by, using hardware and/or software, electronically mimicking an operator using a human interface device 218 (keyboard, mouse, game controller, other devices) utilizing a data port 219 (e.g., USB-C port). For example, in one or more embodiments, one or more user devices 102 is a processing device based upon a Raspberry Pi, or an Arduino, or other computing platform). For example, in some embodiments, one or more user devices 102 may be a Raspberry Pi RP2040. For example, in some embodiments, one or more user devices 102 may be an Arduino Nano RP2040 Connect. In one or more embodiments, one or more user devices 102 is a processing device that may be powered from a USB port (e.g., USB port 219) and does not require an external power supply.

In some embodiments, one or more target units 104 may include but are not limited to computer devices (e.g., desktops, laptops, network terminals, server devices, gateways, media players, tablets, fablets, phablets, cameras, kiosks, sensors, etc.), smartphones, smart televisions, feature phones, gaming consoles, and/or other digital devices that may require configuring, manufacturing, testing, diagnosing, sanitizing and/or resetting, installing or reinstalling software or one or more operating systems during the life cycle of the device.

As discussed herein, each data management system (DMS) 106 and/or 116 stores target unit interaction data that can be collected from one or more of the target units 104 in response to software commands executed by the respective one or more user devices 102a-102n. In one or more embodiments, the one or more user devices 102 communicates the target unit interaction data to one or more data managements systems (DMS) 106, 116. In some embodiments, the DMS 106 can be provided as an application server 110 or a virtual server that runs server software components, and can include data storage 108 including, for example, a database and/or flat files. In some embodiments, the DMS 116 can be provided as an application server 118 or a virtual server that runs server software components, and can include data storage 120 including, for example, a database and/or flat files. In some embodiments, communication between the DMS 106 and the one or more user devices 102 can be achieved via a direct connection, or remotely through a network (not shown) that can include, for example, a LAN, a WAN, a WLAN, and/or the Internet. In some embodiments, communication between one or more user devices 102 and/or one or more DMS systems 106 and the one or more DMS systems 116 can be achieved remotely through network 114 that can include, for example, a LAN, a WAN, a WLAN, and/or the Internet.

In some embodiments, the DMS systems 106,116 may be, for example, a database server, a virtual server, or any suitable computer or collection of computers that is accessible over a network, runs server software components and executes software capable of managing, distributing, and validating shared electronic files. In some embodiments, the electronic files may also include user credentials. For example, in some embodiments, the one or more DMS systems 106,116 can manage and store user accounts, authorization credentials, and shared files. In some embodiments, one or more DMS systems 106,116 may execute software instructions that include one or more security protocols to verify a user's credentials. For example, in some embodiments, one or more DMS systems 106,116 may also provide authorization credentials to the user devices 102 or other computer systems communicatively coupled to for validation. The DMS 118 can include data storage including, for example, a relational database, a non-relational database, and/or flat files for storing data associated with the fuel uplift service. In some embodiments, the type of relational databases that can be utilized for one or more of the DMS systems 106,116 may include an Oracle Database, a MS SQL server database, a MySQL database, and/or a DB2 database. In some embodiments, the types of nonrelational databases that can be utilized for one or more of the DMS systems 106,116 may include a Hadoop, a MongoDB, a DB40, or an Active Directory. For example, credentials, user accounts and electronic files can be stored in a database 108,118 that can be accessed by the server 110,120 respectively.

One having ordinary skill with the benefit of this specification will appreciate that although the DMS systems 106,116 are pictured as two separate entities (e.g., database 108,118 and server 110,120), one or more DMS systems 106,116 can be configured to be one machine such as a database server. As utilized herein, the terms "database server" and "DMS" include systems wherein the server and the data storage are separate components, and systems wherein the server, or a virtual server, that runs server software components, includes data storage including, for example, the database and/or flat file components described herein. In some embodiments, one or more DMS systems 106,116 may access additional databases and server systems (not shown) to retrieve, store, manipulate and manage data to be transmitted over a network to one or more users of the target unit interaction system. In one or more embodiments, one or more DMS systems 106,116 may access stored credentials and/or user accounts for one or more users via web services.

The target unit interaction system may include target unit interaction software and/or platform(s) that can utilize the network environment described herein with reference to FIG. 1, and various embodiments of the same. As one skilled in the art will appreciate, the target unit interaction software that is included in the target unit interaction system can run on one or more user devices 102a-102n, one or more data management systems 106 that communicates with one or more user devices 102a-102n, and/or one or more data management systems 116 that resides at a remote location and communicates with one or more data management systems 106 and/or one or more user devices 102 via network 114. One having ordinary skill in the art with the benefit of this specification appreciates that numerous data management systems 106 may be utilized to effectively communicate with user devices 102a-102n depending upon the number of user devices 102 required to interact the one or more identified target units 104. The network 114 can take the form of a LAN (local area network), WAN (wide area network), the Internet, a cellular network that can include one or more satellite relay communication devices, or any other type of network that connects one or more facilities or sites (facility 1 through N located at the fuel uplift service provider, and facilities 140 and 160 that represent remote customer and reseller third-party sites), depending upon the needs of the user and the constraints of the operating system included in the one or more data management systems 106 and/or data management systems 116. It should be noted that although only one data management system 116 is shown, in some embodiments, there may be numerous data management systems 116 residing at one or more remote sites that may be communicably connected, via one or more networks 114, to one or more data management systems 106 or one or more user devices 102. For example, in some embodiments, user devices 102 may also include one or more computer software modules installed therein, include a computer software application or have the capability to connect to a network (e.g., Internet, Intranet) by itself or via another user device 102 or third-party computer device(s) that has access to a network to communicatively connect to one or more data management systems 116. In some embodiments, one or more data management systems 106 and/or one or more user devices 102 may connect to one or more data management systems 116 via a website.

In some embodiments, the network 114 may also represent a combination of the aforementioned types of networks. For example, a LAN, that connects one or more user devices 102 to one or more data management systems 106 can be utilized with the Internet to connect communicatively connect the one or more data management systems 106 to one or more data management systems 116. For example, one or more user devices 102 can be connected to the aforementioned one or more data management systems 106, or a single server application can reside within a user device 102 with which a user is interacting to input data and/or receive results from the target unit interaction service. A user can be a person or a computer. For example, in some embodiments of the target unit interaction service, a user is a computer on which target unit interaction data is viewed via a monitor connected to the computer, to which target unit interaction data is uploaded, and/or from which target unit interaction data is downloaded to one or more data management systems 106 and/or one or more data management systems 116.

In some embodiments, one or more user devices 102 may be configured by a software application residing on the device. In some embodiments, one or more user devices 102 may be configured by downloading a software application after accessing a website or one or more DMS systems 106,116 residing on the target unit interaction system. In some embodiments, once connected, a user can access the one or more DMS systems and databases to transmit, receive and/or update target unit interaction data received or generated from interacting with one or more target units 104. In some embodiments, the target unit interaction data may be centrally stored in one or more databases, residing within a single DMS system 106,116 or distributed across DMS systems 106 and 116 and made accessible to one or more user devices 102. In some embodiments, DMS 106,116 hosts the data that is input into, selected, generated and/or displayed by one or more user devices 102 via a target unit interaction graphics user interface (GUI) displayed on a monitor connected to a user device, 102 or another computer system (not shown) communicatively connected to one of a user device 102 or a DMS 106,116, when using the target unit interaction system. In some embodiments, DMS 106, 116 also hosts the target unit interaction data that is associated with a user account and corresponding interactivity session wherein the exchange of target unit interaction data occurs between one or more user devices 102 and one or more target units 104. In some embodiments, the target unit interaction data may be distributed across databases that reside in the DMS systems 106,116, depending upon the available bandwidth and the amount of storage and computing power required by the target unit interaction system to accommodate the required number of users. As discussed herein, one or more DMS systems 106,116 may include, for example, a web server or a server that is disposed in a remote site and accessible by one or more user devices 102 over a network, such as the network 114 in case of DMS 116.

Figure 2:
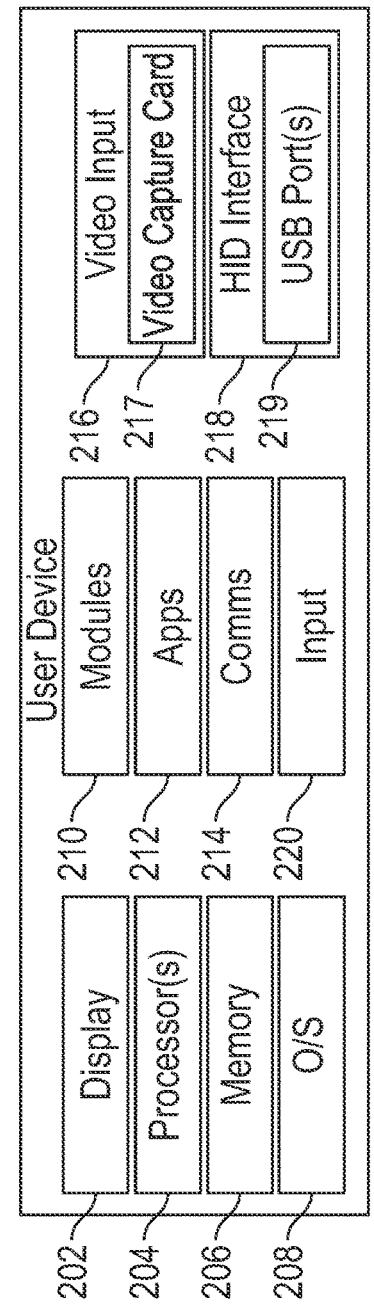
FIG. 2 is block diagram representation of exemplary user device(s) utilized in accordance with one or more embodiments of the present disclosure.

Referring now to FIG. 2, an exemplary architecture of a user device 102 is illustrated. In some embodiments, a user device may include a display 202, one or more processors 204, a data storage device including one or more memory devices 206, an operating system 208, hardware and/or software modules 210, one or more software applications 212, a video input interface device 216 that includes a video capture device (e.g., a video capture card 217), an HID (Human Interface Device) interface 218 that includes an interface for emulating a software commands output by a human interface device (e.g., one or more USB HID class ports 219), one or more data input devices 220 (e.g., keyboard, game controller, joystick, camera, mouse, touch screen display, light pen, wired or wireless barcode reader, digital camera, light scanner, optical reader, trackball, microphone, touchpad, stylus, or appropriate combinations of thereof, or any other device that is suitable to perform the functions of an input device as disclosed herein). In some embodiments, the user device 102 may be configured to transmit and receive data, over a data connection, to and from one or more target units 104. In some embodiments, the user device 102 may be configured to receive and transmit data over a network using communications hardware/software 214 known to those skilled in the art. In some embodiments, one or more of the input devices 220 may be wireless. In other embodiments, one or more of the input devices may be connected to a user device 102 via a communications wire or cable. In some embodiments, the software modules 210 contains instructions for executing the target unit interaction methods as disclosed herein for user device 102, and are also stored in one or more memory devices 206 that may reside on the user device 102. In other embodiments, the software modules 210 can reside on a remotely situated computing devices such as DMS 116 to be accessed by one or more user devices 102. In some embodiments, one or more user devices 102 can also communicatively couple to the DMS system 106 and/or DMS 116 remotely using a wired or a wireless communications standard via a network, as those having ordinary skill in the art will appreciate. In some embodiments, for example, video input interface 216 may include an HDMI port, RGB port, SD port, or other similar video input port for receiving video data (e.g., video signals) from one or more target unit 104. In some embodiments, for example, the HID interface 218 may include a USB-C port. In some embodiments, an audio codec (not shown) may be provided, for one or more user devices 102, which receives audible input from a user or other source through a microphone and converts the audible input to usable digital information. In some embodiments, the audio codec can generate audible sound, such as through a speaker that is provided with the user device 102. For example, the audible sounds may include sound from voice telephone calls, recorded sound (e.g., voice messages, music files, etc.), and/or sound generated by applications operating on the user device 102.

Figure 3:
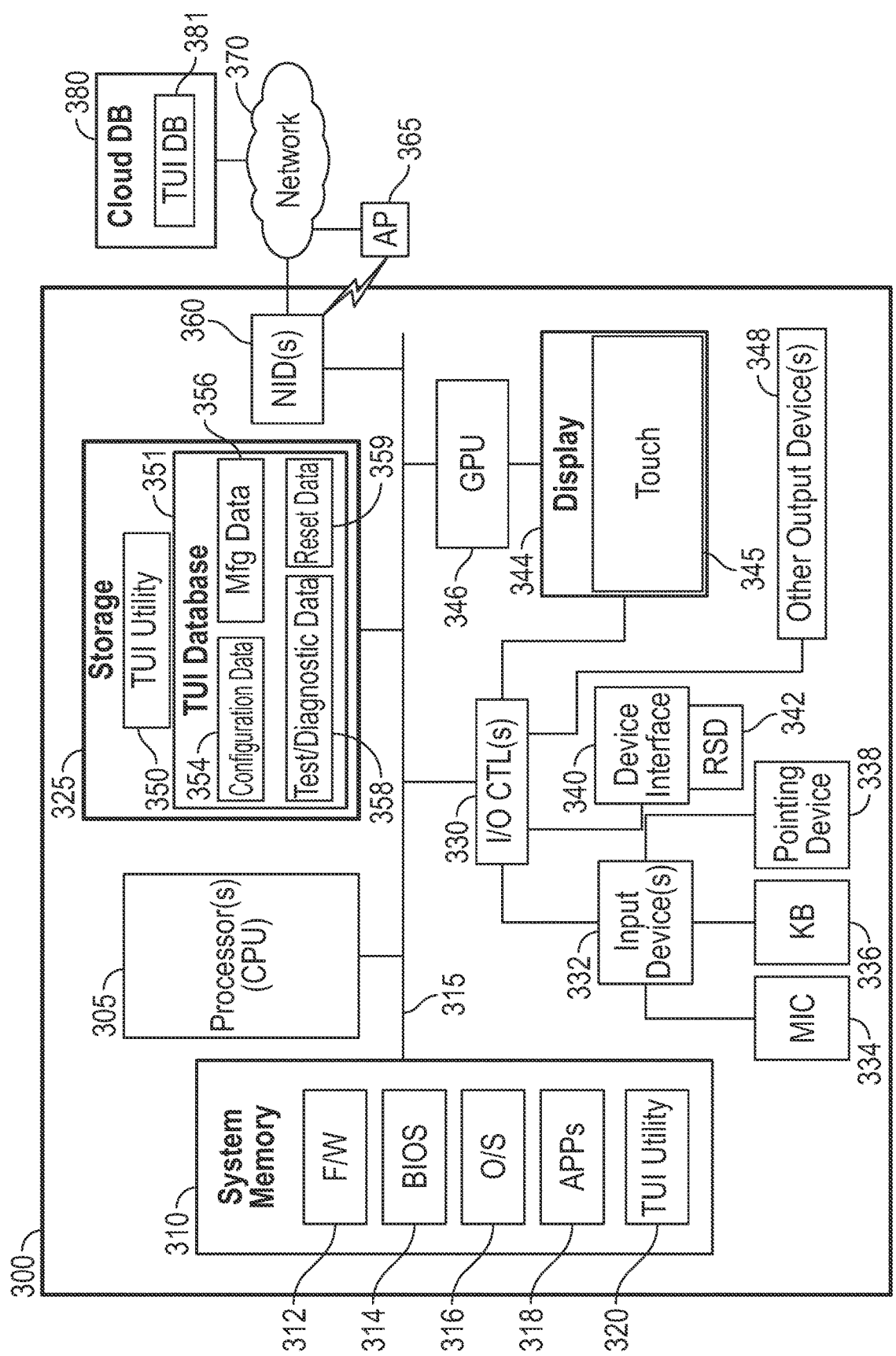
FIG. 3 illustrates an exemplary data management system that functions in a networked computing device and/or server providing a cloud infrastructure supporting implementation of a data management system storing the data and executing the software disclosed according to one or more embodiments of the present disclosure.

FIG. 3 is a block diagram representation of an exemplary data management system (DMS) 300 that may be configured as a networked computing device and/or server, according to some embodiments. DMS 300 operates as the computing device within which one or more of the described features of the various embodiments of the DMS 106,116 can be implemented. In one embodiment, DMS 300 can be any electronic device such as, but not limited to, a desktop computer, notebook computer, or a server. In some embodiments, DMS 300 can be one sever within a cluster of servers, where the servers can be in co-located in a single location or geographically dispersed over a plurality of locations, or a combination thereof. Additionally, in some embodiments, DMS 300 can be implemented as a virtual machine sharing hardware resources of a physical server.

Exemplary DMS 300 includes one or more processors or one or more central processing units (CPU) 305 coupled to system memory 310, non-volatile storage 325, and input/output (I/O) controllers 330 via system interconnect 315. System interconnect 315 can be interchangeably referred to as a system bus, in some embodiments. One or more software and/or firmware modules can be loaded into system memory 310 (from storage 325 or other source) during operation of DMS 300. Specifically, in the illustrative embodiment, system memory 310 is shown having therein a plurality of common modules, including firmware (F/W) 312, basic input/output system (BIOS) 314, operating system (OS) 316, and application(s) 318. Additionally, system memory 310 includes target unit interaction (TUI) utility 320. TUI utility 320 can be provided as one of applications 318 and/or as an executable component within F/W 312 or OS 316, in alternate embodiments. The software and/or firmware modules within system memory 310 provide varying functionality when their corresponding program code is executed by CPU 305 or by secondary processing devices (not specifically shown) within DMS 300.

In some embodiments, exemplary DMS 300 includes I/O controllers 330 that support connection by and processing of signals from one or more connected input device(s) 332 including, for example, microphone 334, keyboard 336, and pointing device 338 and other devices (not shown). For example, Pointing/Touch device 338 can be a mouse, light pen, touch pad, or stylus. It is appreciated by one having skill in the art with the benefit of the specification that input devices 332 can also include, as a non-exclusive list, hardware button(s), touch screen 345, infrared (IR) sensor, fingerprint scanner, and the like. In some embodiments, exemplary DMS 300 includes I/O controllers 130 that also support connection with and forwarding of output signals to one or more connected output devices, including display 344 and other output devices 348. In some embodiments, display 344 can include a touch screen 345 that serves as a tactile input device. In some embodiments, exemplary DMS 300 includes a graphics processing unit (GPU) 346, which is communicatively or physically coupled to display 344 and to one or more processors 305. In some embodiments, exemplary DMS 300 includes a GPU 346 that controls the generation and presentation of certain user interfaces (Uis) that are created during execution of TUI utility 320 by one or more CPUs 305.

In some embodiments, exemplary DMS 300 includes one or more device interfaces 340, such as an optical reader, a universal serial bus (USB), a card reader, Personal Computer Memory Card International Association (PCMIA) slot, and/or a high-definition multimedia interface (HDMI). In some embodiments, device interface(s) 340 can be utilized to enable data to be read from or stored to corresponding removable storage device(s) (RSD) 342, such as a compact disk (CD), digital video disk (DVD), flash drive, or flash memory card. In some embodiments, device interfaces 340 can further include General Purpose I/O interfaces, such as Inter-Integrated Circuit (I2C), System Management Bus (SMBus), and peripheral component interconnect (PCI) buses. In accordance with some embodiments, the functional modules described herein as aspects of the disclosure can be provided as a computer program product. The computer program product includes removable storage device(s) 342 as a computer readable storage medium, on which is stored program code when executed by one or more processors causes the one or more processors to implement the various functions described herein, including, but not limited to, the features presented in the flow charts of FIG. 5A-FIG. 5R.

In some embodiments, exemplary DMS 300 includes network interface device (NID) 360, which can include both wired and wireless networking devices (not specifically shown). In some embodiments, NID 360 enables DMS 300 and/or components within DMS 300 to communicate and/or interface with other devices, services, and components that are located external to DMS 300. In some embodiments, exemplary DMS 300 may directly connect to one or more of these external devices, via NID 360, such as via a direct wire or wireless connection. In some embodiments, DMS 300 connects to specific external devices, services, and/or components, such as one or more user devices 102, external information server(s) (not shown) and Cloud database 380, via external network 370, using one or more communication protocols. In some embodiments, network 370 can be a local area network, wide area network, personal area network, and the like, and the connection to and/or between network 370 and DMS 300 can be wired or wireless (via access point 365) or a combination thereof. For purposes of discussion, network 370 is indicated as a single collective component for simplicity. However, it is appreciated by one having ordinary skill in the art with the benefit of this specification that network 370 can comprise one or more direct connections to other devices as well as a more complex set of interconnections as can exist within a wide area network, such as the Internet. In some embodiments, DMS 300 is accessible by one or more user devices 102 via the Internet (370) via utilization of a website having one or more domain names affiliated therewith.

In some embodiments, DMS 300 interacts with one or more target units 104 via network 370 to perform the functionality disclosed herein and described with reference to FIG. 5A-FIG. 5R. In these embodiments, for example, TUI utility 320 includes one or more functional modules that execute on one or more CPUs 305 to perform these specific functions. For example, in some embodiments, these functional modules utilize and/or generate specific data, which data is stored as information and/or data within storage 325 and/or within cloud database 380. As an example, storage 325 is shown to include TUI Database 351, which includes different blocks of data, including configuration data 354, manufacturing data 356, test/diagnostic data 358, and reset data 359. In some embodiments, cloud database 380 is shown to include a copy of TUI database 351. Both TUI databases 381 store relevant data utilized by TUI utility 320 to perform the personalization of certain UIs and store and manage the data collected and generated by one or more user devices 102 as a result of interacting with one or more target units 104 as discussed herein. For example, in some embodiments, access to the TUI DB 351 at remote cloud DB 380 can be provided to one or more user devices 102 via the connection through network 370.

Figure 4A:
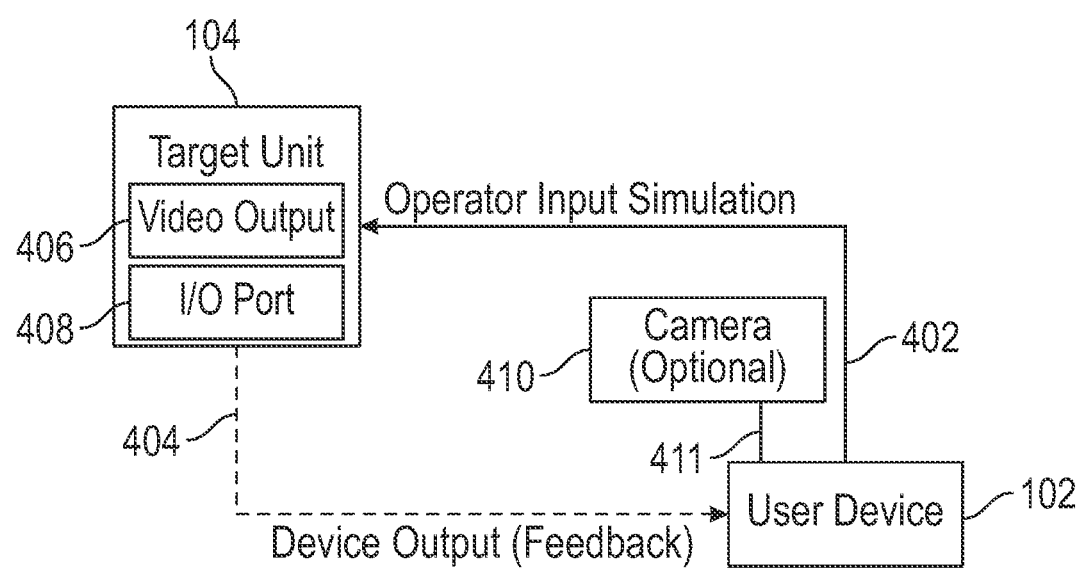

FIG. 4A illustrates an exemplary embodiment of a system and method for interacting with and/or controlling a target unit. In some embodiments, a user device is configured to interact with and/or control one or more target units to perform one or more functions, including but not limited to configuring, reconfiguring, sanitizing, resetting, testing, diagnosing and/or manufacturing the target unit, erasing data such as, for example, user data or all data stored on the target unit(s), and/or installing or reinstalling software and/or one or more operating systems on the target unit(s). In some embodiments, target unit 104 includes an I/O interface device (e.g., I/O port 408) that is configured to receive input signals (e.g., commands) from one or more computer input devices. One having skill in the art with the benefit of this specification understands that the type of computer input device that is may be configured to send/receive input signals to the target unit depends upon the type of target unit utilized. For example, computer input devices that may send and/or receive signals to and/or from the target unit may include one of a game controller, keyboard, mouse, pointer, tracking ball, touch pad, touchscreen, or any other suitable computer input device. In some embodiments, target unit 104 includes a video output interface device 406. In some embodiments, the target unit 104 includes a video output interface 406 that may include, for example, RGB type video interfaces, S-Video, Component Video, HDMI, Mini HDMI, Micro HDMI, DisplayPort, Mini DisplayPort, Thunderbolt, USB Type-C, Thunderbolt, VGA, Mini-VGA, DVI-D, DVI-I, Mini-DVI and/or Micro-DVI, or any other suitable display interface capable of outputting video data as disclosed herein. In some embodiments, the video output interface and the I/O interface may be combined into a single interface.

Figure 4B:
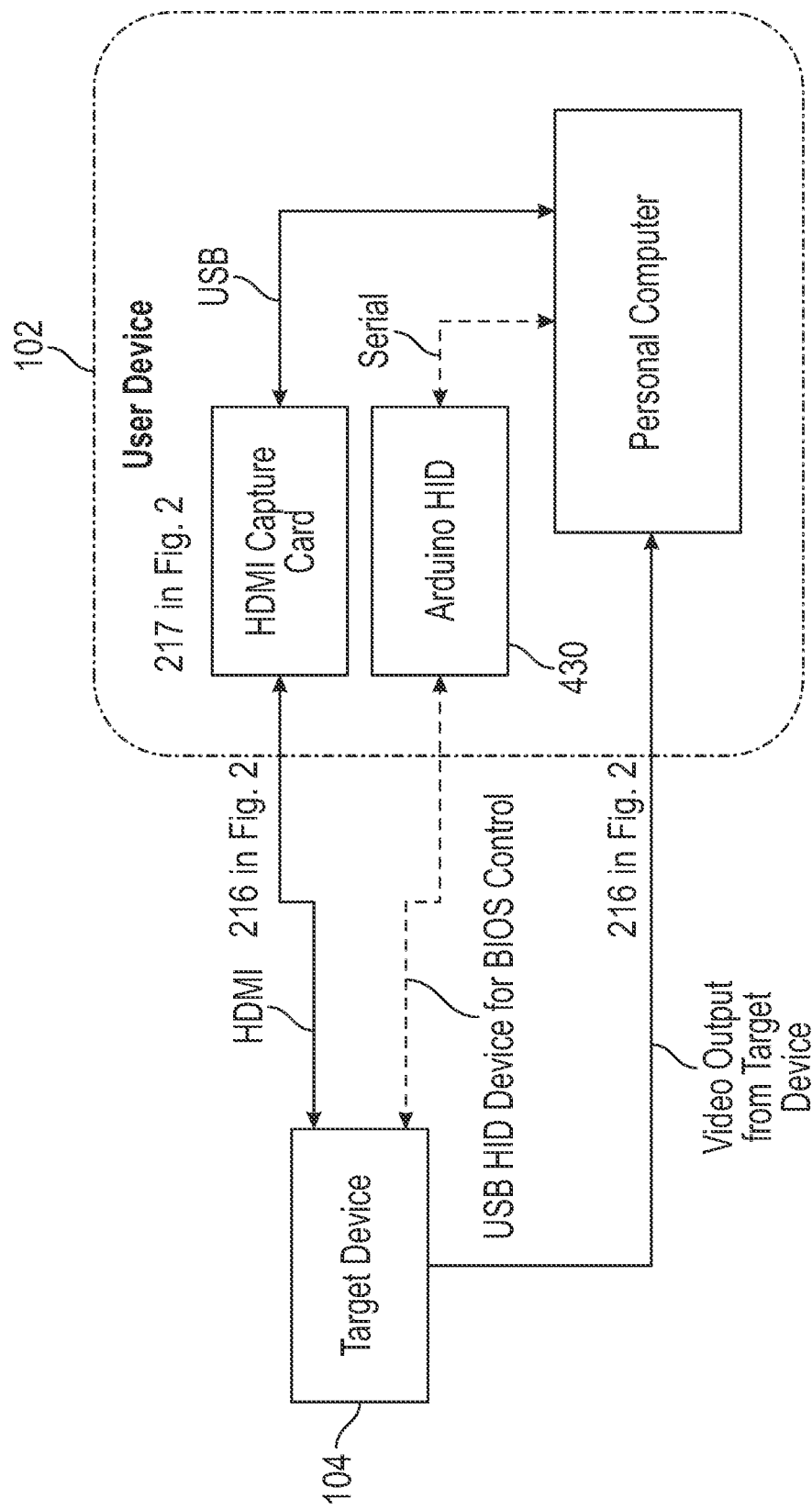

FIG. 4B illustrates an exemplary embodiment of a system and method for interacting with and/or controlling a target device 104. In some embodiments, a user device 102 is configured to interact with and/or control one or more target devices 104 to perform one or more functions, including but not limited to configuring, reconfiguring, resetting, testing, diagnosing and manufacturing the target device. In some embodiments, user device 102 includes a digital or analog I/O 430 that may be, for example, a single board microcontroller or microprocessor which may be equipped with digital and analog I/O (e.g. Arduino) to receive input signals (e.g., commands) from one or more computer input devices (not shown). In some embodiments, the digital or analog I/O 430 may include a single board computer that may be used to emulate HID devices (such as keyboards, mouse, trackpad, touchpad, touchscreen, gaming controller) to control one or more target devices 104 during instances for BIOS control of the target devices. In one or more embodiments, HID emulation and video capture and analysis may be performed on separate processors (computers, controllers, microcontrollers, Field Programmable Gate Array). One having skill in the art with the benefit of this specification understands that the type of computer input device (not shown) that may be configured to send/receive input signals to one or more target devices 104 depends upon the type of target devices utilized. For example, computer input devices that may send and/or receive signals to and/or from the target device 104 may include one of a game controller, keyboard, mouse, pointer, tracking ball, touch pad, touchscreen, or any other suitable computer input device. In some embodiments, target unit 104 includes a video output interface device 406. For example, the video output interface device 406 may include an RGB type video interfaces, S-Video, Component Video, HDMI, Mini HDMI, Micro HDMI, DisplayPort, Mini DisplayPort, Thunderbolt, USB Type-C, Thunderbolt, VGA, Mini-VGA, DVI-D, DVI-I, Mini-DVI and/or Micro-DVI, or any other suitable display interface capable of outputting video data as disclosed herein. In some embodiments, the video output interface 406 and the I/O interface 408 may be combined into a single interface.

Figure 4C:
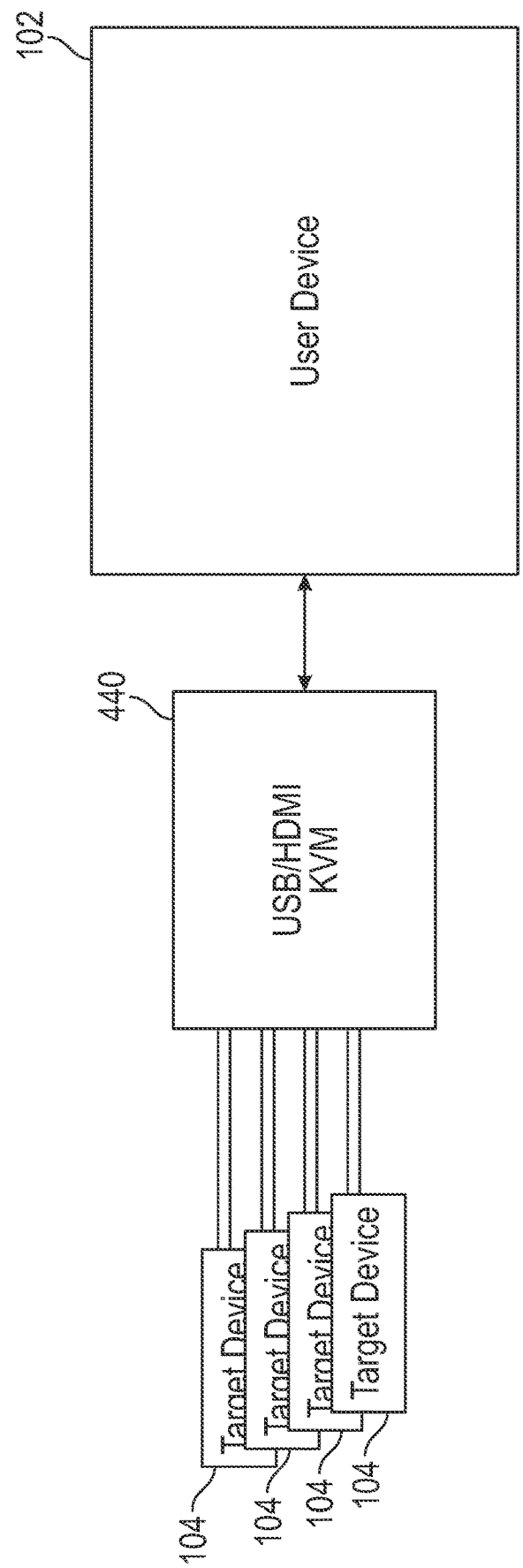

FIG. 4C illustrates an exemplary embodiment of a system and method for interacting with and/or controlling one or more target devices 104 with a single user device 102 via a KVM switch 440. In some embodiments, a user device 102 is configured to interact with and/or control one or more target devices 104 to perform one or more functions, including but not limited to configuring, reconfiguring, resetting, testing, diagnosing and manufacturing the target device, as discussed herein. In some embodiments, target unit 104 includes an I/O interface device 408 (e.g., USB) that is configured to receive input signals (e.g., commands) from one or more computer input devices. One having skill in the art with the benefit of this specification understands that the type of computer I/O device that may be configured to send/receive input signals to/from the target device 104 depends upon the type of target device 104 utilized. For example, computer input devices (not shown) that may send and/or receive signals to and/or from the target device may include one of a game controller, keyboard, mouse, pointer, tracking ball, touch pad, touchscreen, or any other suitable computer input device. In some embodiments, target unit 104 includes a video output interface device 406. For example, the video output interface 406 may include RGB type video interfaces, S-Video, Component Video, HDMI, Mini HDMI, Micro HDMI, DisplayPort, Mini DisplayPort, Thunderbolt, USB Type-C, Thunderbolt, VGA, Mini-VGA, DVI-D, DVI-I, Mini-DVI and/or Micro-DVI, or any other suitable display interface capable of outputting video data as disclosed herein. In some embodiments, the video output interface 406 and the I/O interface 408 may be combined into a single interface.

FIG. 4D and FIG. 4E illustrate exemplary embodiments of a system and method for interacting with and/or controlling one or more target devices 104 with one or more user devices 102. As illustrated in FIG. 4E, in these exemplary embodiments, image data is captured by one or user devices 102 and transmitted, via a network 480, to a computer 442 for analysis and processing by image processor 481 that processes and analyzes the digital image data. In one or more embodiments, the captured image data is compressed before it is transmitted. A logic processor 482 is utilized to determine what commands (e.g., HID instructions) are needed to be transmitted to the one or more user devices 102 such that one or more of the functions described herein are performed to the one or more target devices 104. For example, HID instructions in the form of HID commands are generated by the HID instruction module 483 and transmitted, via network the network 480 to one or more user devices 102 for execution. For example, in some embodiments, a user device 102 may be configured to interact with and/or control one or more target devices 104 to perform one or more functions, including but not limited to configuring, reconfiguring, resetting, testing, diagnosing, and manufacturing the target device. In some embodiments, for example, target unit 104 includes an I/O interface device (e.g., USB) that is configured to receive input signals (e.g., commands) from one or more computer input devices described herein (not shown). One having skill in the art with the benefit of this specification understands that the type of computer input device that may be configured to send/receive input signals to/from one or more target devices 104 depends upon the type of target device utilized. For example, computer input devices that may send and/or receive signals to and/or from the target device may include one of a game controller, keyboard, mouse, pointer, tracking ball, touch pad, touchscreen, or any other suitable computer input device. In some embodiments, target unit 104 includes a video output interface device 406. In some embodiments, the target unit 104 includes a video output interface 406 that may include, for example, RGB type video interfaces, S-Video, Component Video, HDMI, Mini HDMI, Micro HDMI, DisplayPort, Mini DisplayPort, Thunderbolt, USB Type-C, Thunderbolt, VGA, Mini-VGA, DVI-D, DVI-I, Mini-DVI and/or Micro-DVI, or any other suitable display interface capable of outputting video data as disclosed herein. In some embodiments, the video output interface 406 and the I/O interface 408 may be combined into a single interface.

In some embodiments, video input interface 216 included in a user device 102 may be utilized to connect the user device 102 to a target unit 104 via a video output interface 406 and receive output video/image data from the target unit 104. In some embodiments, a user device may include a video capture card 216 the is configured to receive the incoming video stream from the target unit 104 into the video capture card 216. For example, in some embodiments, an output video signal is transmitted from the target unit via a DVI output and, if necessary, is converted by the video input interface 216 included in a user device 102 to either a standard definition video signal (down-converted to S-Video or Composite) or to a 1080p signal using an HD-SDI protocol. One having skill in the art with the benefit of this specification understands that the type of conversion performed is decided by the capabilities of the video capture card that is inside the receiving documentation system computer. For example, in some embodiments, the target unit is an iPhone and the user device 102 is connected to iPhone lightning port. In these examples, the communicable connection between the user device 102 and the iPhone may be a physical connection such as, for example, a USB-C to Lightning cable or some other suitable physical connection. For example, in some embodiments, the communicable connection between the user device 102 and the iPhone may be a wireless connection such as, for example, via Wi-Fi, infrared or Bluetooth. In some embodiments, the output video/image data output by a target unit 104 may be transmitted to a user device 102 from a video output port included in the target unit 104. In some embodiments, the output video signal output by the target unit 104 is split such that the user device 102 receives the output video signal, and another device, such as a second user device 102 or another suitable device capable of processing the output video signals, receives the output video signal. In some embodiments, the output video signal is received by one or more user devices over a network, such as a local area network ("LAN"), wide area network ("WAN"), inter-network (e.g., the Internet), and/or peer-to-peer network (e.g., ad hoc peer-to-peer networks), or any combination of the aforementioned. In some embodiments, one or more user devices 102 may receive image data output by a target unit via a camera 410. In some embodiments, a camera is embedded in the target unit. In some embodiments, a camera may be embedded in the user device. In some embodiments, the camera 410 is externally mounted to the target unit such that image data may be received from images captured on a display device (not shown) connected to the target unit and configured to display digital images generated by video signals output by the target unit 104.

In some embodiments, HID interface 218 included in a user device 102 may be configured to connect the user device 102 to a target unit 104 via a I/O port 408 and transmit data signals such as, for example, emulation signals, to the target unit 104. For example, the data signals that are transmitted from the HID interface 218 or an I/O device 430 may include one or more HID commands (e.g., software commands configured to emulate one or more computer input devices, such as, for example, a keyboard, pointing device, mouse, game controller, and other computer input devices disclosed herein) that are utilized to interact with and/or control one or more target units 104. For example, in some embodiments, the HID commands transmitted by a user device 102 may emulate data signals transmitted by a computer input device and provide interaction with and/or control over the relevant target unit 104 to configure, reconfigure, manufacture, test, diagnose and/or reset the target unit, as disclosed herein, without human interaction (e.g., a human operator sending data signals to a target unit via manipulation of a keyboard, game controller, or other suitable computer input device). In some embodiments, the HID commands may emulate a combination of computer input devices, and/or one or more of a virtual computer input device and a physical computer input device.

Referring to FIG. 4B, user device 102 in one example comprises an input emulation engine 452, video capture engine 454, audio capture engine 456, process sequencer engine 458, configuration engine 460, video analysis engine 462, audio analysis engine 464, process analysis engine 468, tactile capture engine 470, tactile analysis engine 472, and report and log generation engine 474. For example, one or more of the aforementioned engines may be included in the target unit interaction software that is executed on one or more processors included in a user device 102 to perform one or more functions disclosed herein. In some embodiments, the information, or a portion of the information, that is received and/or generated by one or more of the aforementioned engines included in the target unit interaction software is retrievably stored in one or more memory devices included in memory 206 of the target unit, and/or transmitted to one or more DMS systems 106,116 to be retrievably stored in a TUI database 351 included in one or more DMS systems 106,116 and/or cloud DB 380 communicatively connected to one or more DMS systems 106,116, and/or transmitted directly to TUI DB 381 in cloud DB 380. In some embodiments, the information stored in the aforementioned memory systems may be retrieved by one or more user devices 102 and/or one or more DMS systems 106,116 to be processed and/or utilized to perform one or more functions disclosed herein.

For example, in some embodiments, input emulation engine 452 provides the functionality to the user device 102 to generate, transmit and/or drive electronic digital input/output signals and/or analog input/output signals that emulate one or more input devices to communicate with one or more devices, such as one or more target units 104, to control, configure, manufacture, test, diagnose, and/or reset the target unit. In some embodiments, the input emulation engine 452 provides the functionality to the user device to communicate directly with other electronic devices (e.g., audio device(s), video device(s), and/or other devices) to generate, transmit and/or drive electronic digital input/output signals and/or analog input/output signals that emulate human input to the device. For example, the input emulation engine may operate to provide functionality to the user device to generate, transmit and/or drive electronic digital input/output signals and/or analog input/output signals that emulate keyboard strokes, mouse clicks, human touch screen inputs (e.g., scrolling, swiping, selecting, etc.), gaming controller inputs (e.g., button pushes, tilt accelerometer inputs, converted game-controller inputs that emulate mouse-clicks, keyboard inputs or other input device inputs, etc.), and/or joystick inputs. In some embodiments, the input emulation engine 452 may send audio signals that mimic human speech to control, configure, manufacture, test, diagnose, or reset one or more target units. In some embodiments, the input emulation engine 452 may create images to mimic QR codes, text, and/or colors to control, configure, manufacture, test, diagnose, or reset one or more target units.

For example, in some embodiments, one or more of the target units may include a console (e.g., a gaming console as disclosed herein). In some embodiments, the input emulation engine 452 may emulate a gaming controller, keyboard, and/or mouse to provide the functionality to the user device 102 to generate, transmit and/or drive electronic digital input/output signals and/or analog input/output signals to communicate with the console to control, configure, manufacture, test, diagnose, and/or reset the target unit, as disclosed herein for example. For example, in some embodiments, one or more of the target units may include a PC. In some embodiments, the input emulation engine 452 may emulate a keyboard, mouse, audio device (e.g., a device that can transmit speech data/signals to the PC (e.g., microphone device), speaker(s)), and/or video device to provide the functionality to the user device 102 to generate, transmit and/or drive electronic digital input/output signals and/or analog input/output signals to communicate with the PC to control, configure, manufacture, test, diagnose, and/or reset the PC, as disclosed herein for example. For example, in some embodiments, one or more of the target units may include a smartphone. In some embodiments, the input emulation engine 452 may emulate a keyboard, touchscreen, audio device (e.g., a device that can transmit speech data/signals to the smartphone (e.g., microphone device), speaker(s)), and/or video device to provide the functionality to the user device 102 to generate, transmit and/or drive electronic digital input/output signals and/or analog input/output signals to communicate with the smartphone to control, configure, manufacture, test, diagnose, and/or reset the smartphone, as disclosed herein for example.

For example, in some embodiments, video capture engine 454 provides the functionality to the user device 102 to capture video output (e.g., video data) output from one or more target units. In some embodiments, for example, the user device utilizes the video output to assist the user device to control, configure, manufacture, test, diagnose, and/or reset the target unit, as disclosed herein for example. For example, in some embodiments, the video output may include data which would be visually presented to a user of the target unit and/or the target unit itself. In some embodiments, for example, the video output may be transmitted from a video output interface included in one or more target units 104 to a user device 102. In some embodiments, the video output may be transmitted via an external source (e.g., a camera configured to transmit video data from images captured from a display screen included in one or more target units (e.g., PC display device, smartphone display, console display device, or a display configured to display one or more images output by a target unit to a user)) to a user device 102. For example, in some embodiments, the video output may be provided via an HDMI interface, VGA interface, Ethernet interface, USB interface, and/or other computer/electronic interfaces and accompanying interconnectors (e.g., cable, network, plug, etc.), that is/are configured to transmit the video output to the user device 102.

Referring to FIG. 2, user device 102, for example, includes a video analysis engine 462 that analyzes video output received by the video capture engine 454 to determine the state of the device. For example, in some embodiments, video analysis engine 462 may use various techniques (e.g., optical character recognition (OCR), image matching, segment matching, and/or color spectrum) to provide feedback to the user device when controlling, configuring, manufacturing, testing, diagnosing, and/or resetting the target unit. For example, in some embodiments, the video analysis engine 462 analyzes video output to capture information about one or more processes performed by one or more target units, devices and/or systems included in one or more target units 104, and/or the entire target unit system. For example, in some embodiments, the video analysis engine 462 may analyze video output to determine if a target unit reset procedure performed by the user device 102 utilizing the target unit interaction software was performed correctly. For example, in some embodiments, the video analysis engine 462 may analyze video output of a camera device, included in, for example, a target PC unit, a target smart TV unit, a target smartphone unit, or a device that includes, is communicatively connected or has access to a camera, to determine if one or more aspects and/or image quality factors (e.g., sharpness, lens distortion, noise, veiling glare, color accuracy, color moiré, image processing artifacts, light falloff and/or nonuniformities, lateral chromatic aberration, other relevant image quality factors) of the camera device is operating within desired parameters.

For example, in some embodiments, the video analysis engine 462 may capture information concerning the health or the state of one or more systems and/or devices included in a target unit. For example, in some embodiments, the video analysis engine 462 may capture information concerning functionality of one or more systems and/or devices included in a target unit. For example, in some embodiments, the video analysis engine 462 may analyze video output to capture information included in one or more screen images concerning a target unit. For example, in some embodiments, the video analysis engine 462 may analyze video output to capture information including one or more serial numbers that may be utilized to identify a target unit, software revision identification information that may be utilized to determine the version of a software that a target unit may have access to and/or is running, changes to a software that have been or will be made over time, and/o the software installed. For example, in some embodiments, the video analysis engine 462 may analyze video output to capture information including the identity of the SSID of a WIFI network (e.g., a Wi-Fi network name), the identity of one or more Bluetooth devices connected to a target unit, and/or the identification and/or characteristics of one or more components utilized by, embedded or included in a target unit (e.g., storage size, remaining memory, type, defects (e.g., defective memory locations) and/or other characteristics of one or memory devices, I/O devices/interfaces (e.g. USB ports, HDMI or other video/audio ports)). For example, in some embodiments, the video analysis engine 462 may analyze video output of a target PC unit to capture information concerning one or devices communicatively connected to and/or included within the target PC unit including identification information (e.g., model and/or type, manufacturer information, version, number, and other relevant information) concerning the CPU, Video Card, memory devices (e.g., hard drives, external drives, memory cards, etc.), and or other devices and/or systems communicatively connected to, utilized by or included in a target PC unit.

In some embodiments, the video analysis engine 462 performs video analysis on the video/image data output by the target unit. In some embodiments, the video analysis engine 462 continuously monitors the video/image data output by a target unit 104 to determine if one or more key words are included in an image screen included in the output video/image data. For example, in some embodiments, the video analysis engine 462 combines each video/image element (e.g., pixel, collection of pixels, picture element, pel, or any other suitable digital display element utilized to generate a digital image) to generate a screen image. In some embodiments, each video/image element included in the one or more screen images generated by the video analysis engine 462 from the output video/image output data includes (x,y) coordinates. For example, in some embodiments, the calculation of the (x,y) coordinates of the video/image elements is based upon image resolution. In some embodiments, the image resolution can be adjusted for higher and lower resolution modes for the same target unit 104 depending upon the capabilities of the target unit and the data included in the output video/image data. In some embodiments, image screens provided by target units include interactive image elements (e.g., words, symbols, collection of pixels, etc.) that may be selected (e.g., via a mouse click, interaction with a pointer, touch screen, key-stroke via a keyboard, etc.) to cause a target unit that provides the image screen to perform one or more functions.

For example, in some embodiments, the video analysis engine 462 includes an optical character recognition (OCR) software engine. For example, in some embodiments, the OCR software program that is executed on one or more processors 204 that performs character recognition processes on video/image data and outputs the results, for example, in one or more files located in one or more memory devices 206 included in the data storage device of user device. For example, in one or more embodiments, the OCR engine extracts character image data from the image data output by a target unit 104 and converts the character image data into character code data. In some embodiments, video/image data output by the target unit 104 is converted into a bitmap format such that the (x,y) coordinates of each key word found in a particular image may be identified. One having skill in the art with the benefit of this specification understands that a "key word" can include a word, a phrase, a single character, a group of characters, ASCII character(s), numerical character(s), symbol(s), mark(s) or otherwise. In some embodiments, one or more identified key words may be compared to a known key word or representation of a key word to generate a confidence value. In some embodiments, the confidence value will be utilized to determine a confidence level that the part of the processed image is a key word. In some embodiments, for example, color, light, texture, changes in color, changes in light, changes in texture and/or any other value of the processed image may be utilized to determine if a portion of an image contains a key word and to identify a key word included in the image. As disclosed with reference to FIG. 5A-FIG. 5R, in some embodiments, the identification of certain key words triggers certain operational functions to occur.

For example, in some embodiments, the video analysis engine 462 includes an image comparison engine that is executed on one or more processors 204 that performs screen image comparison processes on video/image data output by one or more target units 104. In some embodiments, the results of the analysis performed by the image comparison engine are outputted to, for example, one or more files located in one or more memory devices 206 included in the data storage of user device and/or one or more files located in TDI database 351. For example, in some embodiments, the image comparison engine is based on perceptual image hashes, of which extensive study and benchmarking of the perceptual hashes can be found here: Christoph Zauner. (2010) Implementation and Benchmarking of Perceptual Image Hash Functions. (thesis). https://www.phash.orgidocsipubs/thesis_zaunerpdf)). Unlike cryptographic hashes (MD5 or SHA), which change dramatically with slight changes in the image, the perceptual hashes (aHash, pHash, dHash) can withstand mild transformation of the image, thereby making them suitable for comparing video images where minor differences are always present in the compared streams (for example different compression noise, slight difference in luminance levels, etc.). A typical video fingerprinting algorithm includes the following steps: 1) Input a video frame; 2) Remove color information leaving only the luminance information; 3) Reduce the image size to 8×8 pixels for the aHash algorithm, to 8×9 pixels for the dHash algorithm, and to 32×32 or 64×64 pixels for the pHash algorithm; 4) Calculate the hash value (typically 64 bits). For example, in some embodiments, the hash value is the fingerprint. These steps are repeated for subsequent video frames to compare the same. In some embodiments, the image comparison program may be utilized to compare the positioning of certain one or more key words in a known image screen (reference image screen) to the positioning of target unit image elements included in video/image data included in an image screen output by the target unit. In these embodiments, if the one or more key words are in the same (or similar) position in the image screen as in the reference image screen, then the image comparison program may determine that the target unit image elements and the reference image elements are the same or similar. Various types of image processing approaches can be used (e.g., comparing the obtained images to known images of screen images). For example, in one or more embodiments, the image comparison program may identify one or more detailed specific characteristics in the content being displayed by target unit 104, or the location (as an X/Y coordinate location or a region of the image based on X/Y coordinates) in the content of a detailed specific item being displayed by target unit 104, as described in U.S. Pat. No. 9,167,304. For example, in some embodiments, the content and its related elements (e.g., words, phrases, symbols, logos, etc.) can be identified by comparing images, such as raw data or pixels, in the content with previously-stored images (e.g., images stored in local memory data storage 206, in TDI database 351, or in the "cloud" database 380), or based on primary source or secondary source(s) metadata transmitted with the video/image data from target unit 104.

For example, in some embodiments, the video analysis engine 462 includes a key marker recognition engine that is executed on one or more processors 204 that performs image comparison processes on video/image data output by one or more target units 104. In some embodiments, the results of the analysis performed by the key marker recognition engine are outputted to, for example, one or more files located in memory 206 included in the user device and/or one or more files located in TDI database 351. In some embodiments, for example, the key marker recognition engine continuously detects image frames from the video/image data output by the target unit 104. For example, in some embodiments, the key marker recognition engine generates a plurality of key point video frame elements from the video/image data output by the target unit. In some embodiments, the key marker recognition engine combines the plurality of key point video frame elements into a key point video composite image that includes (x,y) data coordinates for each video/image frame element included in the key point video composite image. In some embodiments, a comparison video/image is obtained that includes one or more target objects. For example, in some embodiments, the target objects include key words, as disclosed herein. In some embodiments, the comparison video includes target objects (e.g., key words) and (x,y) coordinates associated with each target object. In some embodiments, the key marker recognition engine compares target objects included in the comparison video to words included in the key point video composite image to determine if one or more target objects are included in the key point video composite image. In some embodiments, the key marker recognition engine compares target objects and the (x,y) coordinates of the aforementioned target objects included in the comparison video to words and their respective (x,y) coordinates included in the key point video composite image to determine if one or more target objects are included in the key point video composite image at certain (x,y) coordinates. As disclosed with reference to FIG. 5A-FIG. 5R, in some embodiments, the identification of certain key words, logos and/or symbols trigger certain operational functions to occur.

Referring to FIG. 4B, in some embodiments, audio capture engine 456 provides the functionality to a user device 102 to receive and/or process audio output data transmitted by a target unit 104. For example, audio capture engine 456 may receive audio output data that is audibly output from one or more target devices 104 that may be configured to be transmitted to an earpiece, speaker, or other suitable listening and/or audio device. For example, the audio capture engine 456 may perform the necessary audio processes to the audio output data to produce audio data for analysis by one or more user devices 102, and/or DMS systems 106,116. For example, the audio capture engine 456 may perform filtering and normalization processing to produce a baseline audio for analysis.

Referring to FIG. 4B, in some embodiments, audio analysis engine 464 provides the functionality to a user device 102 to analyze and process audio received by the audio capture engine 452 to determine the state of the device. For example, in some embodiments, the analysis performed by the audio analysis engine 464 may be utilized by one or more other engines included in the target unit interaction software to perform further functionality. For example, in some embodiments, the analysis performed by the audio analysis engine 464 may include amplitude and frequency examination. For example, in some embodiments, the audio analysis engine 464 may analyze audio output received by the audio capture engine 452 from a target smartphone unit to determine whether a microphone, speaker, earpiece, ringer and/or other audio device included and/or communicatively connected to the target smartphone unit is functioning properly. For example, in some embodiments, the audio analysis engine 464 may analyze audio output received by the audio capture engine 452 from a target PC unit or a target television unit to determine whether a microphone, speaker, headphone, and/or other audio device included and/or communicatively connected to the target PC or television unit is functioning properly.

In some embodiments, tactile capture engine 470 provides the functionality to a user device 102 to receive and/or analyze tactile signals transmitted from a target unit, and/or a device communicatively connected to a target unit and output tactile data to the tactile analysis engine 472. In some embodiments, tactile capture engine 470 provides the functionality to the user device 102 to transmit simulated tactile signals (e.g., touching) to a target unit and, in response to the simulated tactile signals, receive and/or analyze tactile responses (e.g., output tactile data) transmitted from the target unit, and/or a device communicatively connected to the target unit. In some embodiments, the tactile capture engine 470 analyzes output tactile data. In some embodiments, the tactile capture engine 470 transmits output tactile data to the tactile analysis engine 472. For example, tactile signals may include vibratory motion (e.g., vibrations) of a target unit or a device communicatively connected to a target unit. For example, output tactile data generated by a target device may be received by the tactile capture engine 470 in response to an interaction with the target unit, such as, for example, interaction with a touch screen included and/or utilized by the target unit (e.g., a touch, prolonged touch, swipe, zoom and/or movement of a touch screen). In some embodiments, tactile capture engine 470 may also interact with a target device to simulate swiping, zooming, or moving of a screen included in or utilized by a target device. In these embodiments, the tactile output data generated by a target device in response to the simulated inputs may be received by the tactile capture engine 470 to be analyzed and/or configured to be received by the tactile analysis engine 472.

In some embodiments, tactile analysis engine 472 provides the functionality to a user device 102 to receive tactile data from the tactile capture engine 470 and determine if the target device and/or a device communicatively connected to the target unit is functioning in a desired manner. For example, in some embodiments, the tactile analysis engine 472 is configured to analyze tactile data output from the tactile capture engine 470 to determine if a touchscreen included in or utilized by a target unit (e.g., smartphone, tablets, and/or PC) is interacting properly when receiving tactile inputs from simulated interactions (e.g., touches).

In some embodiments, configuration engine 460 provides the functionality to a user device 102 to configure a target unit 104 to receive commands from a user device 102. For example, in some embodiments, the configuration engine 460 receives and transmits the target device access information that is required to access a target device 104. For example, the target device access information may include one or more of password(s), email account(s), URL address(es), and/or other information that may be utilized to configure a target unit to receive commands from a user device 102 to needed to test, reset, and/or install additional software tools and/or packages that may be required to control, configure, manufacture, test, diagnose, and/or reset the target unit. The configuration engine 460 may also provide criteria that may be utilized to determine if one or more processes performed on a target unit were successful.

In some embodiments, process sequencer engine 458 provides the functionality to a user device 102 to determine what individual tasks require execution to properly process a target unit in accordance with defined specifications. In some embodiments, process analysis engine 468 provides the functionality to a user device 102 to determines which tasks provided by process sequencer engine 458 should be executed or bypassed based on configuration information provided by configuration engine 460. In some embodiments, process analysis engine 468 provides the functionality to a user device 102 to determines which tasks provided by process sequencer engine 458 and performed upon a target device failed to be properly performed based on configuration information provided by configuration engine 460.

In some embodiments, report and log generation engine 474 provides the functionality to a user device 102 to receive and store all or a portion of the data created in interacting with a target unit to control, configure, reconfigure, manufacture, test, diagnose and/or reset the target unit. For example, in some embodiments, the report and log generation engine 474 utilizes at least a portion of the data, created when performing one or more functions disclosed herein, to generate one or more electronic report that is accessibly stored in one or more memory devices included in a user device 102, and/or DMS systems 106,116, or in the cloud DB 380 and configured to be transmitted over a network (e.g., network(s) 114,370) to a user device 102 or other authorized user. For example, the one or more reports may be analyzed by the target unit interaction software (i.e., the process analysis engine 468) to determine processing times, statistical trends, performance data, and/or provide a record of transactional facts for tracking and chain of custody purposes concerning one or more target units. For example, one or more electronic reports may contain device information concerning one or more target units, information including but not limited to a serial number(s), a software revision number(s), and an attribute(s) of the target device (e.g., data storage capacity of one or more memory devices included in the target device).

Figure 5A:
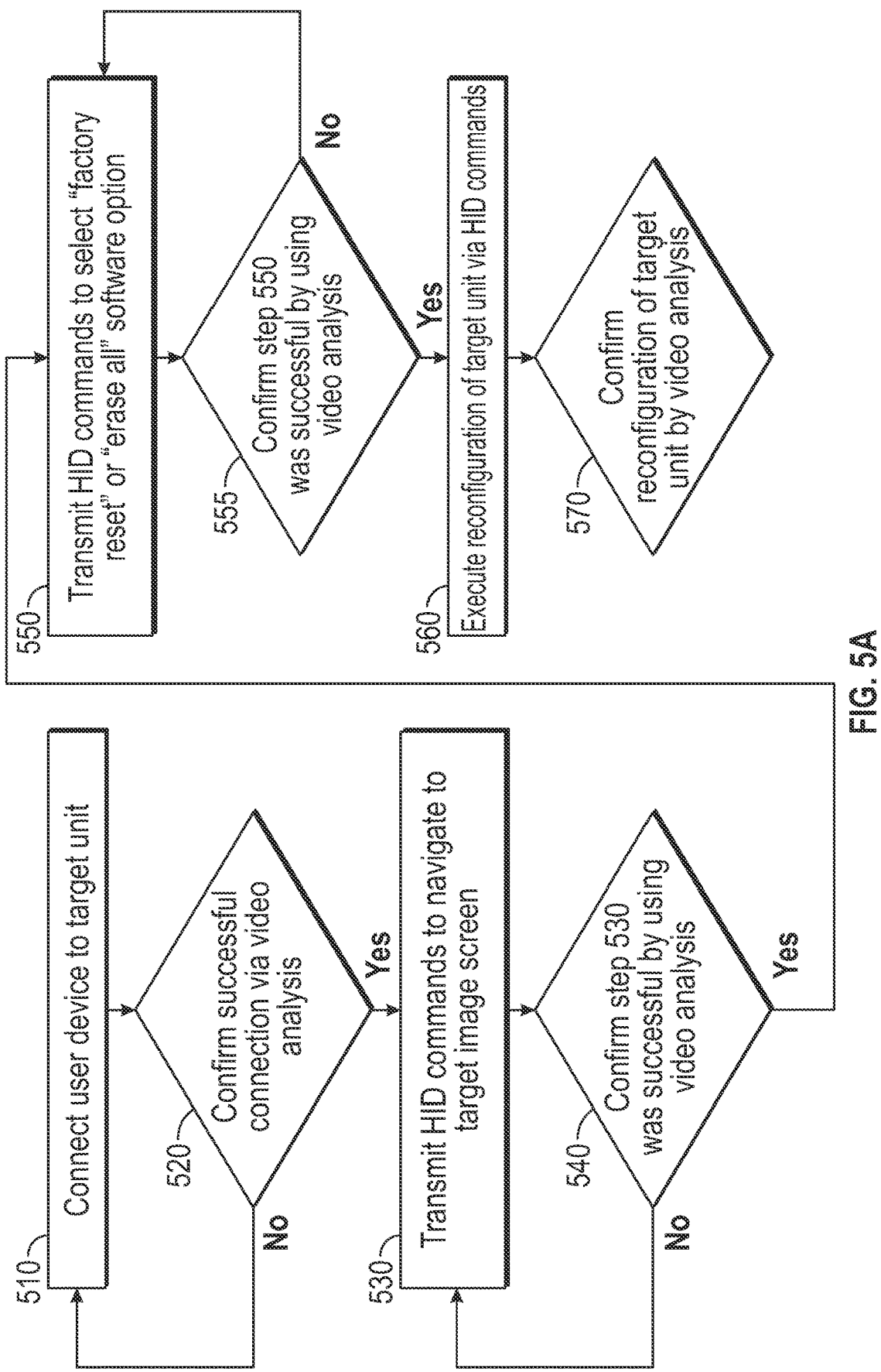
FIG. 5A depicts a flowchart of the operational steps executing target unit interaction software according to one or more embodiments of the present disclosure.

FIG. 5A. is a flowchart 500 depicting operational steps performed by one or more engines included in the target unit interaction software for resetting a target unit to a state that such that the device may be re-used, re-programmed and/or re-tasked for a specific purpose. In some embodiments, the target unit interaction software may be utilized to remove all user data from a target unit and revert the target unit back to the target unit's default settings. In some embodiments, the target unit interaction software may be utilized to change the target unit's configurations to their states when the target unit was offered to a customer for purchase. For example, in some embodiments, the target unit interaction resetting program may be utilized to reset one or more configurations of a target unit such that the components included in the target unit (e.g., memory devices, CPUs, GPUs, Blu-ray or other drives) are reconfigured to their respective factory settings. In some embodiments, the target unit interaction resetting program may be utilized to reset one or more configurations of a target unit such that the components included in the target unit are reconfigured to their respective refurbishment settings, settings that may be unique to a customer, a user, a technician and/or the like. For example, in one or more embodiments, selecting the option "erase all" provided as an interactive image element included in an image screen provided by an exemplary target unit will cause the target unit to erase all of the user data from its memory devices. For example, in one or more embodiments, selecting the option "factory reset" provided as an interactive image element included in an image screen provided by an exemplary target unit will cause the target unit to reconfigure one or more settings to a desired state specified by a user or customer. For example, in some embodiments, causing a target unit to execute a "factory reset" will cause the target unit to restore one or more of its configurations to their original system state by erasing all of the information stored on the unit. For example, in some embodiments, causing a target unit to execute a "factory reset" will cause the target unit to restore the target unit to its original manufacturer settings. For example, in some embodiments, executing a "factory reset" will effectively erase all of the data, settings, and applications that were previously on the target unit, or stored on the target unit after it was sold to a customer.

In step 510, target unit interaction software confirms that the user device 102 is connected to the target unit. For example, in some embodiments, the user device is a remote user device (not shown) connected, for example, to DMS 106, via a network (e.g., network 114). In some embodiments, a user has been issued an account identification and a target unit has been issued a target unit identification. In some embodiments, a user can request a target unit certificate associated with the target unit 104 from an account authority service. In some embodiments, the remote user device generates a public/private key pair in which the public key can be sent to an account authority along with a reference to the target unit of interest (e.g., target unit ID). In some embodiments, the public key may be transmitted to the account authority service in combination with the account identification information for the user. In some embodiments, the account authority service encrypts the target unit ID using the public key to create the target unit certificate and sends the target unit certificate back to the user device. In some embodiments, if and such that the user is associated with a target unit identification (target unit ID). As a result of this transaction, it is confirmed, via the target unit certificate, that the user device is an authorized device to form a communicable connection to the target unit 104 identified by the target unit ID. In some embodiments, once the target unit ID is obtained, a user device can connect to the target unit 104. In some embodiments, the connection is achieved through standard networking protocols, such as TCP/IP with the IP address for a target unit 104. In some embodiments, a user device (not shown) can connect to a target unit 104 via network 114 using standard networking protocols to perform the functionality disclosed herein.

In some embodiments, the remote user device may also request that the target unit 104 or the account authority service determine that the private key matches the public key provided by the user device. For example, methods of providing the private key and determining whether the private key matches the public key may be accomplished through standard protocols, such as SSL, but one having ordinary skill in the art with the benefit of this specification understands that other methods may be employed. In some embodiments, the user device 102 may undergo a network challenge and response handshake with the remote target unit, which results in the user device signing and/or encrypting some data with its private key. In some embodiments, either the target unit 104, a user device 102 connected to the target unit 104 and/or a DMS 106 connected to the user device 102 can, thereafter, verify the public key of the remote user device. For example, by verifying that the remote user device possesses the private key, a connection between the target unit 104 and the remote user device can be confirmed such that the remote user device has connected to the intended target unit 104 the devices can continue to communicate in a safe manner. In some embodiments, if verification fails, either user device 102 connected to the target unit 104 and/or a DMS 106 connected to the user device 102 can break the connection before providing information to or granting access to an unauthorized device.

In some embodiments, as disclosed with reference to FIG. 4A-FIG. 4E, the user device that is directing the interaction with the target unit 104 is connected via a physical connection to the target unit 104. For example, in some embodiments, the video output of the target unit 104 is connected to the video capture card interface of the user device 102 via HDMI cable 404. In some embodiments, the video output of the target device 104 is captured via a camera 410 via an HDMI or USB cable 411. In some embodiments, the USB-port of the user device 102 is also connected to the USB-port of the target unit via USB cable 402 that allows the user device to emulate input commands transmitted via input devices (keyboard commands, mouse-clicks, touchpad interactions, and other digital outputs) and transfer those input device outputs and commands to the target unit 104. For example, in some embodiments, the user device 102 may be a Raspberry Pi device (e.g., Raspberry Pi 4 device) that includes a USB-C port. For example, in some embodiments, the user device 102 may be a PiZero that includes a Micro-USB port. In these embodiments, a USB cable may be connected to the USB port of the Raspberry Pi device and the USB port of the target unit 104. For example, in some embodiments, a Raspberry Pi is connected to a gaming console, such as an Microsoft Xbox (e.g., Xbox, Xbox 360, Xbox 360 S, Xbox 360 E, Xbox One, Xbox One S, Xbox One X, Xbox Series X, or any model capable of such as connection as disclosed herein), Sony PlayStation (e.g., PlayStation, PS2, PlayStation 2 Slimline, PlayStation 3, PlayStation 3 Slim, PlayStation 3 Super Slim, PlayStation 4, PlayStation 4 Slim, PlayStation 4 Pro, PlayStation 5, or any model capable of such as connection as disclosed herein), Nintendo Wii (e.g., RVL-001, the RVL-101, and the RVL-201, or any model capable of such as connection as disclosed herein), Nintendo Switch (e.g., Switch, Extended Battery Switch, Switch Lite, or any model capable of such as connection as disclosed herein).

In some embodiments, the Raspberry Pi is connected to a smartphone (e.g., iPhone, Android smartphone) including either an iOS or an Android OS. In some embodiments, the user device 102 may be connected to the target unit 104 via Bluetooth. In this embodiment, for example, the user device 102 may emulate commands and input device inputs via Bluetooth keyboard emulation. In some embodiments, an external keyboard option may need to be enabled in, for example, an accessibility panel to allow the user device 102 to operably interact with the target unit 104. For example, an iPhone or an Android phone may include an accessibility panel wherein the external keyboard option may be enabled to enable the target unit 104 to perform the functionality as disclosed herein. In some embodiments, a debug mode option may need to be enabled in, for example, an accessibility panel to allow the user device 102 to operably interact with the target unit 104. For example, an iPhone or an Android phone may include an accessibility panel wherein the debug option may be enabled to enable the target unit 104 to perform the functionality as disclosed herein.

In some embodiments, in step 520, target unit interaction software confirms the successful connection of the user device 102 to the target unit 104 via video analysis. In some embodiments, the target unit will provide video output in the form of video/image data to the video input interface of the user device. The video/image data received by the user device and outputted directly by the target unit may include, for instance, video/image data from one or more of a VGA, S-video, DVI or HDMI connection. In some embodiments, the image data is processed by the video analysis engine 462 utilizing one or more techniques disclosed herein with respect to the OCR software engine, image comparison engine and/or key marker recognition engine to analyze the image data and identify one or more key words that are included in certain image screens output by the target unit. For example, in some embodiments, the user device includes a video capture card for converting the video/image data into signals for rendering the same on an image renderer (e.g., internally, or on a display device). In some embodiments, the video analysis engine 462 may analyze the image data and generate a bit map of the data points included in each of the images output by the video capture card utilizing one or more of the techniques disclosed herein to determine associated bit (x,y) coordinates of key words included in each of the images. For example, in some embodiments, once a word (e.g., a single character, string of characters, symbol, ASCII characters, numeric characters, different types of foreign characters (e.g., Kanji, Hiragana, Katakana), and/or any other symbol/character that is suitable to convey an idea or assist in conveying an idea) and the bitmap coordinates for that word are identified, the word is compared to a list of known key words, screen names and/or word positions associated with a known screen to determine if a user device is successfully connected to a target unit such that the user device may interact with the target unit to send commands and receive data from the target unit.

In some embodiments, when the user device is connected to a target unit 104, target unit interaction software determines which image screen the target unit 104 initially displays when power is provided to the target unit 104 by analyzing the video/image data output by the target unit 104. In some embodiments, target unit interaction software will interact with the target unit 104 by making selections on an image screen depending upon the options presented on one or more image screens provided by the target unit 104 to find a particular image screen on the target unit 104 that allows the user device to perform a certain function.

Figure 5B:
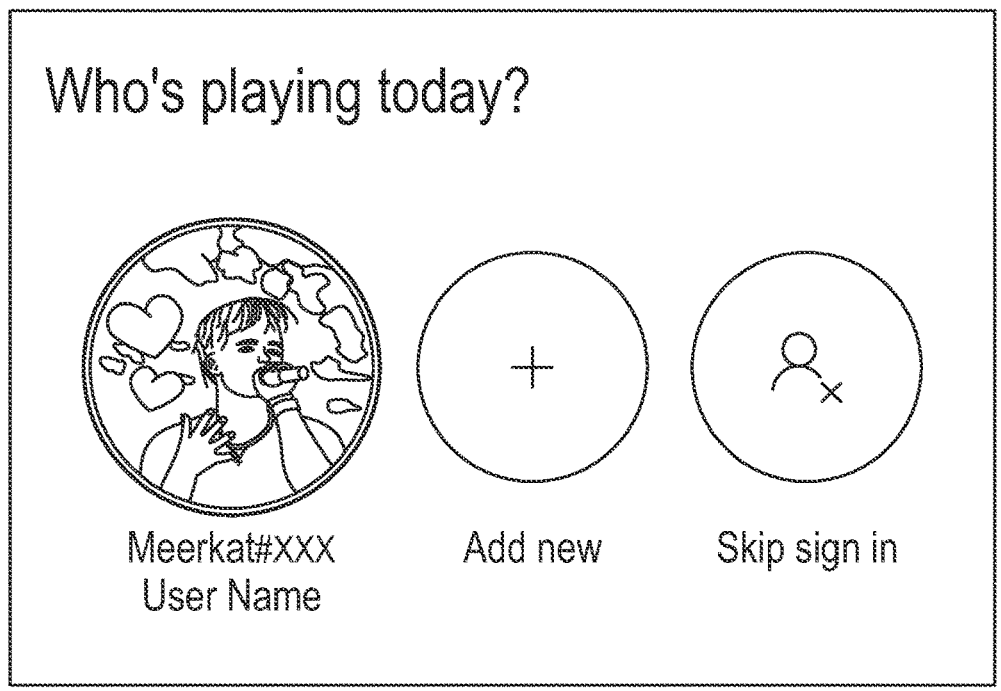
FIG. 5B-FIG. 5R depict exemplary target units and exemplary image screens provided by one or more target units during the execution of the operational steps of the target unit interaction software according to one or more embodiments of the present disclosure.
Figure 5C:
Figure 5D:
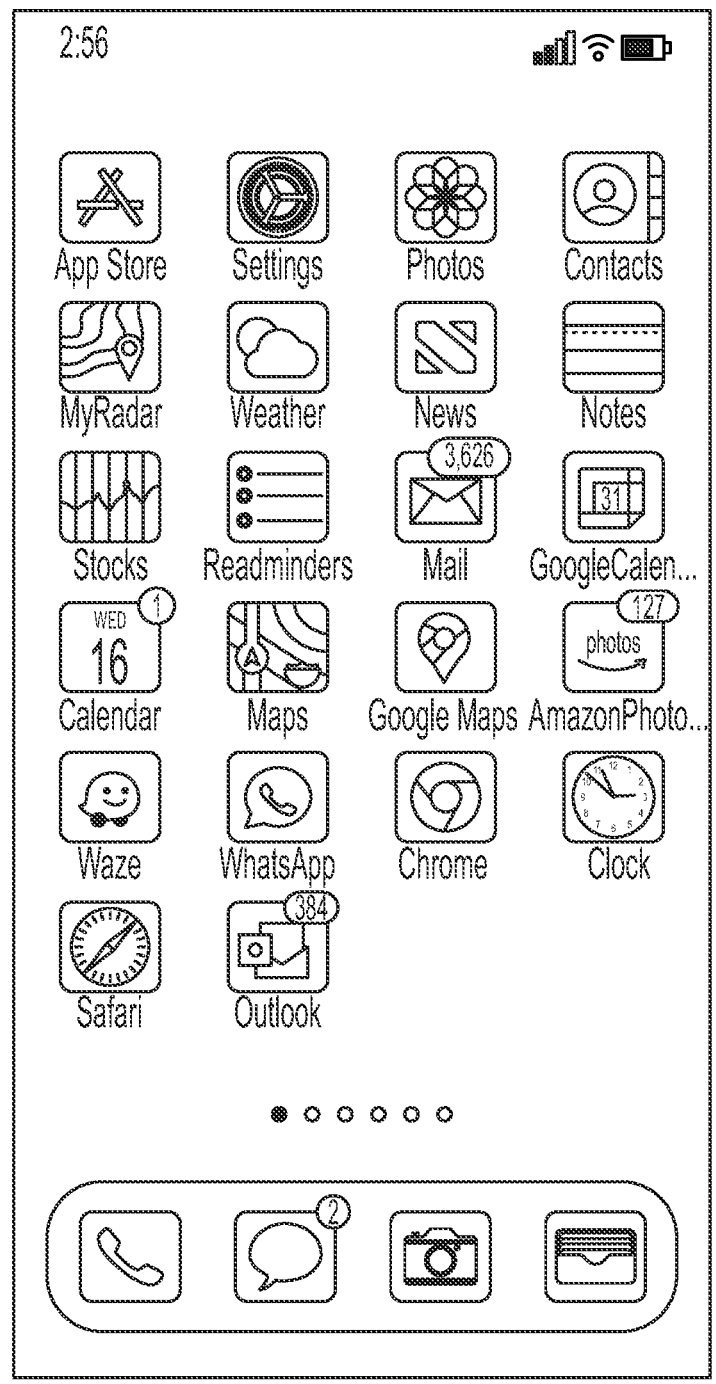
Figure 5E:
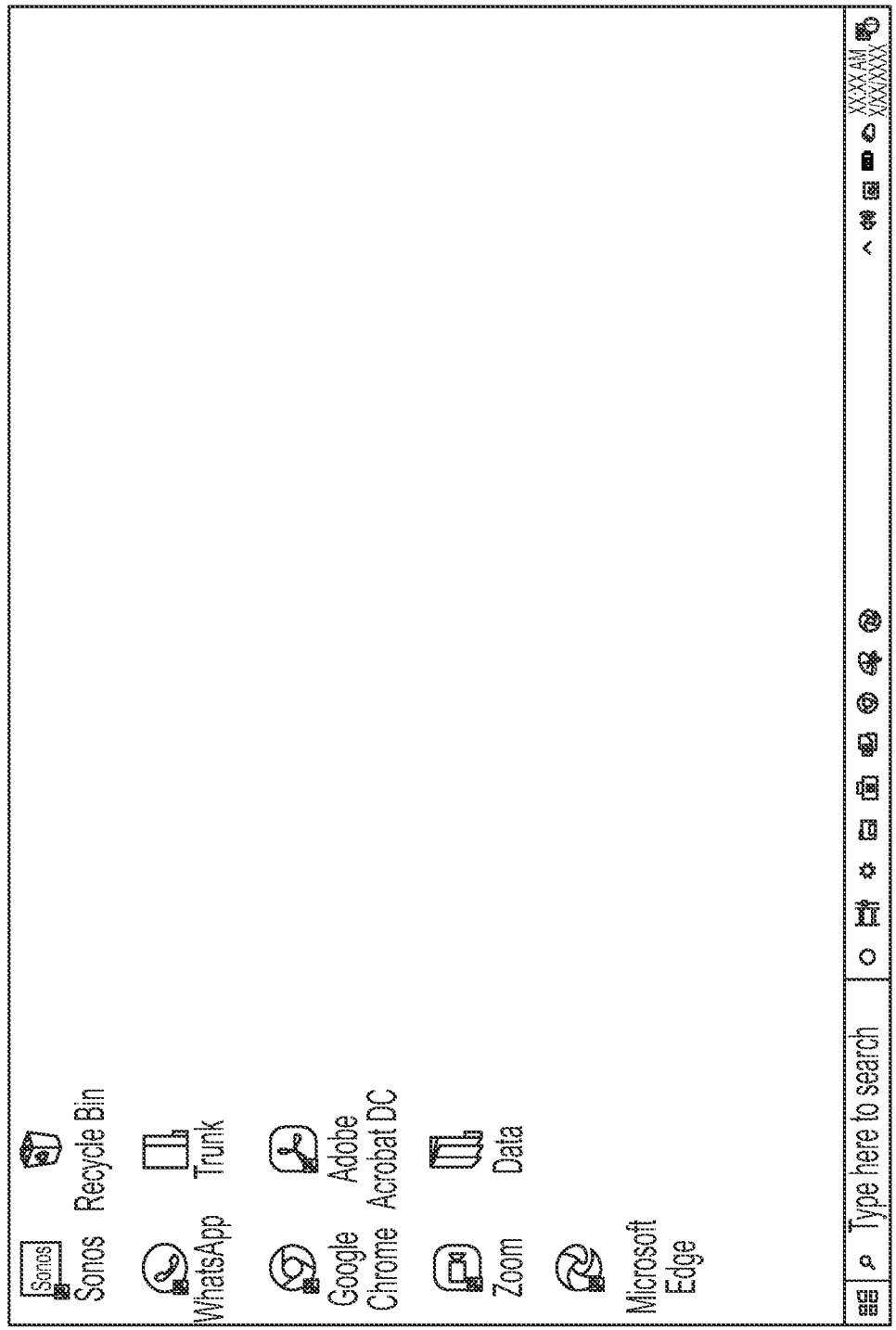

For example, FIG. 5B illustrates an exemplary "Sign-in" image screen for a console computer device, such as an Xbox, Playstation, Wii, Switch or any other suitable console computer. In some embodiments, target unit interaction software analyzes the image data output by the console target unit to determine if one or more key words are present on the image screen. For example, the video analysis engine 462 using one or more of the techniques disclosed herein analyzes the image screen illustrated in FIG. 5B and determines that the key word "sign in" is included in the image screen. In some embodiments, target unit interaction software analyzes the image screen illustrated in FIG. 5B and determines that the key word "sign in" is included in the image screen at a certain location (x,y) or certain region (x,y) in the bitmap of the image screen. For example, with reference to FIG. 5B, if the console target unit is an Xbox, target unit interaction software may analyze one or more image screens to identify the key word "sign-in" in the image screen or at a certain location in the image screen. For example, with reference to FIG. 5C, if the console target unit is a PlayStation, target unit interaction software may analyze one or more image screens to identify the key words "Welcome Back" in the image screen or at a certain location in the image screen. For example, with reference to FIG. 5D, if the target unit is an iPhone, target unit interaction software may analyze one or more image screens to identify one or more key words "App Store", "Settings", "Contacts", "Calendar" or any suitable word in the image screen or at a certain location in the image screen. For example, with reference to FIG. 5E, if the target unit is a PC running Windows OS, target unit interaction software may analyze one or more image screens to identify one or more icons, segmentation(s) of icons in the image screen or at a certain location in the image screen, or one or more words such as "Search" or any other suitable word in the image screen or at a certain location in the image screen. For example, with reference to FIG. 5P, if the target is a Mac running MacOS, target unit interaction resetting program 500 may analyze one or more images to identify one or more icons, one or more segmentations of icons in the image screen or at a certain location or locations in the image screen, or one or more words (e.g., "Reinstall" or "Disk Utility") or any other suitable word, image or icon in the image screen.

In some embodiments, the determination that a particular word has been identified on a particular image screen is utilized to confirm that a successful connection has been established between the user device 102 and the console 104. In some embodiments, if a successful connection cannot be established by video analysis as disclosed herein, target unit interaction software goes back to step 510. In some embodiments, in response to target unit interaction software determining that a successful connection is established between the user device 102 and the console 104 by determining that a word, image and/or phrase is present in an image screen as discussed herein, target unit interaction software automatically moves to step 530.

In some embodiments, if an image output may not be obtained from the target unit 104, a digital camera input device connected to a user device 102 may be positioned over the target unit 104 (e.g., an older phone) such that video capture may be performed by from the image data output by the camera. In these embodiments, target unit interaction software would operate in a similar manner as disclosed herein as older target units may still affect a connection to user device 102 via an input cable (e.g., USB cable) or other connection means (Wi-Fi, Bluetooth, etc.) that enables manipulation of the target unit via this connection.

In step 530, target unit interaction software transmits HID (Human Interface Commands) commands to interact with the target unit 104 and to control the target unit 104 to generate and/or navigate to a desired image screen. HID commands are software commands which emulate a human computer input device. For example, human computer input devices that may be emulated by the HID commands to interact with and control one or more target units 104. For example, human computer input devices may include one or more of a game controller, joystick, keyboard, mouse, touch pad, touchscreen, stylus, light pen, trackball, trackpoint or any other suitable device that is suitable to perform the functionality disclosed herein. For example, in some embodiments, one or more HID commands are transmitted from a USB interface included in one or more user devices 102 to one or more target units 104 which, in turn, enable the target units to be controlled to automatically perform certain functions without a human user sending commands to the target unit via a human computer input device. In other words, HID commands are transmitted from one or more user devices 102 to one or more target units 104 without a human user manipulating, for example, a keyboard, a mouse or any other human computer input device to control the target unit. For example, in some embodiments, one or more HID commands transmitted from a USB interface included in one or more user devices 102 are encoded as hexadecimal strings, providing a compact means of completely representing the HID commands transmitted from the relevant user device 102.

For example, in some embodiments, target unit interaction software transmits one or more HID commands to control the target unit 104 to generate and/or navigate to an image screen, such as, for example, a "Settings" image screen or screen that provides similar functionality and/or options, that provides an option and/or functionality to reset the target unit 104 to another configuration. For example, in one or more embodiments, the target unit may be reset to a factory configuration (i.e., "factory reset"). In one or more embodiments, the target unit may be reset to a customer configuration. In one or more embodiments, the target unit may be reset to a configuration which allows the computer to be removed from service. As one having skill in the art with the benefit of this specification understands, the particular image screens that a target unit may provide and, thus, the particular image screen that provides an option and/or functionality to reset the target unit 104 to another configuration, is dependent upon the target unit's OS (e.g., Windows, iOS, Android, MacOS, Gaming Console OS, etc.).

Figure 5F:
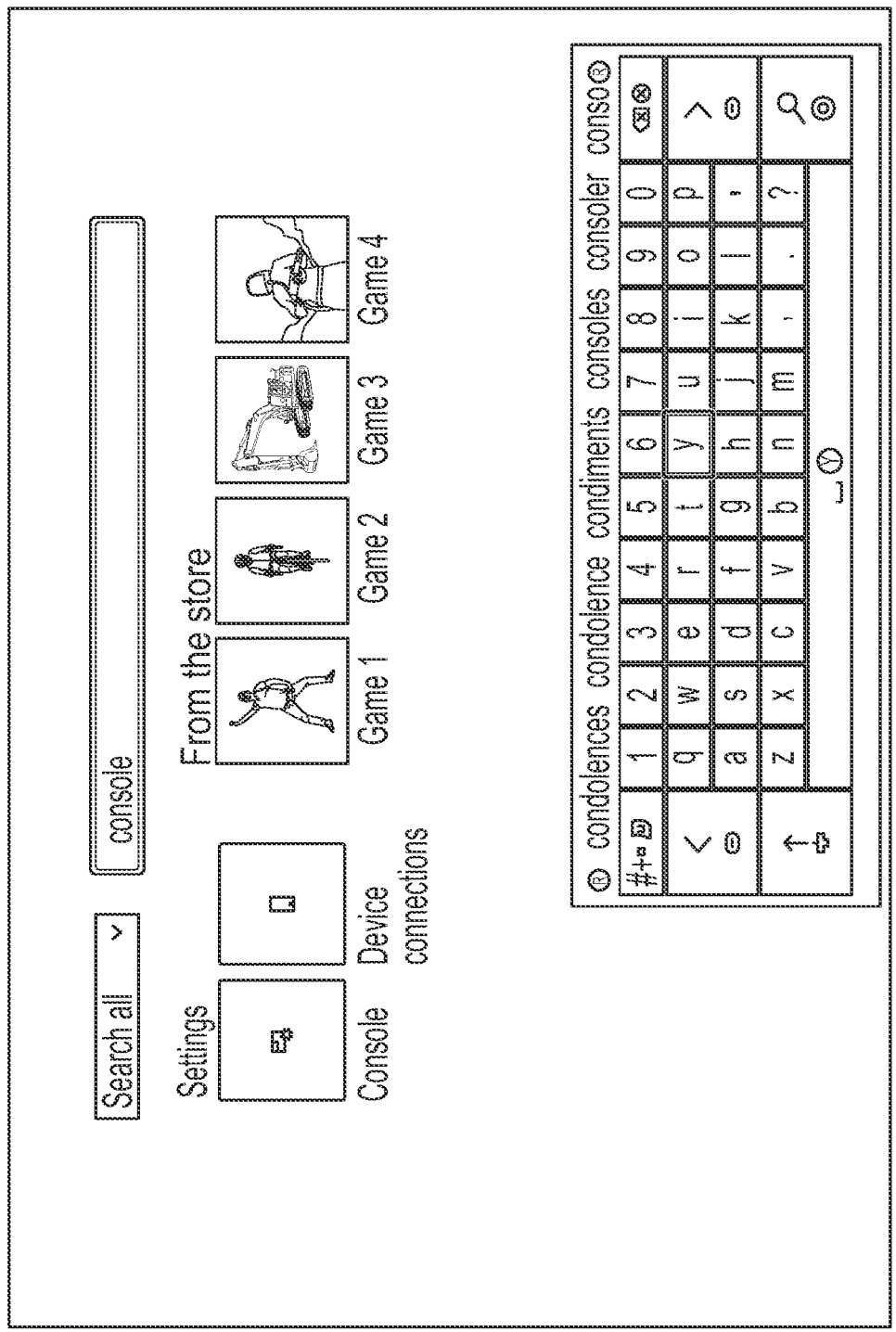

In some embodiments, target unit interaction software may also transmit HID commands to utilize the search function of a target unit to reach a desired image screen such as, for example, the particular image screen that a target unit may provide and, thus, the particular image screen that provides an option and/or functionality to reset the target unit 104 to another configuration. For example, with reference to FIG. 5F, in some embodiments, the HID commands emulate an input device to control one or more target console units (e.g., Xbox, Play Station, Nintendo Wii and/or Nintendo Switch) to generate or navigate to a desired image screen. FIG. 5F illustrates an exemplary search image screen that may be provided by a target console unit when receiving one or more HID commands that controls the target console unit to provide the search image screen. For example, in some embodiments, one or more exemplary console target units 104 are configured to receive one or more HID commands that a emulate "Y" keyboard input that controls the one or more target console units to generate or navigate to a "Search" image screen, as illustrated FIG. 5F. In this example, once the desired "Search" image screen has been provided by the exemplary console target unit, HID commands will automatically be transmitted to the console target unit to input the word "console" into the search box, as illustrated in FIG. 5F, which in turn will control the target console unit to provide the "Console" image screen. For example, in some embodiments, the "Console" image screen is an image screen that provides an option and/or functionality to reset the exemplary target console unit 104 to another configuration.

Figure 5G:

For example, with reference to FIG. 5G, in some embodiments, the HID commands emulate an input device to control one or more target smartphone units (e.g., iPhone, Android phone, or any other smartphone configured to function as disclosed herein) to generate or navigate to a desired image screen. FIG. 5G illustrates an exemplary search image screen that may be provided by a target smartphone unit when receiving one or more HID commands that controls the target smartphone unit to provide the search screen. For example, in some embodiments, one or more target smartphone units 104 are configured to receive one or more HID commands that emulate one or more of 1) a "Tab G" via one or more keyboard inputs that controls the target smartphone unit to enable gestures, 2) a "Down arrow key" via one or more keyboard inputs, 3) the phrase "settings" input into the search window via one or more keyboard inputs, 4) a "Tab G" via one or more keyboard inputs that controls the target smartphone unit to disable gestures, 5) a "Down arrow" via one or more keyboard inputs, and 6) a "Space bar" via one or more keyboard inputs that controls the one or more target smartphone units to generate or navigate to a "Search" image screen, as illustrated FIG. 5G. In this example, once the desired "Search" image screen has been provided by the smartphone target unit, HID commands will automatically be transmitted to the smartphone target unit to input the word "settings—Open" into the search box, as illustrated in FIG. 5G, which in turn will control the target smartphone unit to provide the "Settings" image screen. For example, in some embodiments, the "Settings" image screen is an image screen that provides an option and/or functionality to reset the exemplary target smartphone unit 104 to another configuration. One having ordinary skill in the art with the benefit of this specification understands that a target PC device may also be controlled in a similar manner as disclosed with respect to the exemplary target console units and/or the exemplary target smartphone units. For example, in some embodiments, HID commands may be transmitted from one or more user devices 102 to one or more target PC devices running a Windows OS to control the one or more target PC devices to provide a "Search" image screen. For example, in some embodiments, target unit interaction software may also automatically transmit one or more HID commands to one or more target PC devices that 1) cause the phrase "Reset This PC" to be input into a search bar and, thereafter, 2) cause the keyboard input "Enter" to be transmitted to the one or more target PC devices to, in turn, control the one or more target PC devices to provide the "Settings" image screen. For example, in some embodiments, the "Settings" image screen is an image screen that provides an option and/or functionality to reset the exemplary target smartphone unit 104 to another configuration.

In step 540, target unit interaction software confirms that the one or more target units has provided the correct image screen. In some embodiments, target unit interaction software uses video analysis to confirm that the one or more target units has provided the correct image screen. For example, in some embodiments, target unit interaction software uses video analysis to confirm that the one or more target units has provided an image screen wherein that provides an option and/or functionality to reset the respective target unit 104. In some embodiments, for example, the image data included in the image screen is processed by the video analysis engine 462 utilizing one or more engines and one or more techniques disclosed herein with respect to the OCR software engine, image comparison engine and key marker recognition engine to analyze the image data and identify one or more key words that are included in certain image screens output by the target unit using one or more techniques disclosed herein. For example, in some embodiments, once a word (e.g., a single character, string of characters, symbol, ASCII characters, numeric characters, different types of foreign characters (e.g., Kanji, Hiragana, Katakana), and/or any other symbol/character that is suitable to convey an idea or assist in conveying an idea) and the bitmap coordinates for that word included in the image screen being analyzed are identified, the word is compared to a list of known key words, screen names and/or word positions associated with a known screen to determine if a user device has successfully navigated to the desired image screen. If target unit interaction software determines that the perspective user device 102 has successfully commanded the perspective target unit 104 to navigate to the desired image screen, target unit interaction software automatically moves to step 550. Alternatively, if target unit interaction software determines that the perspective user device 102 has unsuccessfully commanded the perspective target unit 104 to navigate to the desired image screen, target unit interaction software automatically repeats to step 530.

Figure 5H:
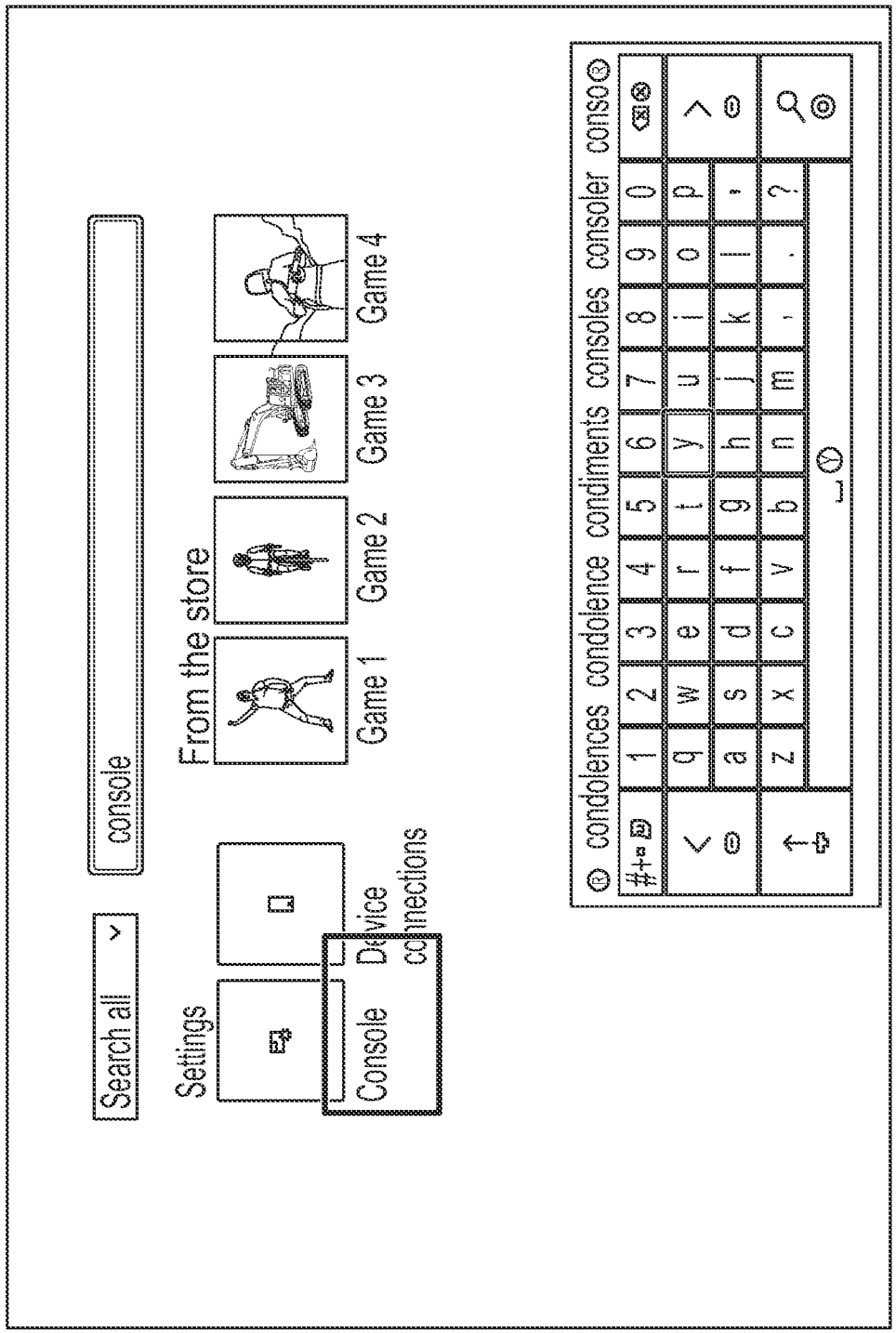
Figure 5I:
Figure 5J:
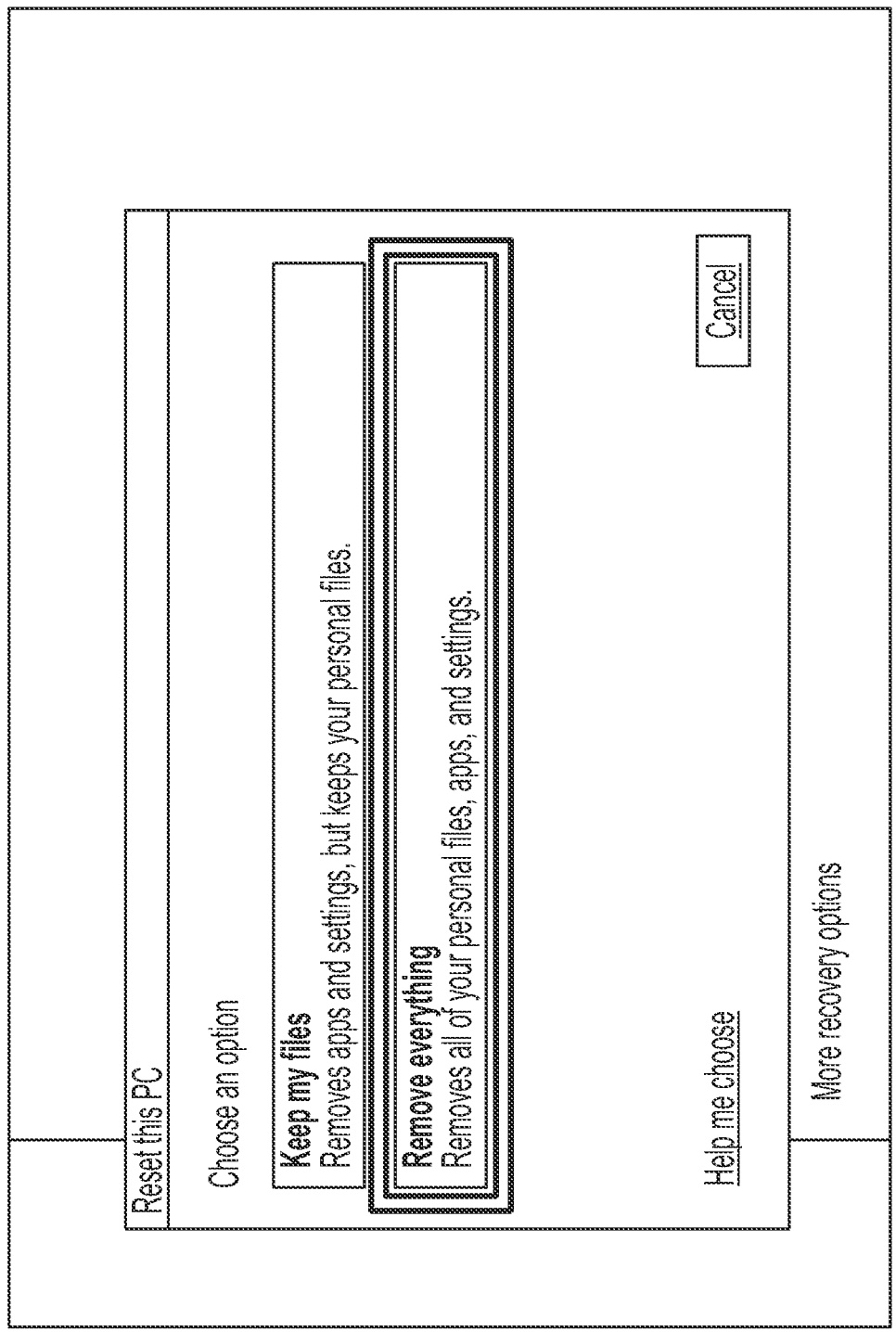
Figure 5K:
Figure 5L:
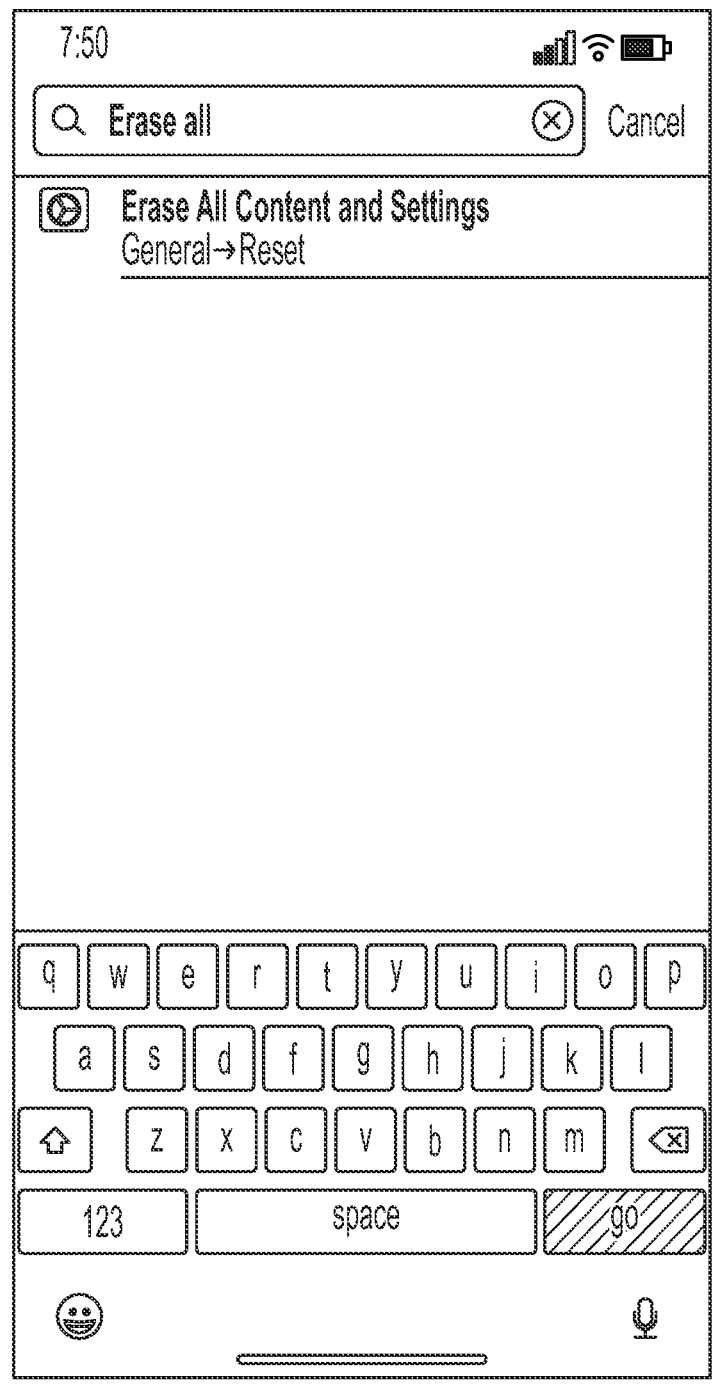
Figure 5M:
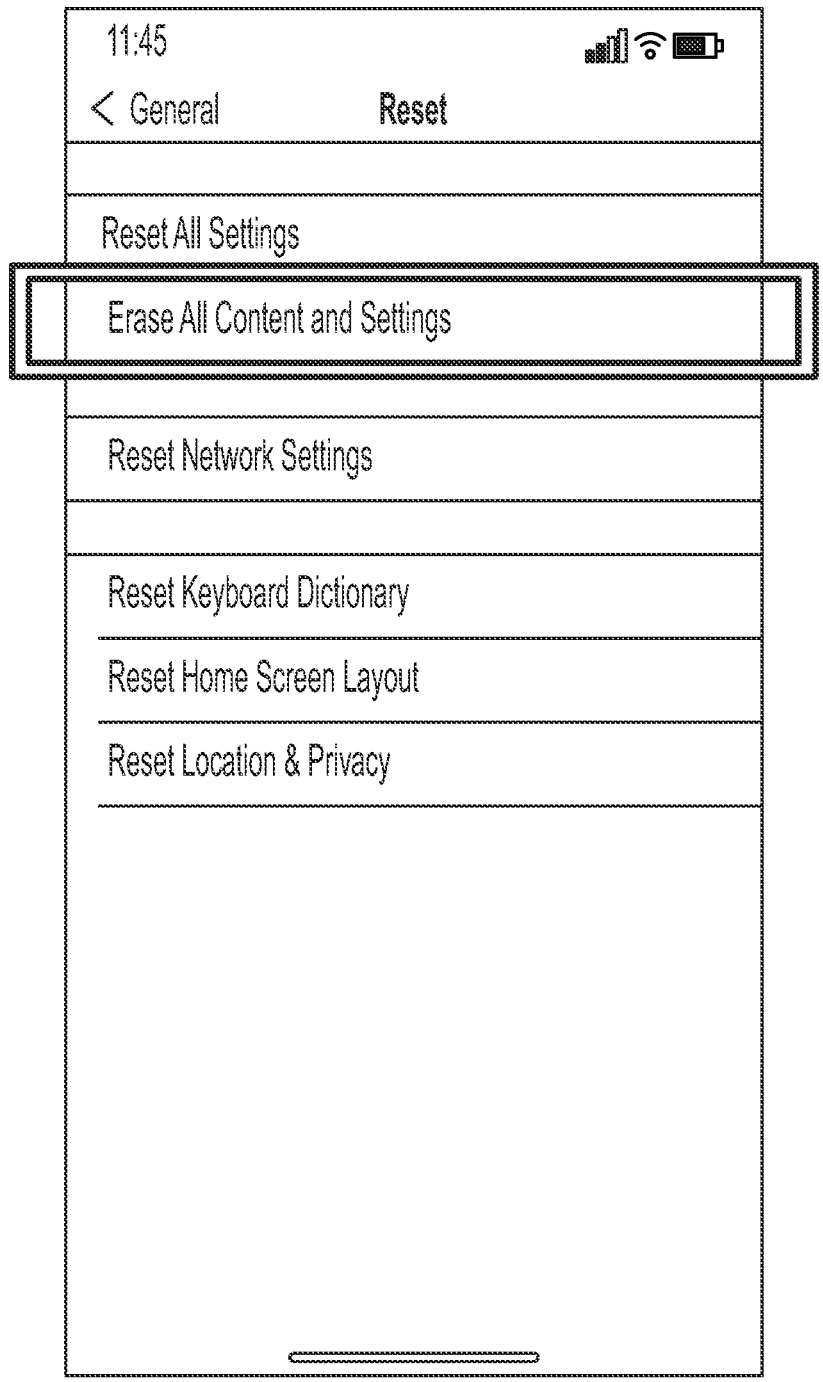
Figure 5N:
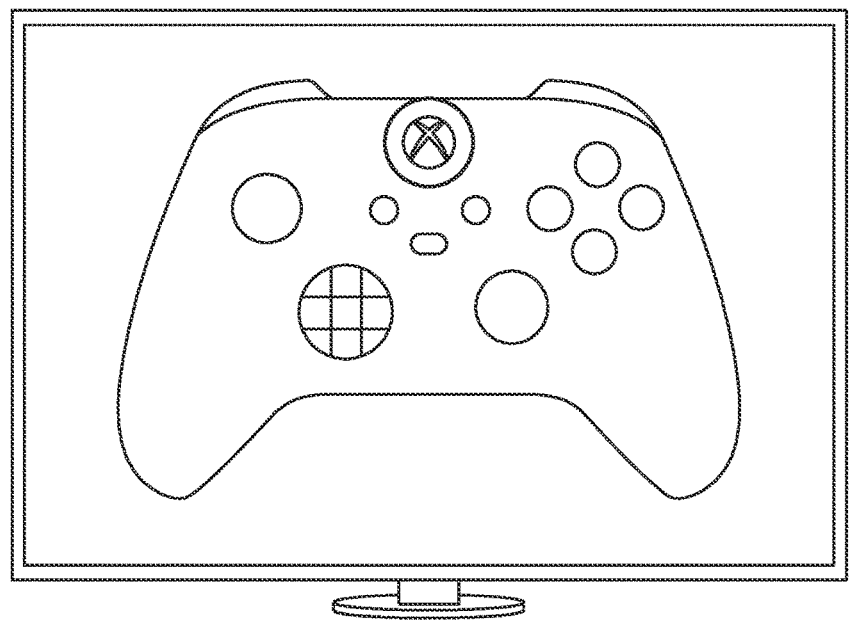
Figure 5O:
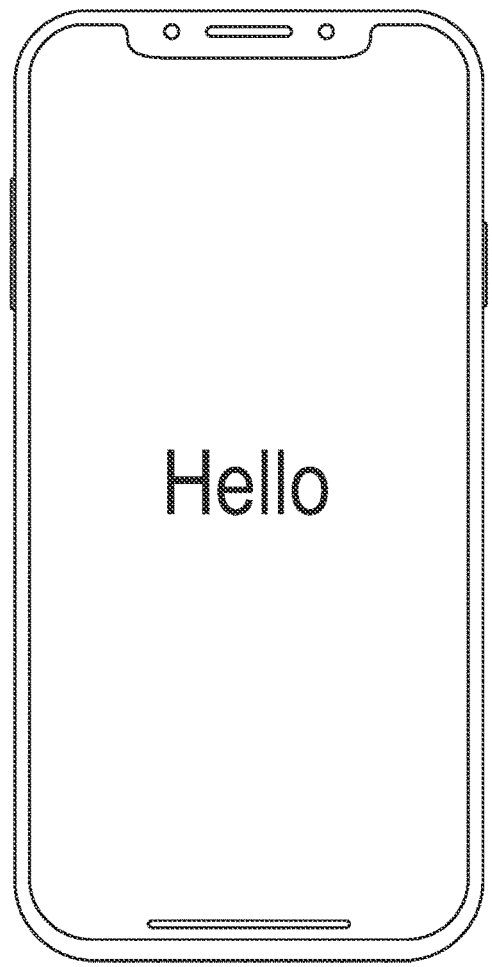
Figure 5P:
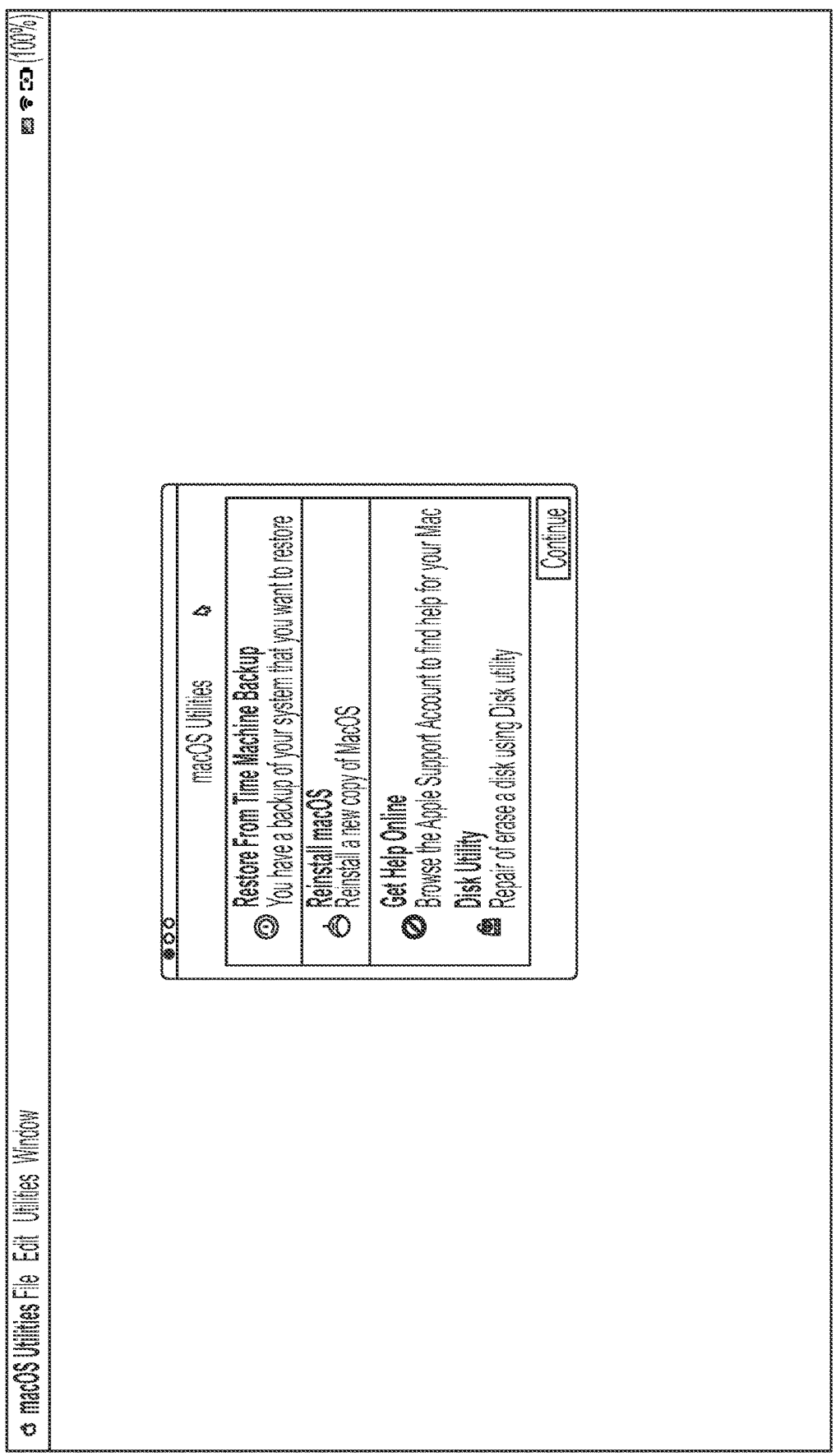

FIG. 5H illustrates an exemplary "Settings" image screen for an exemplary target console unit. For example, in some embodiments, target unit interaction software uses video analysis to confirm that the word "Console" is included in the screen image provided by the exemplary perspective target console unit to the perspective one or more user devices 102. In some embodiments, target unit interaction software uses video analysis to confirm that the word "Console" is included in the screen image provided to the perspective one or more user devices 102 at a certain (x,y) coordinate position or, in some embodiments, a coordinate area. FIG. 5I illustrates an exemplary "Settings" image screen for an exemplary target smartphone unit. For example, in some embodiments, target unit interaction software uses video analysis to confirm that the word "settings" is included in the screen image provided by the exemplary perspective target smartphone unit to the perspective one or more user devices 102. For example, in some embodiments, target unit interaction software uses video analysis to confirm that the word "settings" is included in the screen image provided by the exemplary perspective target smartphone unit to the perspective one or more user devices 102 at a certain (x,y) coordinate position or, in some embodiments, a coordinate area. FIG. 5J illustrates an exemplary "Reset" image screen for an exemplary target PC device. For example, in some embodiments, target unit interaction software uses video analysis to confirm that the word "Remove Everything" is included in the exemplary "Reset" image screen provided by the exemplary perspective target PC device to the perspective one or more user devices 102. For example, in some embodiments, target unit interaction software uses video analysis to confirm that the word "Remove Everything" is included in the exemplary "Reset" image screen provided by the exemplary perspective target PC device to the perspective one or more user devices 102 at a certain (x,y) coordinate position or, in some embodiments, a coordinate area.

Figure 5Q:
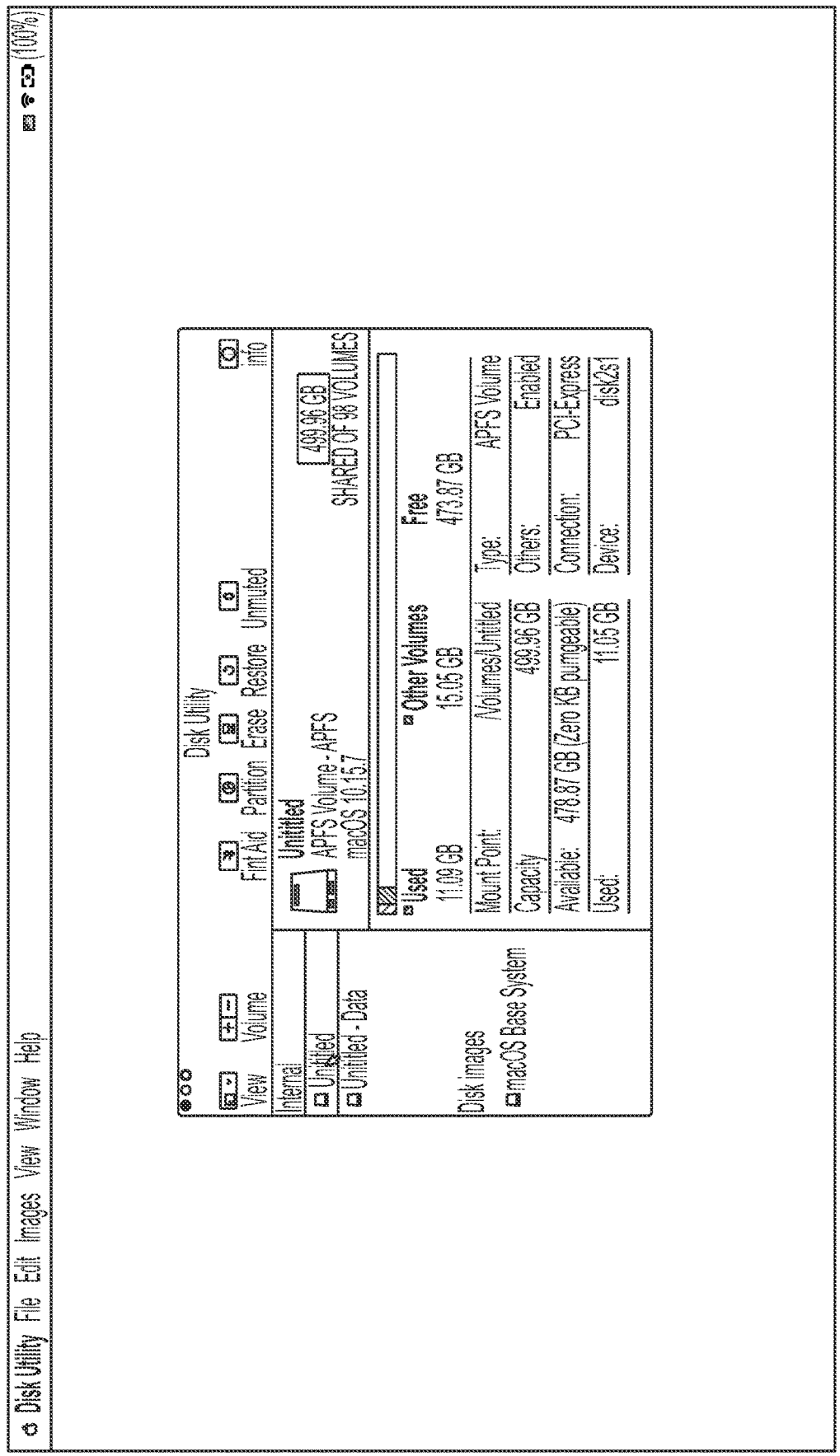
Figure 5R:
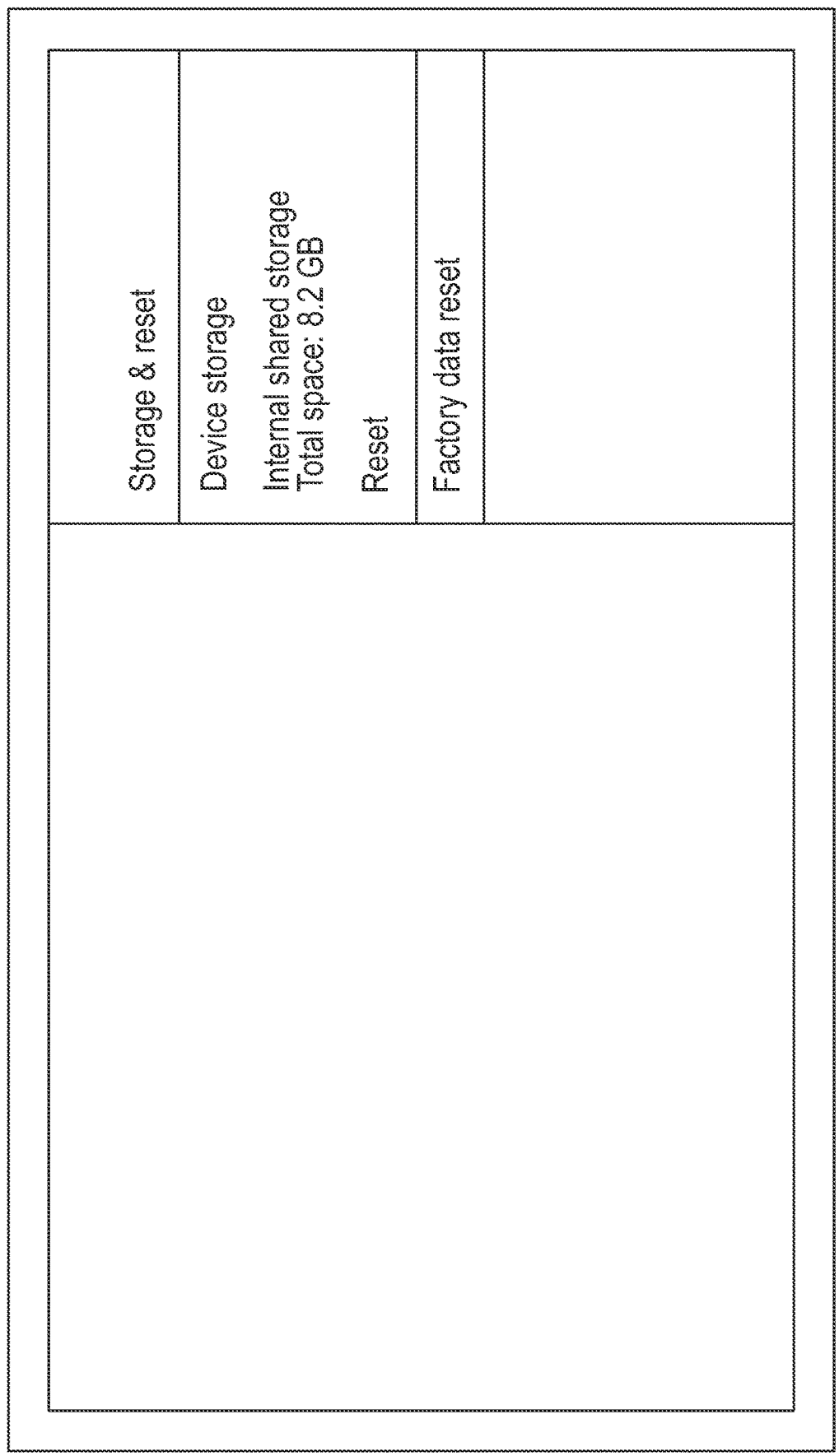

For example, FIG. 5Q illustrates an exemplary "Reset" image screen for an exemplary target Apple Macintosh running (MacOS). For example, if the target device 104 is an Apple Macintosh device, in some embodiments, target unit interaction resetting program 500 may use video analysis to confirm that the word "Erase" is included in a "Reset" image screen provided by the exemplary target Apple Macintosh device to one or more user devices 102, as disclosed with respect to FIG. 4A-FIG. 4E. For example, in some embodiments, target unit interaction resetting program 500 uses video analysis to confirm that the word "Erase" is included in a "Reset" image screen provided by the perspective target Apple Macintosh device to the perspective one or more user devices 102 at a certain (x,y) coordinate position or, in other embodiments, a coordinate area. For example, FIG. 5R illustrates an exemplary "Reset" image screen for an exemplary Smart Television, a target device 104 that, for example, may run Android OS or another suitable operating system. For example, in some embodiments, target unit interaction resetting program 500 uses video analysis to confirm that the word "Factory Data Reset" is included in a "Reset" image screen provided by an exemplary perspective target Apple Macintosh device to the perspective one or more user devices 102. For example, in some embodiments, target unit interaction resetting program 500 uses video analysis to confirm that the word "Factory Data Reset" is included in a "Reset" image screen provided by a perspective target Apple Macintosh device to the perspective one or more user devices 102 at a certain (x,y) coordinate position or, in some embodiments, a coordinate area.

In step 550, target unit interaction software uses HID commands to position a pointer (e.g., cursor, highlighter, selector, highlighted bar, or any other suitable digital element that is utilized to select one or more options to be performed via a menu, drop box or other structure that provides functional options to a user) to select an option that changes one or more configurations of one or more target units 104. For example, in some embodiments, target unit interaction software uses HID commands to position a pointer to select an option that resets one or more configurations, as disclosed herein, of one or more target units 104. For example, in some embodiments, target unit interaction software uses HID commands to position a pointer to select an option that erases desired data in one or more memory devices included in perspective one or more target units 104.

FIG. 5K illustrates an exemplary "System Console info" image screen for an exemplary target gaming console unit. For example, in some embodiments, target unit interaction software transmits one or more HID commands that causes the pointer to select the "Reset console" option included in the "Reset" image screen. For example, in some embodiments, the HID commands transmitted to the exemplary target console unit 104 emulate the following keyboard keystrokes: 1) Tab; 2) Enter; and 3) Tab. As illustrated in FIG. 5K, the aforementioned emulated keystrokes control the pointer to select the "Reset Console" option.

FIG. 5L illustrates an exemplary "Settings" image screen for an exemplary target smartphone unit. For example, in some embodiments, target unit interaction software transmits one or more HID commands that causes the pointer to select the "Erase All Content and Settings" option included in the exemplary "Settings" image screen. For example, in some embodiments, the HID commands transmitted to the exemplary target smartphone unit 104 emulate the following keyboard keystrokes: 1) Up arrow (to place the pointer in search window); 2) "Erase all"; 3) Down arrow; and 4) Space Bar. As illustrated in FIG. 5L, the aforementioned emulated keystrokes control the pointer (e.g., cursor) to type the phrase "Erase all" in the Search bar, and, thereafter, provide the "Erase All Content and Settings" option included in the exemplary "Settings" image screen. One having ordinary skill in the art with the benefit of this specification understands that similar functionality may be utilized to select a reconfiguration option for a target PC unit, including an option to reset one or more configurations, and/or an option to erase data from one or more memory devices included in the target PC unit.

In some embodiments, target unit interaction software automatically performs optional step 555 to confirm that the desired option in step 550 has been successfully selected. In some embodiments, target unit interaction software automatically performs optional step 555 to confirm that the pointer has successfully selected the desired option in step 550. In some embodiments, target unit interaction software skips optional step 555 and automatically moves to step 560. In some embodiments, if the pointer has unsuccessfully selected the desired option in step 550, target unit interaction software automatically repeats step 550. In some embodiments, target unit interaction software uses video analysis to confirm that the pointer has successfully selected the desired option in step 550. For example, in some embodiments with respect to a target gaming console unit 104, target unit interaction software uses video analysis to confirm that the word "Reset Console" is included in the screen image provided by the exemplary perspective target console units to the perspective one or more user devices 102 (e.g., FIG. 5K). In some embodiments, target unit interaction software uses video analysis to confirm that the word "Reset Console" is included in the screen image provided by the exemplary perspective target gaming console units to the perspective one or more user devices 102 at a certain (x,y) coordinate position or, in some embodiments, a coordinate area. In some embodiments, target unit interaction software uses video analysis to confirm that the word "Reset Console" is included in the screen image provided by the exemplary perspective target gaming console units to the perspective one or more user devices 102 and highlighted.

FIG. 5M illustrates an exemplary "Reset" image screen for an exemplary target smartphone unit 104. For example, in some embodiments with respect to a target smartphone unit 104, target unit interaction software uses video analysis to confirm that the word "Erase All Contents and Settings" is included in the screen image provided by the exemplary perspective target smartphone units to the perspective one or more user devices 102. In some embodiments, target unit interaction software uses video analysis to confirm that the word "Erase All Contents and Settings" is included in the screen image provided by the exemplary perspective target smartphone units to the perspective one or more user devices 102 at a certain (x,y) coordinate position or, in some embodiments, a coordinate area. In some embodiments, target unit interaction software uses video analysis to confirm that the word "Erase All Contents and Settings" is included in the screen image provided by the exemplary perspective target smartphone units to the perspective one or more user devices 102 and highlighted. One having ordinary skill in the art with the benefit of this specification understands that similar functionality disclosed herein with respect to target gaming console units and target smartphone units may be utilized to confirm that the pointer has successfully selected the desired option in step 550 for a target PC unit, including an option to utilize video analysis using the techniques disclosed herein.

In step 560, target unit interaction software automatically executes the option selected in step 550 by transmitting one or more HID commands to the one or more perspective target units. In some embodiments, target unit interaction software automatically executes the option selected in step 550, after confirmation has been received in step 555 that step 550 has been successfully performed, by transmitting one or more HID commands to the one or more perspective target units. In some embodiments, target unit interaction software executes the "Reset" option for one or more target units 104.

FIG. 5K illustrates an exemplary "System Console info" image screen for an exemplary target gaming console unit. For example, in some embodiments, target unit interaction software transmits one or more HID commands that causes the execution of the "Reset Console" option included in the "System Console info" image screen. For example, in some embodiments, the HID commands transmitted to the exemplary target gaming console unit 104 emulate the following keyboard keystrokes: 1) Return; 2) Left Arrow; 3) Left Arrow; and 4) Return. In these embodiments, the aforementioned emulated keystrokes control the respective one or more target gaming console units to execute the "Factory Reset" option (e.g., Reset Console option) to change one or more configurations of the respective one or more target gaming console units, as disclosed herein.

FIG. 5M illustrates an exemplary "Settings" image screen for an exemplary target smartphone unit, namely the "Reset" image screen. For example, in some embodiments, target unit interaction software transmits one or more HID commands that causes the execution of the "Erase All Contents and Settings" option included in the "Reset" image screen. For example, in some embodiments, the HID commands transmitted to the exemplary target smartphone unit 104 emulate the following keyboard keystrokes: 1) Down Arrow; 2) Down Arrow; and 3) Space Bar. In these embodiments, the aforementioned emulated keystrokes control the respective one or more target smartphone units to execute the "Factory Reset" option (e.g., Erase All Contents and Settings option) to change one or more configurations of the respective one or more target gaming console units, as disclosed herein. One having ordinary skill in the art with the benefit of this specification understands that similar functionality may be utilized to execute a reconfiguration option for a target PC unit, including an option to reset one or more configurations, and/or an option to erase data from one or more memory devices included in the target PC unit.

In step 570, in response to the execution of the desired option in step 560, target unit interaction software automatically confirms that the desired option selected in step 550 was executed. In some embodiments, in response to the execution of the desired option in step 560, target unit interaction software automatically confirms that the desired option selected in step 550 was executed by utilizing video analysis. For example, in some embodiments, the video analysis will utilize the techniques disclosed herein to examine one or more output images output by the target unit in response to the desired option being executed. For example, in some embodiments wherein the "Factory Reset" option was executed for one or more target gaming console units 104, one or more video analysis techniques disclosed herein may be utilized to determine if the exemplary image illustrated in FIG. 5N of an exemplary gaming console gaming controller has been output by the relevant target gaming console unit 104. For example, in some embodiments wherein the "Factory Reset" option was executed for one or more target smartphone units 104, one or more video analysis techniques disclosed herein may be utilized to determine if the exemplary image illustrated in FIG. 5O of an exemplary word "Hello" has been output by the relevant target smartphone unit 104. In some embodiments, if target unit interaction software does not successfully confirm that step 560 has been performed, target unit interaction software repeats step 560. In some embodiments, the exemplary image illustrated in FIG. 5P depicts a utilities interface that displays multiple options for a user to select from. For example, there is a "Restore From Time Machine Backup" that provides a back of a computing system that is desired to be restored; a "Reinstall macOS" that provides an ability to reinstall a new copy of MacOS on the computing device; a "Get Help Online" that allows a plurality of users to browse a support account to find help for the computing device; and a "Disk Utility" that provides a repair of erased disk. In some embodiments, the exemplary image illustrated in FIG. 5Q depicts a graphical user interface associated with "Disk Utility" that provides a plurality of parameters that details "View", "Volume", "Fint Aid", "Partition", "Erase", "Restore", "Unmuted", and "Info" options. This graphical user interface further depicts the version of the macOS associated with the computing device, a name associated with the "Volume" and an amount of memory used. For example, there is 11.09 GB of Used classified associated with a plurality of parameters, 15.05 GB of Other Volumes, and 473.87 GB of Free space in memory. The parameters may include type, connection, device, capacity, available, used, and mount point. In some embodiments, the exemplary image illustrated in FIG. 5R depicts a graphical user interface associated with "Storage & Reset" that further details the storage associated with the computing device, the internal shared storage associated with the computing device, and a "Reset" function that would factory reset the computing device. For example, the total space of 8.2 GB may be displayed with the graphical user interface under internal shared storage.

Figure 6A:
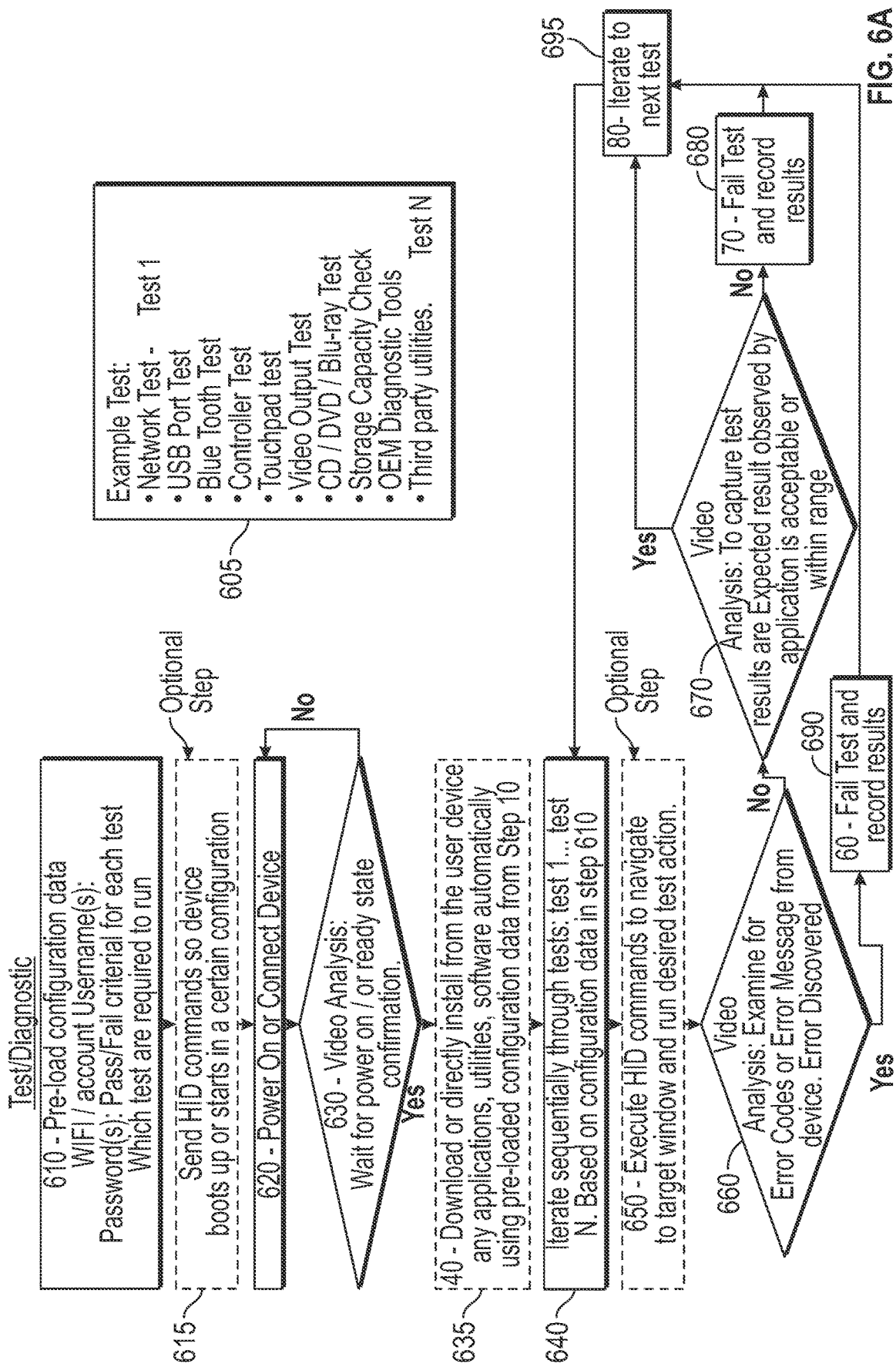

FIG. 6A is a flowchart depicting operational steps for a target unit interaction diagnostics program 600. In some embodiments, target unit interaction diagnostics program 600 may utilize OEM software. In some embodiments, the target unit interaction diagnostics program 600 may be implemented in hardware utilities. In some embodiments, the target unit interaction diagnostics program 600 may be implemented in a combination of one or more software modules and hardware components. For example, the target unit interaction diagnostics program 600 may operate to diagnose the health and/or state of one or more hardware components included in the one or more target units such that the target units. For example, in some embodiments, the target unit interaction diagnostics program 600 is executed on one or more processors 204 performs diagnoses to diagnose the health and/or state of one or more hardware components included in the one or more target units such that the target units to prepare the one or more target units to be re-used, re-programmed and/or re-tasked for a specific purpose. In some embodiments, the target unit interaction diagnostics program 600 may be utilized to automatically download and execute software, including an operating system, BIOS, or utilities. In some embodiments, the target unit interaction diagnostics program 600 is utilized to use video image analysis to capture information concerning one or more target units. For example, the target unit interaction diagnostics program 600 may be utilized to capture health information and/or error codes generated by one or more devices included in the one or more target units and/or software stored or executing in the one or more target units. For example, health information may be native language text (e.g., "ok"), alphanumeric code, or image elements such as, for example, a simple check mark, field data, selected button (e.g., radio button, or any other type of image element that may be selected by a user), or other image elements known to persons skilled in the art with the benefit of this specification. In some embodiments, a user device 102 may confirm the health of a one or more target devices 104 by confirming expected behavior of the one or more devices when interacting with specific functionality of device components, such as, for example, USB or network ports (e.g., WIFI port(s)). In some embodiments, the target unit interaction diagnostics program 600 may be utilized to download and update the operating system, and/or specific applications of one or more target units 104 to ensure the device is functioning properly.

In step 610, target unit interaction diagnostics program 600 configuration data is loaded. For example, configuration data may include network credentials, user credentials, and/or one or more sequences of tests to be executed against the target unit 104. For example, potential tests which may be performed on one or more target units 104 may include Test 1 through Test N, as depicted in list 605. For example, Test 1 through Test N may include a network test, USB port test, Bluetooth test, controller test, touchpad test, video output test, Blu-ray, CD/DVD, CD and/or DVD test, storage capacity test, OEM diagnostic tools testing, and/or third-party utilities. One having skill in the art with the benefit of this specification understands that the configuration data may include data obtained by a number of additional tests may be performed on the one or more target units 104.

In some embodiments, in optional step 615, HID commands are issued. For example, in some embodiments, HID commands are issued at the start of the execution of one of the unit interaction diagnostics program 600, or the unit interaction resetting program 500. For example, in one or more embodiments, HID commands are issued prior to and during the powering-on stage of one or more target units 104 to enable the one or more target units to start-up in certain a configuration. For example, in some embodiments, the HID commands are configured to emulate a keyboard input to start/restart a computer and/or to load a diagnostics loader menu. For example, the HID command(s) may emulate a Command (⌘)-D for an Apple computer. In some embodiments, the HID command(s) may be a keyboard function command (e.g., F1, F2, . . . F12, or some other function command that operates to perform functions on a computing device known to those skilled in the art with the benefit of this specification), and/or a combination of Ctrl-C, depending upon the type of computer receiving the commands. In some embodiments, the HID commands may be a hexadecimal string to emulate proprietary commands for a specific computing device from a particular manufacturer.

In step 620, target unit interaction diagnostics program 600 confirms the successful connection of a user device 102 to one or more target units 104 via video analysis. In some embodiments, one or more target units 104 will provide video output in the form of video and/or image data (video/image data) to the video input interface of the user device 102. In some embodiments, the video/image data received by the user device and outputted directly by the target unit may include, for example, video/image data from one or more of a VGA, S-video, DVI or HDMI connection. In some embodiments, the video/image data is processed by a video analysis engine, utilizing one or more engines, for example, of the techniques disclosed herein with respect to the OCR software engine, image comparison engine and key marker recognition engine, to analyze the video/image data and identify one or more key words that are included in certain image screens output by the one or more target units. In some embodiments, for example, the user device 102 includes a video capture card 217 for converting the video/image data into signals for rendering the same on an image renderer (e.g., internally, or on a display device connected to or part of the user device 102). In some embodiments, the video analysis engine may analyze the video/image data and generate a bit map of the data points included in each of the images output by the video capture card 217 utilizing one or more of the techniques disclosed herein to determine associated bit (x,y) coordinates of image elements (e.g., key words, or other image elements known to those skilled in the art with the benefit of this specification) included in each of the images. For example, in some embodiments, once an image element (e.g., word, a single character, string of characters, symbol, ASCII characters, numeric characters, different types of foreign characters (e.g., Kanji, Hiragana, Katakana), and/or any other symbol/character that is suitable to convey an idea or assist in conveying an idea) and the bitmap coordinates for that image element are identified, the image element is compared to a list of known image element (e.g., image element(s), key words, screen names and/or word positions associated with a known screen) to determine if a user device 102 is successfully connected to one or more target units 104 such that the user device may interact with the one or more target units to send commands and receive data from the one or more target units.

In some embodiments, when the user device 102 is connected to one or more target units 104, target unit interaction resetting program 600 determines which image screen the one or more target units 104 initially display when power is provided to the one or more target units 104 by analyzing the video/image data output by the one or more target units 104. In some embodiments, target unit interaction resetting program 600 will interact with the one or more target units 104 by making selections on an image screen provided by the one or more target units 104. In some embodiments, for example, the selections depend upon the options presented on one or more image screens provided by the one or more target units 104 to identify a particular image screen provided by the one or more target units 104 that allows the user device 102 to perform one or more certain functions.

Figure 6B:
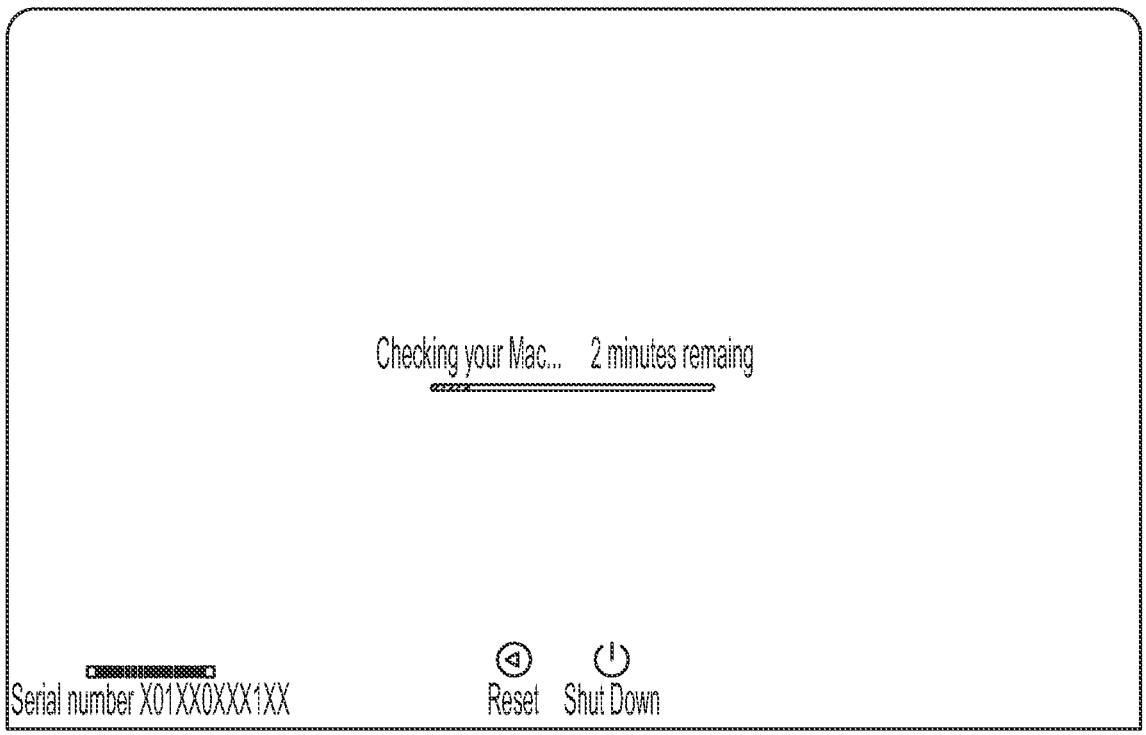

For example, FIG. 6B illustrates an exemplary embedded diagnostics screen for an Apple Mac computer. In some embodiments, target unit interaction diagnostics program 600 analyzes the image data output by the target computer to determine if one or more key words are present on the image screen. For example, the video analysis engine using one or more of the techniques disclosed herein analyzes the image screen illustrated in FIG. 6B and determines that the key word "Checking your Mac" is included in the image screen. In some embodiments, target unit interaction resetting program 600 analyzes the image screen illustrated in FIG. 6B and determines that the key word "Checking your Mac" is included in the image screen at a certain location (x,y) or certain region (x,y) in the bitmap of the image screen.

In step 630, target unit interaction resetting program 600 confirms the successful connection of the user device 102 to the one or more target units 104 via video analysis. In some embodiments, the one or more target units 104 will provide video output in the form of video/image data to the video input interface of the user device 102. For example, the video/image data received by the user device 102 and outputted directly by the one or more target units 104 may include video/image data from one or more of a VGA, S-video, DVI or HDMI connection. In some embodiments, the video/image data is processed by the video analysis engine, utilizing one or more engines of the techniques disclosed herein with respect to the OCR software engine, image comparison engine and key marker recognition engine, to analyze the video/image data and identify one or more image elements (e.g., key words or other image elements discussed herein) that are included in one or more image screens output by the one or more target units 104. For example, in some embodiments, the user device 102 includes a video capture card 217 for converting the video/image data into signals for rendering the same on an image renderer (e.g., internally, or on a display device connected to or part of the user device 102). In some embodiments, the video analysis engine may analyze the image data and generate a bit map of the data points included in each of the images output by the video capture card utilizing one or more of the techniques disclosed herein to determine associated bit (x,y) coordinates of key words included in each of the images. For example, in some embodiments, once an image element (e.g., a word, a single character, string of characters, symbol, ASCII characters, numeric characters, different types of foreign characters (e.g., Kanji, Hiragana, Katakana), and/or any other symbol/character that is suitable to convey an idea or assist in conveying an idea) and the bitmap coordinates for that image element are identified, the image element is compared to a list of known image elements (e.g., key words, image elements, screen names and/or word positions) associated with a known screen to determine if a user device is successfully connected to one or more target units such that the user device may interact with the one or more target units to send commands and receive data from the one or more target units. If a successful connection of the user device 102 to one or more target units 104 is not established, target unit interaction resetting program 600 repeats step 620. In one or more embodiments, if a successful connection of the user device 102 to one or more target units 104 is established, target unit interaction resetting program 600 may go to optional step 635. In one or more embodiments, if a successful connection of the user device 102 to one or more target units 104 is established, target unit interaction resetting program 600 goes to step 640.

In optional step 635, target unit interaction resetting program 600 downloads any applications, utilities, software and/or OEM software using configuration data that may be loaded pursuant to step 610.

In step 640, a sequence of tests 1 . . . N is pre-loaded in step 610. In some embodiments, a sequence engine is used to increment through all the individual tests. For example, one or more target units 104 may include manufacturer provided tests used to determine certain settings and/or diagnose certain components, functions, and/or software loaded on the target unit. In some embodiments, the user device 102 may be configured to execute the device manufacturers embedded test on the one or more target units 104. In some embodiments the user device 102 may execute the device manufacturers embedded test, and/or other additional tests which may diagnose and/or determine the functionality and/or performance of one or more components, functions and/or software included in one or more of the target units 104.

FIG. 6B illustrates an exemplary "Progress" image screen for an exemplary target Apple Macintosh computer. For example, in some embodiments with respect to one or more target units 104 (e.g., Apple Macintosh computer(s)), target unit interaction diagnostics program 600 analyzes the image data output by the one or more target units 104 to determine if one or more image elements (e.g., key words or other image elements disclosed herein) are present on the image screen. For example, in some embodiments, the video analysis engine using one or more of the techniques disclosed herein analyzes the image screen illustrated in FIG. 6B and determines that an image element (e.g., key word "minutes remaining") is included in the image screen. In some embodiments, target unit interaction resetting program 600, in step 660, analyzes video/image data, such as, for example, the image screen illustrated in FIG. 6B, to determine if pre-determined image elements are included in the video/image data at a certain location (x,y) or certain region (x,y) in the bitmap of the image screen. For example, target unit interaction resetting program 600 may analyze video/image data that includes the image screen illustrated in FIG. 6B to determine that the key word "minutes remaining" is included in the image screen at a certain location (x,y) or certain region (x,y) in the bitmap of the image screen. In step 660, in some embodiments, video/image data included in the image screen is analyzed to determine if diagnostics tests are still in progress and/or diagnostic(s) results are available, or not available.

In one or more embodiments, target unit interaction resetting program 600 executes optional step 650 wherein HID commands are sent to one or more target units and executed to navigate a target window and run desired testing options, as disclosed with respect to step 640.

Figure 6C:
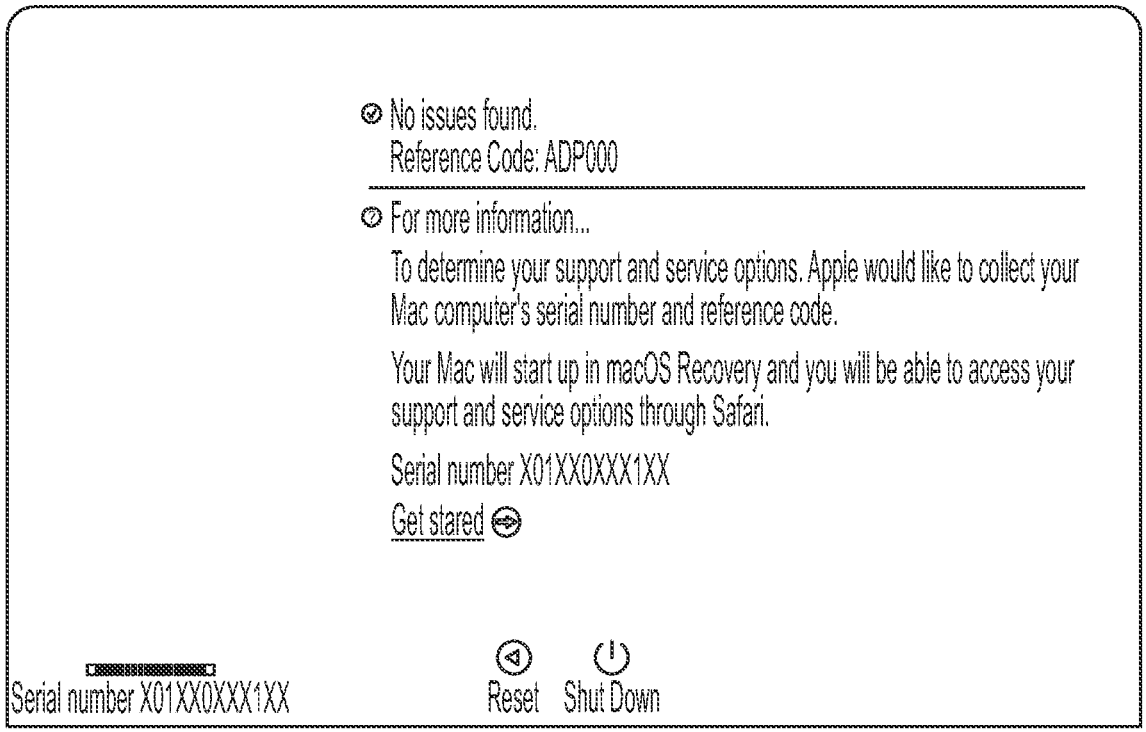

For example, FIG. 6C illustrates an exemplary embedded "Results" image screen for an exemplary target unit (e.g., Apple Macintosh computer). For example, in some embodiments, target unit interaction diagnostics program 600, in step 660, uses video analysis to confirm that an image element is included in video/image data included in a screen image provided by one or more target units 104. For example, with respect to a Apple Macintosh computer unit, video analysis is utilized, as disclosed herein, to confirm that an image element (e.g., a word "Reference Code") is included in the screen image provided by the exemplary Apple Macintosh computer target unit to the perspective one or more user devices 102. In some embodiments, target unit interaction diagnostics program 600 uses video analysis to confirm that the word "Reference Code" is included in the screen image provided by the exemplary perspective target computer units to the perspective one or more user devices 102 at a certain (x,y) coordinate position or, in some embodiments, a coordinate area. In some embodiments, target unit interaction diagnostics program 600 uses video analysis to confirm that an image element (e.g., a word "Reference Code", or codes (e.g., ADP000—No issue found, DFR001—Issue with Touchpad ID sensor, PPT002—The battery will need to be replaced soon) is/are included in the image screen data. In some embodiments, target unit interaction diagnostics program 600 uses video analysis to capture any additional data in an (x,y) coordinate position or, in some embodiments, a coordinate area. For example, with respect to a target Apple Macintosh computer unit 104, the following are exemplary codes that may be captured by the video analysis: ADP000—No issue found; DFR001—Issue with Touchpad ID sensor; and PPT002—The battery will need to be replaced soon. One having skill in the art with the benefit of this specification understands that the aforementioned codes are exemplary, and any codes displayed by one or more target units may be captured.

For example, FIG. 6D illustrates an exemplary embedded "Results" image screen for an exemplary target Lenovo personal computer. For example, in some embodiments in step 660, target unit interaction diagnostics program 600, uses video analysis to confirm that an image element (e.g., the word "Result Code") is included in the screen image data provided by one or more target units 104 to the perspective one or more user devices 102. For example, with respect to one or more target Lenovo computer units 104, target unit interaction diagnostics program 600, in step 660, uses video analysis to confirm that the word "Result Code" is included in the screen image provided by the one or more Lenovo computer units 104 to the perspective one or more user devices 102. In some embodiments, for example, target unit interaction diagnostics program 600 uses video analysis to confirm that an image element (e.g., the word "Result Code") is included in the screen image provided by the exemplary perspective target personal computer units to the perspective one or more user devices 102 at a certain (x,y) coordinate position or, in some embodiments, a coordinate area. In some embodiments, target unit interaction diagnostics program 600 uses video analysis to confirm that an image element (e.g., the word "Reference Code") is included in the screen image, and may capture any additional data in the (x,y) coordinate position or, in some embodiments, a coordinate area. In some embodiments, image analysis may be utilized to look for image elements (e.g., image symbols) near key words.

With respect to FIG. 6D, in some embodiments, image analysis module 660 may rely on image comparison to determine the health of a particular component included in a target unit 104. For example, in some embodiments wherein the one or more target units 104 are personal computers, target unit interaction diagnostics program 600, in step 660, may use video analysis to confirm that a pre-determined image element is included in the screen image provided by the personal computer units to the perspective one or more user devices 102 at a certain (x,y) coordinate position or, in some embodiments, a coordinate area. For example, in some embodiments wherein the one or more target units 104 are Lenovo computer units, target unit interaction diagnostics program 600, in step 660, may use video analysis to confirm that the word "USB Test" is included in the screen image provided by the exemplary perspective personal computer units to the perspective one or more user devices 102 at a certain (x,y) coordinate position or, in some embodiments, a coordinate area. For example, in some embodiments, image analysis may be utilized to look for image symbols (e.g., a green check mark) near a certain (x,y) coordinate position or, in some embodiments, a coordinate area to confirm a particular module within the computing device is function properly. In these embodiments, both color matching and/or image matching may be used to confirm the status of a device component.

Figure 6E:

With respect to FIG. 6E, in some embodiments image analysis module 660 may rely on OCR (Optical Character Recognition) to capture parametric data output by one or more target units 104 to determine the health of the one or more units or a particular component included in the one or more target units. For example, in some embodiments wherein the one or more target units 104 include one or more Apple MacBook Pro units, target unit interaction diagnostics program 600, in step 660, may use video analysis to confirm that an image element (e.g., the word "Full Charge Capacity") is included in the screen image provided by one or more of the target units to the perspective one or more user devices 102 at a certain (x,y) coordinate position or, in some embodiments, a coordinate area, and/or read any additional data in the (x,y) coordinate position and/or, in some embodiments, a coordinate area. For example, in some embodiments wherein one or more of the target units 104 include one or more Apple MacBook Pro units, target unit interaction diagnostics program 600, in step 660, may use video analysis to confirm that the word "Cycle Count" is included in the screen image provided by one or more of the target units to the perspective one or more user devices 102 at a certain (x,y) coordinate position or, in some embodiments, a coordinate area, and read any additional data in the (x,y) coordinate position and/or, in some embodiments, a coordinate area. In this exemplary diagnostic example disclosed with reference to FIG. 6E, parametric data obtained through image analysis techniques disclosed herein pertain to the health of the battery unit in the target Apple MacBook Pro unit 104. For example, in step 660, in some embodiments, target unit interaction diagnostics program 600 uses the parametric data to determine whether the health of the battery unit is within an acceptable range to pass or fail the Target Unit.

Figure 6F:
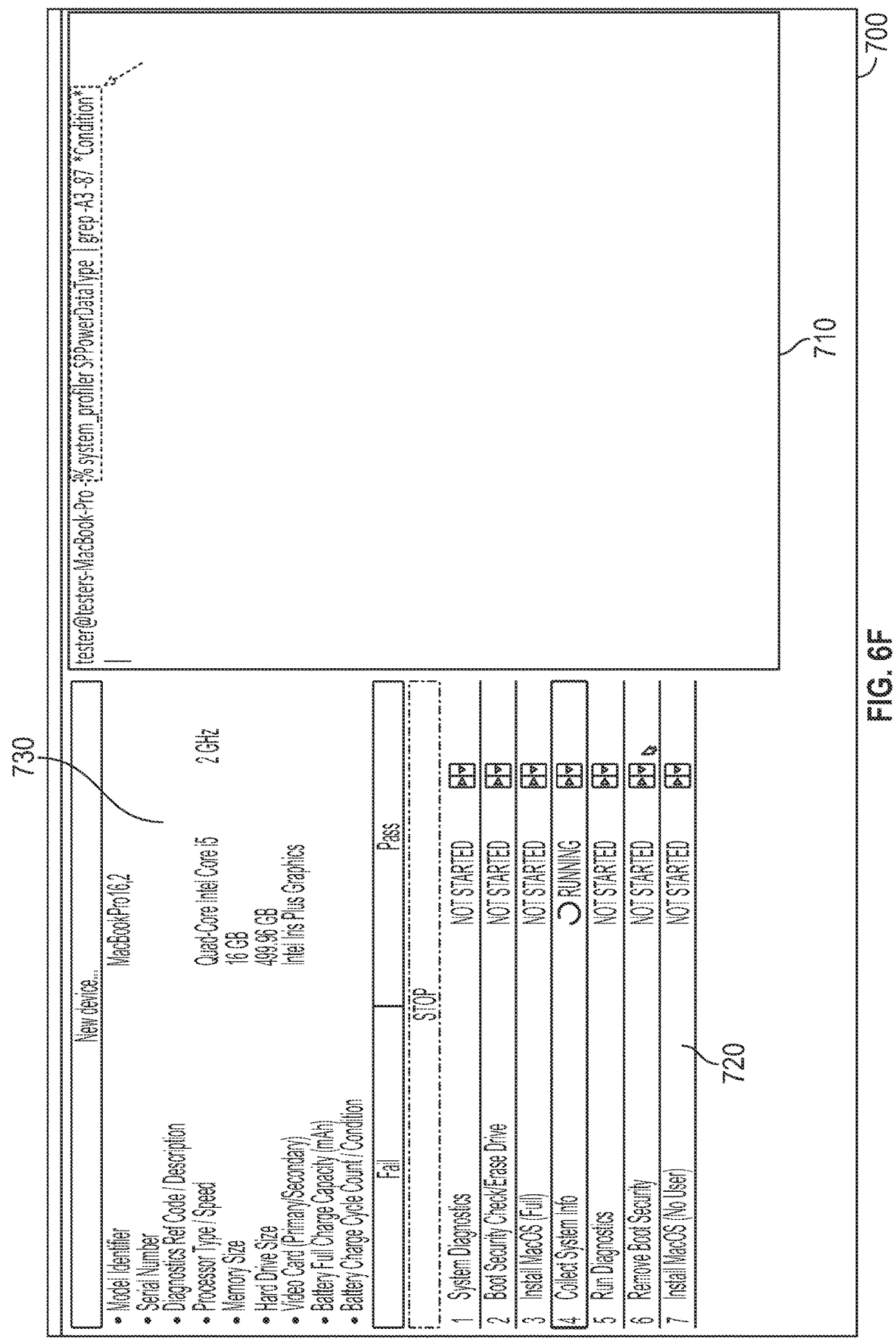

FIG. 6F illustrates an exemplary output of target unit interaction diagnostics program 600. In this example, screen data is captured in real time from a personal computer target unit 104 (e.g., an Apple MacBook Pro) by program 600 and presented to a user, as depicted in screen shot 710. In some embodiments, HID commands may be issued to the target unit to initiate one or more diagnostics checks. For example, in some embodiments, as depicted in FIG. 6F, the command "system_profile SPPowerDataType|grep −A3 B7 "Condition"" followed by <ENTER> is sent via keyboard emulation HID commands to a target Apple MacBookPro unit to determine the battery health of the laptop personal computer. FIG. 6G depicts an exemplary response to the HID commands issued to the exemplary target Apple MacBook Pro unit 104. In this example, target unit interaction diagnostics program 600, in step 660, uses video analysis to confirm that the word "Cycle Count" is included in the screen image 710 provided by the exemplary target personal computer unit to the perspective one or more user devices 102 at a certain (x,y) coordinate position. In some embodiments, target unit interaction diagnostics program 600, in step 660, uses video analysis to confirm that the word "Cycle Count" is included in the screen image 710 in a coordinate area and, in some embodiments, may read any additional data in the (x,y) coordinate position and/or the coordinate area. FIG. 6H depicts an exemplary diagnostic program wherein parametric data, obtained through image analysis techniques disclosed herein, pertain to the health of the battery unit included in an exemplary target Apple MacBook Pro unit 104. In this example, in step 660, as depicted in FIG. 6H, target unit interaction diagnostics program 600 uses the parametric data to determine whether the health of the battery unit is within an acceptable range to pass or fail the Target Unit, as identified in screen shot 730 (e.g., "Battery Charge Cycle Count/Condition 146 Normal").

If target unit interaction diagnostics program 600, in step 660, fails to identify a certain predetermined image element in the screen image provided by one or more target units 104, target unit interaction diagnostics program 600 moves to step 690. Additionally, if target unit interaction diagnostics program 600, in step 660, encounters error codes or an error message from a target unit 104, target unit interaction diagnostics program 600 moves to step 690. At step 690, a fail test is registered, the results of the failed video analysis and/or the error codes/messages are recorded, and target unit interaction diagnostics program 600 iterates to the next test (e.g., test X+1, where X=1 to N−1) at step 695, as disclosed with reference to step 640.

If target unit interaction diagnostics program 600, in step 660, succeeds in identifying a certain predetermined image element in the screen image provided by one or more target units 104, target unit interaction diagnostics program 600 moves to step 670. At step 670, target unit interaction diagnostics program 600 determines if the captured image data is acceptable image data (e.g., the word "Full Charge Capacity"), or image data that indicates that the target unit device or relevant component included within the target unit is within an acceptable range (e.g., "Battery Charge Cycle Count/Condition" "146" "Normal"). If the image data is acceptable image data, and/or if the image data indicates that the target unit device or relevant component included within the target unit is within an acceptable range, target unit interaction diagnostics program 600 moves to step 695 wherein and target unit interaction diagnostics program 600 iterates to the next test (e.g., test X+1, where X=1 to N−1). If the image data is unacceptable image data, and/or if the image data indicates that the target unit device or relevant component included within the target unit is not within an acceptable range, target unit interaction diagnostics program 600 moves to step 680, wherein a fail test is registered and the results of the failed video analysis are recorded. Thereafter, target unit interaction diagnostics program 600 moves to step 695 wherein and target unit interaction diagnostics program 600 iterates to the next test (e.g., test X+1, where X=1 to N−1).

Figure 7A:
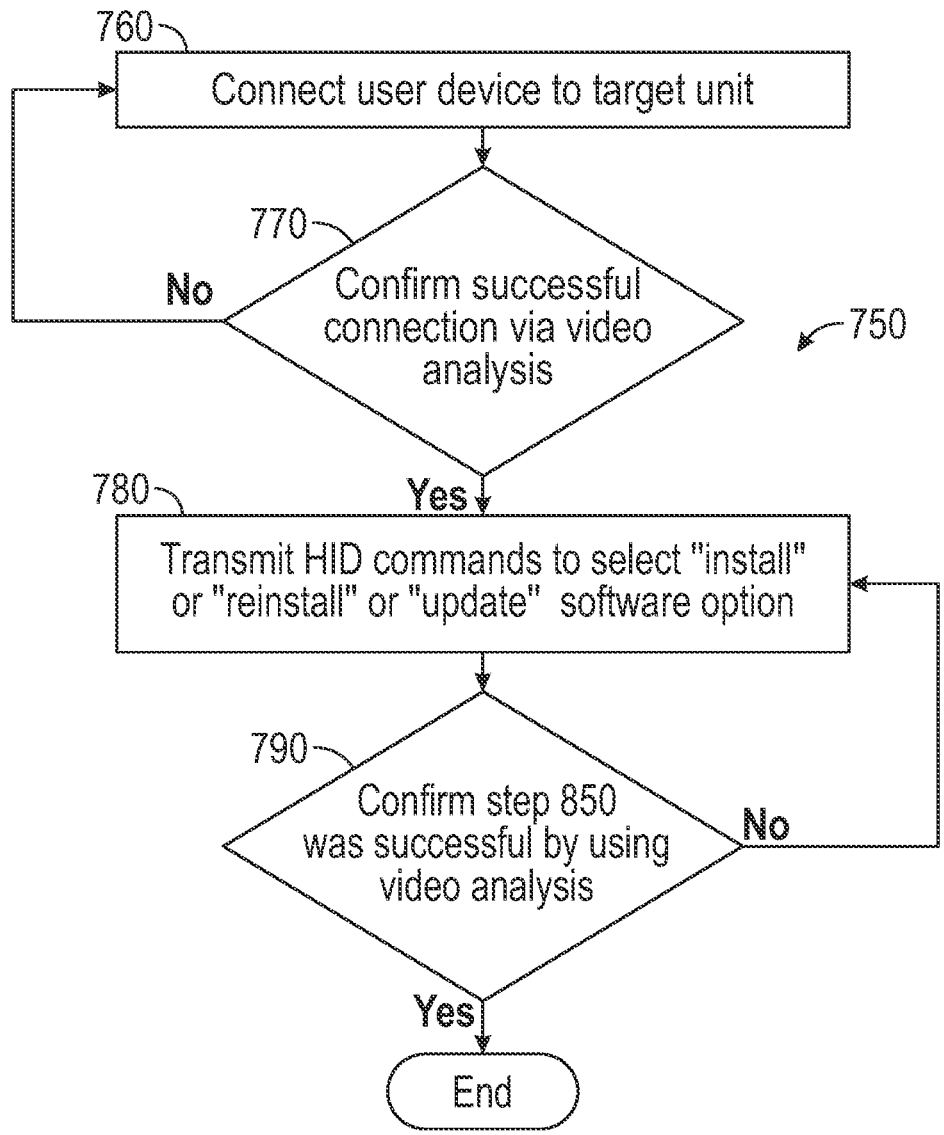

FIG. 7A. is a flowchart depicting operational steps for a target unit interaction upgrade/installation/reinstallation program 750, referred to herein as target unit interaction installation program 750. In some embodiments, target unit interaction installation program 750 upgrades, and/or installs and/or reinstalls applications and/or operating systems to a target unit 104. For example, target unit interaction installation program 750 configures one or more target units 104 to a state that such that the one or more target units 104 may be re-used, re-programmed and/or re-tasked for a specific purpose. In some embodiments, target unit interaction installation program 750 may be utilized to remove all user data from one or more target units 104 and revert the one or more target units back to their default software settings. or upgrade the target unit software to the newest or recommended version for the target unit. In some embodiments, target unit interaction installation program 750 may be utilized to upgrade the one or more target unit software to the newest or recommended version of that particular software. In some embodiments, target unit interaction installation program 750 may be utilized to change the configurations of one or more target units to a state when the target unit was offered to a customer for purchase. For example, in some embodiments, target unit interaction installation program 750 may be utilized to reset one or more configurations of one or more target units such that one or more components included in the one or more target units (e.g., memory devices, CPUs, GPUs, Blu-ray or other drives known to a person skilled in the art with the benefit of this specification) are reconfigured to their respective factory settings. In some embodiments, target unit interaction installation program 750 may be utilized to select interactive image element options provided by one or more target units to reset one or more configurations of one or more target units such that one or more components included in the one or more target units are reconfigured to their respective refurbishment settings, settings that may be unique to a customer, settings that may be unique to a user and/or settings that may be unique to a technician and/or the like.

For example, in some embodiments, once it has been determined, using one or more video analysis techniques disclosed herein, that the video/image data output by one or more target units 104 includes a desired interactive image element such as, for example, the interactive image element "Install", selecting the interactive image element "Install" may cause the one or more target units 104 to install applications and/or an operating system on the one or more target devices. For example, in one or more embodiments, selecting the interactive image element "Reinstall" included in video/image data output by one or more target units 104 causes the one or more target units 104 to reinstall applications and/or operating systems to the one or more target units 104 and configure one or more settings to a desired state. For example, the desired state may be a predetermined state or a state specified by a user or customer. For example, in some embodiments, selecting the option "update" provided as an interactive image element included in an image screen provided by one or more target units 104 causes the one or more target units to update and/or upgrade applications and/or operating systems resident on the one or more target units, and/or to configure and/or reconfigure one or more settings of the one or more target units to a desired state that may be a predetermined state, and/or a state specified by a user, a target device manufacturer or a customer. For example, in some embodiments, selecting the option "install" provided as an interactive image element included in an image screen provided by one or more target units 104 causes one or more target units to install applications and/or an operating system.

In step 760, target unit interaction installation program 750 confirms that a user device 102 is connected to one or more target units 104. For example, in some embodiments, the user device 102 is a remote user device connected, for example, to DMS 116 via a network (e.g., network 114). In some embodiments, a user may be issued account identification and/or verification credentials, and one or more target units have one or more target unit identifications associated therewith. In some embodiments, a user can request a target unit certificate, associated with one or more target units 104, from an account authority service. In some embodiments, a remote user device generates a public/private key pair in which the public key can be sent to an account authority along with one or more references to the one or more target units of interest (e.g., target unit ID). In some embodiments, the public key may be transmitted to the account authority service in combination with the account identification information for the user. In some embodiments, the account authority service encrypts the target unit ID(s) using the public key to create the one or more target unit certificates and sends the one or more target unit certificates back to the user device, such that the user is associated with the one or more target unit identifications (target unit IDs). For example, as a result of the aforementioned transactions, confirmation is provided via the target unit certificate that the user device is an authorized device to form a communicable connection to the one or more target units 104 identified by the one or more target unit IDs. In some embodiments, once one or more target unit IDs are obtained for one or more target units, a user device can connect to the one or more target units 104 for which the target unit IDs are associated. In some embodiments, the connection between a user device and one or more target units is achieved through standard networking protocols, such as TCP/IP with the IP address for a target unit 104. In some embodiments, a user device can connect to one or more target units 104 via a network using standard networking protocols to perform the functionality disclosed herein.

In step 770, target unit interaction installation program 750 confirms a successful connection of the user device 102 to the one or more target units 104. In some embodiments, the successful connection of the user device 102 to the one or more target units 104 is performed via video analysis. In some embodiments, the one or more target units 104 will provide video output in the form of video/image data to a video input interface of the user device. For example, the video/image data output by one or more target devices may include, for example, video/image data from one or more of a VGA, S-video, DVI and/or HDMI connection. In some embodiments, the video/image data is processed by the video analysis engine utilizing one or more engines and techniques disclosed herein with respect to the OCR software engine, image comparison engine and key marker recognition engine to analyze the image data and identify one or more key words or other image elements that are included in certain image screens output by a target unit. For example, in some embodiments, user device 102 includes a video capture card 217 for converting video/image data into signals for rendering the same on an image renderer (e.g., internally, or on a display device as disclosed herein). In some embodiments, video analysis engine 462 may analyze the video/image data and generate a bit map of the data points included in each of the images output by the video capture card 217, utilizing one or more of the techniques disclosed herein, to determine associated bit (x,y) coordinates of key words or other image elements included in each of the images. For example, in some embodiments, once an image element(s) (e.g., word, a single character, string of characters, symbol, ASCII characters, numeric characters, different types of foreign characters (e.g., Kanji, Hiragana, Katakana), and/or any other symbol/character that is suitable to convey an idea or assist in conveying an idea) and the bitmap coordinates for that image element are identified, the image element(s) is compared to a list of known image elements (e.g., key words, screen names, etc.) and/or image element positions (e.g., positions of words associated with a known screen) to determine if a user device is successfully connected to one or more target units. For example, once a user device is successfully connected to one or more target units, the user device may interact with the one or more target units to send commands and receive data from the one or more target units.

In some embodiments, when a user device 102 is connected to one or more target units 104, target unit interaction installation program 750 determines which image screens the one or more target units 104 initially display when power is provided to the one or more target units 104. In some embodiments, target unit interaction installation program 750 determines which image screens the one or more target units 104 initially display when power is provided to the one or more target units 104 by analyzing the video/image data output by the target unit 104. In some embodiments, target unit interaction installation program 750 interacts with one or more target units 104 by making selections on an image screen provided by the one or more target units 104, depending upon the options presented on the image screen(s), to find a desired image screen provided by one or more target units 104 that allows the user device to perform a certain function.

Figure 7B:
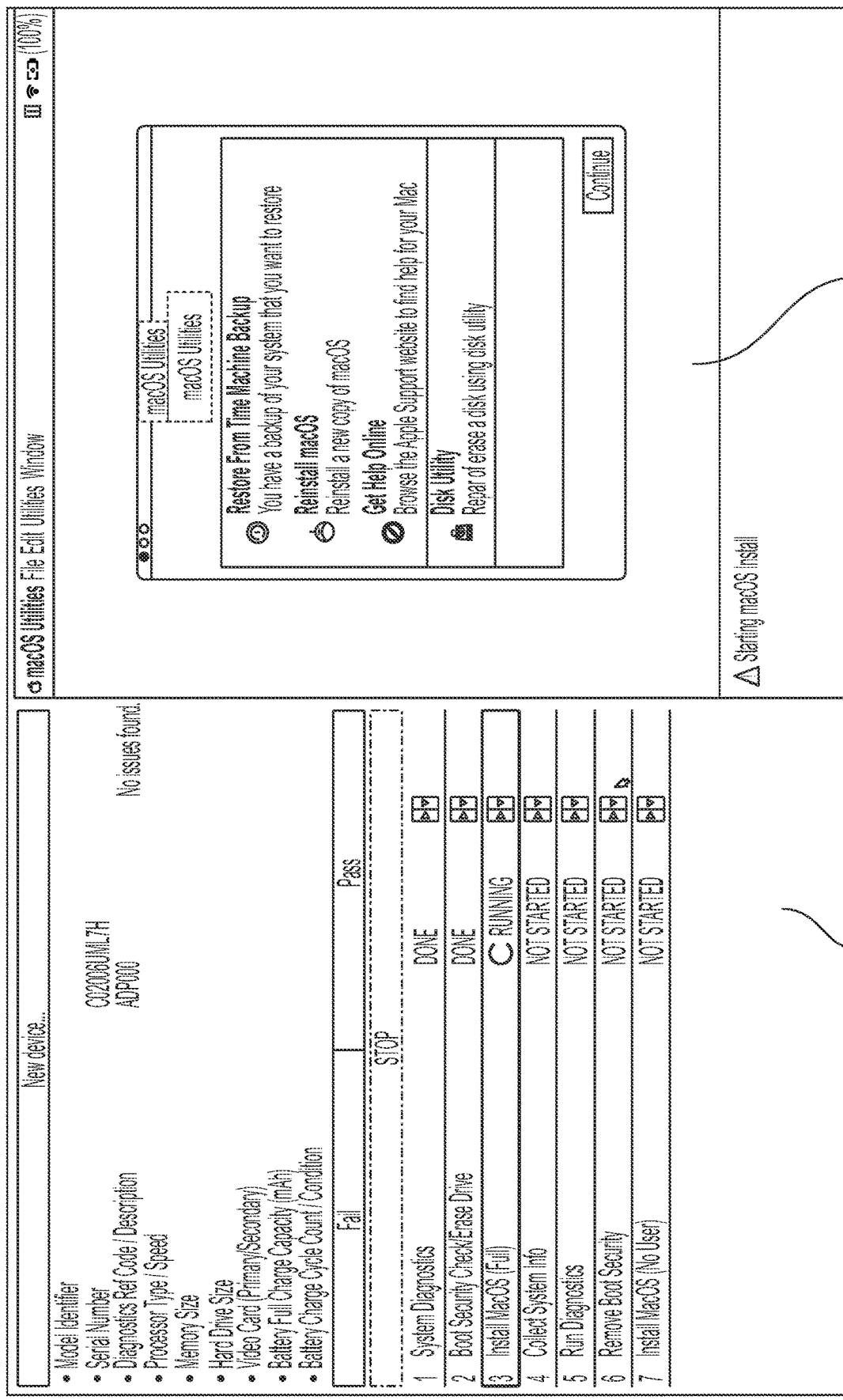

For example, FIG. 7B illustrates an exemplary output of target unit interaction installation program 750 for a personal computer target device. In this example, screen data 830 is captured in real time from a target Apple MacBook Pro unit, by target unit interaction installation program 750. A user may perform certain functions utilizing user interface 800 to access and manipulate one or more target units, such as the exemplary target Apple MacBook Pro unit, as reflected in FIG. 7B. In some embodiments, target unit interaction installation program 750 analyzes the image data output by the target computer to determine if one or more key words are present on the image screen. For example, in step 770, as depicted in FIG. 7B, video analysis engine 462 performs video analysis, using one or more of the techniques disclosed herein, analyzes the image screen 810 output by the exemplary target Apple MacBook Pro unit and determines that the key word "macOS Utilities" is included in the image screen to confirm successful connection of the user device to the target Apple MacBook Pro.

Figure 7C:
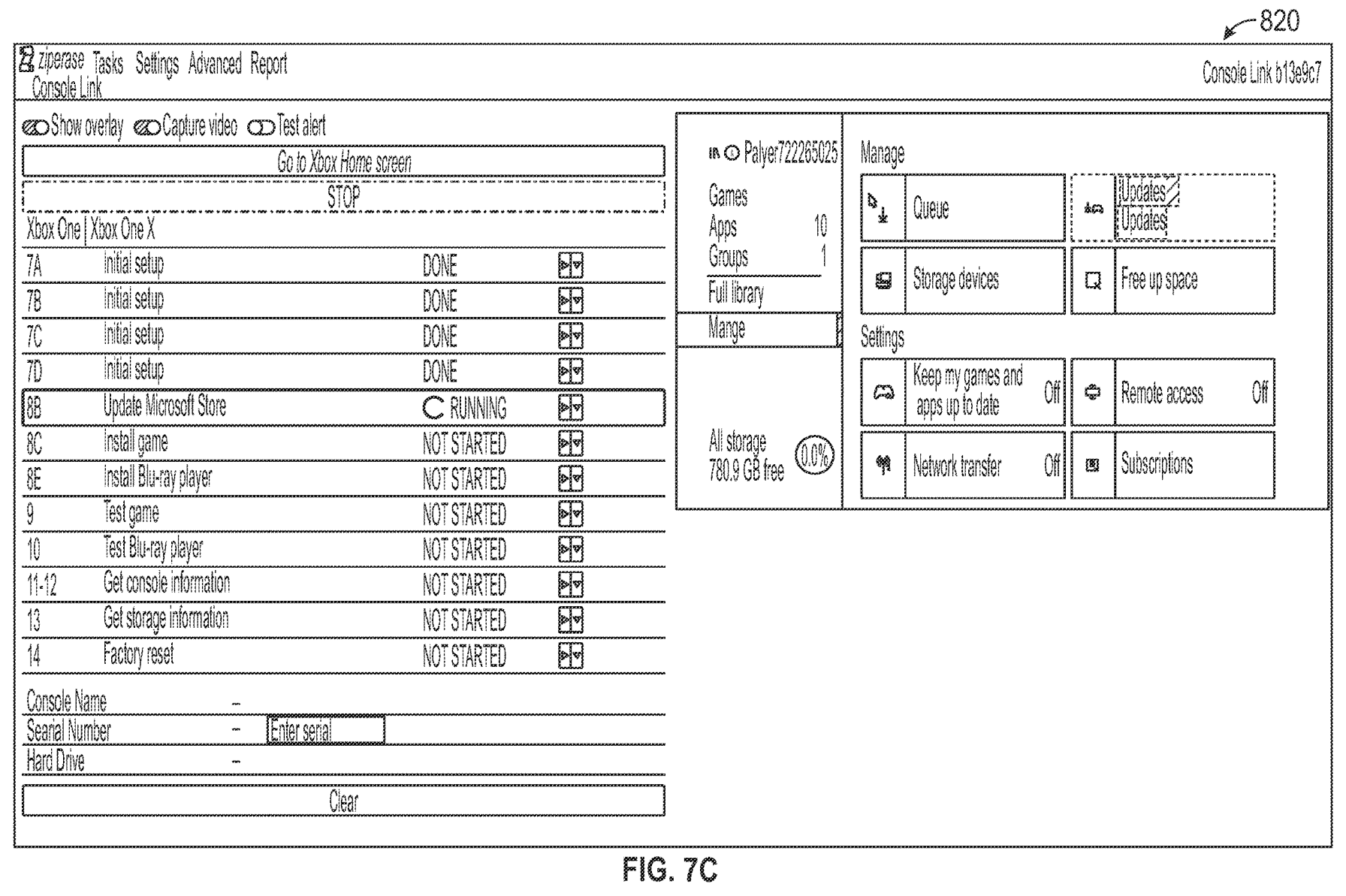

For example, FIG. 7C illustrates an exemplary output of target unit interaction installation program 750 for a personal computer target device. In this example, a user may perform certain functions utilizing user interface 820 to access and manipulate one or more target units, such as the exemplary target Microsoft gaming console unit, as reflected in FIG. 7C. In some embodiments, target unit interaction installation program 750 analyzes the image data output by the target gaming console to determine if one or more key words are present on the image screen. For example, in step 770, as depicted in FIG. 7C, video analysis engine 462 performs video analysis, using one or more of the techniques disclosed herein, analyzes the image screen 830 output by the exemplary target Microsoft gaming console unit and determines that the key word "Updates" is included in the image screen to confirm successful connection of the user device to the target Microsoft gaming console unit.

In step 780, target unit interaction installation program 750 transmits HID commands to execute desired commands on the one or more target units 104. For example, FIG. 7B illustrates an exemplary "macOS Utilities" image screen 810 for an exemplary target Apple MacBook Pro unit. In some embodiments, the HID commands transmitted to one or more target units 104 emulate keyboard strokes that operate to start the process of reinstalling an operating system on a target unit 104. For example, in some embodiments, the HID commands transmitted to the exemplary target console unit 104 may emulate the following keyboard keystrokes to start the process of reinstalling an operating system on a target unit 104: 1) Up Arrow; 2) Up Arrow; and 3) Return. In this example, the emulated keystrokes control the respective one or more exemplary target Apple MacBook Pro units to execute the "Reinstall" option to change/repair/reset/upgrade one or more configurations of the respective one or more target console units, as disclosed herein.

In some embodiments, in step 780, target unit interaction installation program 750 may also transmit HID commands to execute desired commands on one or more target units 104. For example, FIG. 7C illustrates an exemplary "Updates" image screen output by an exemplary Microsoft gaming console unit 104. In some embodiments, the HID commands transmitted to the one or more target units 104 emulate keyboard keystrokes to start the process of updating software on one or more of the one or more target units 104. For example, the HID commands transmitted to an exemplary target console unit may emulate the following keyboard keystrokes to start the process of updating software on target console unit: 1) Tab; 2) Tab; and 3) Return. In these embodiments, the emulated keystrokes control the respective one or more target console units to execute the "Update" option to change, repair, reset and/or upgrade one or more configurations of one or more of the respective one or more target console units, as disclosed herein.

In step 790, in response to the execution of the desired option in step 780, target unit interaction installation program 750 automatically confirms that the desired option (e.g., install, reinstall, update, etc.) selected in step 780 was executed for the one or more target units 104. In some embodiments, in step 790, in response to the execution of the desired option in step 780, target unit interaction installation program 750 automatically confirms that the desired option selected in step 780 was executed by utilizing video analysis. For example, in some embodiments, the video analysis will utilize the techniques disclosed herein to examine one or more output images output by the one or more target units 104 in response to the desired option being executed. For example, in some embodiments wherein one or more of the "Reinstall", "Install" or "Update" options was executed for one or more target console units 104, one or more video analysis techniques disclosed herein may be utilized to determine if the desired output was provided by one or more of the one or more target units 104 that confirms that the specified option was performed. For example, in some embodiments wherein the "Reinstall" option was executed for one or more exemplary target Apple personal computer units, one or more video analysis techniques disclosed herein may be utilized in step 790 to determine if the exemplary image illustrated in FIG. 7D of an Apple personal computer has been output by the relevant target console unit 104. In this example, a user may perform certain functions utilizing user interface 840 to access and manipulate one or more target units, such as the exemplary Microsoft gaming console unit, as reflected in FIG. 7D. In this example, a user may perform certain functions utilizing user interface 840 to access and manipulate one or more target units, such as the exemplary target Microsoft gaming console unit, as reflected in FIG. 7D.

Figure 7D:
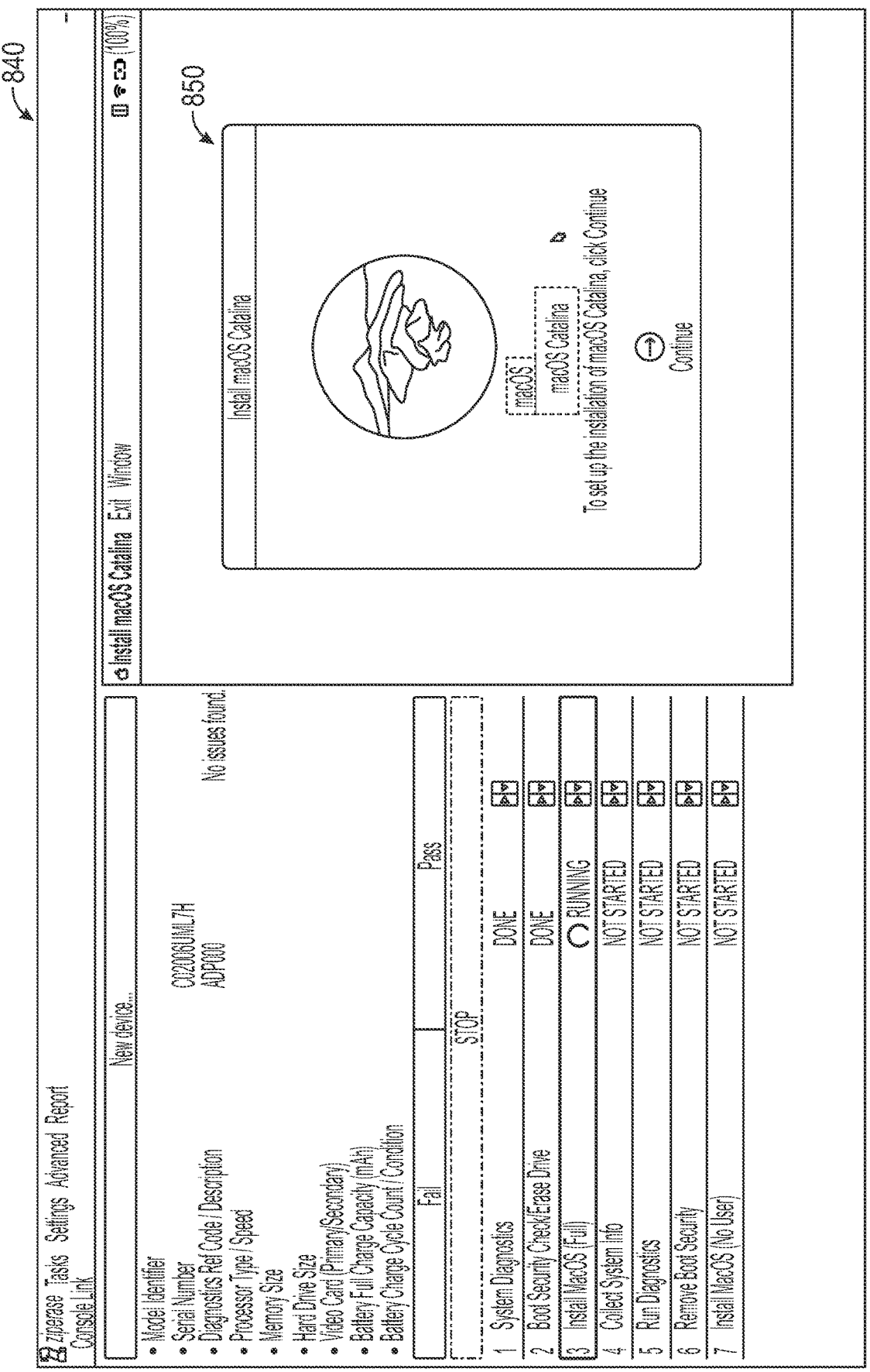
Figure 7E:
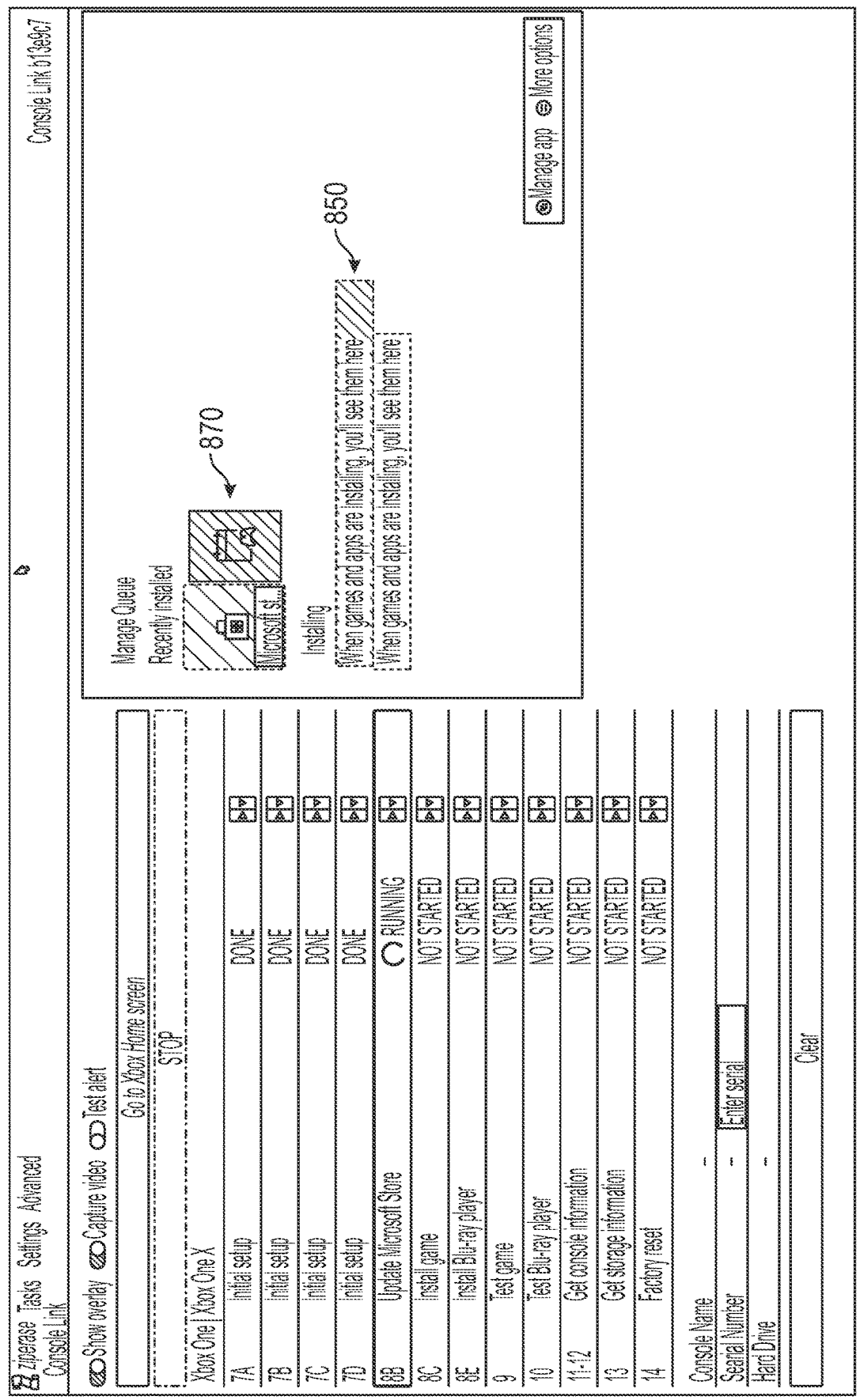

For example, in some embodiments wherein a "Reinstall" option was executed in step 780 for one or more target smartphone units 104, one or more video analysis techniques disclosed herein may be utilized to determine if the exemplary image 850, illustrated in FIG. 7D, of an exemplary word "MacOS Catalina" has been output by the relevant target computer unit 104. In some embodiments, if target unit interaction installation program 750 does not successfully confirm that step 780 has been performed, target unit interaction resetting program 800 repeats step 780.

In step 790, in response to the execution of the desired option in step 780, target unit interaction installation program 750 automatically confirms that the desired option selected in step 780 was executed. In some embodiments, in response to the execution of the desired option in step 780, target unit interaction installation program 750 automatically confirms that the desired option selected in step 780 was executed by utilizing video analysis. For example, in some embodiments, the video analysis will utilize the techniques disclosed herein to examine one or more images output by the one or more target units 104 in response to the desired option being executed. For example, in some embodiments wherein the a desired option was executed for one or more target console units 104, one or more video analysis techniques disclosed herein may be utilized to determine if the one or more console units output video/image data that indicates the desired option was executed. For example, in some embodiments wherein the "Update" option was executed for one or more target console units 104, one or more video analysis techniques disclosed herein may be utilized to determine if the exemplary image 870 illustrated in FIG. 7E of a Microsoft gaming console has been output by the relevant one or more of the one or more target console units 104. For example, in some embodiments wherein the "Update" option was executed in step 780 for one or more target smartphone units, one or more video analysis techniques disclosed herein may be utilized to determine if the exemplary image element(s) "When games and apps are installed, you'll see them here" output by the relevant target smartphone unit(s) 104 are present in image 850 illustrated in FIG. 7E. In this example, in some embodiments, a user may perform certain functions utilizing user interface 840 to access and manipulate one or more target units and/or one or more gaming consoles, such as the exemplary target smartphone units and gaming consoles disclosed herein with reference to FIG. 7E. In some embodiments, if target unit interaction installation program 750 does not successfully confirm that step 780 has been performed, target unit interaction installation program 750 repeats step 780.

Figure 7F:
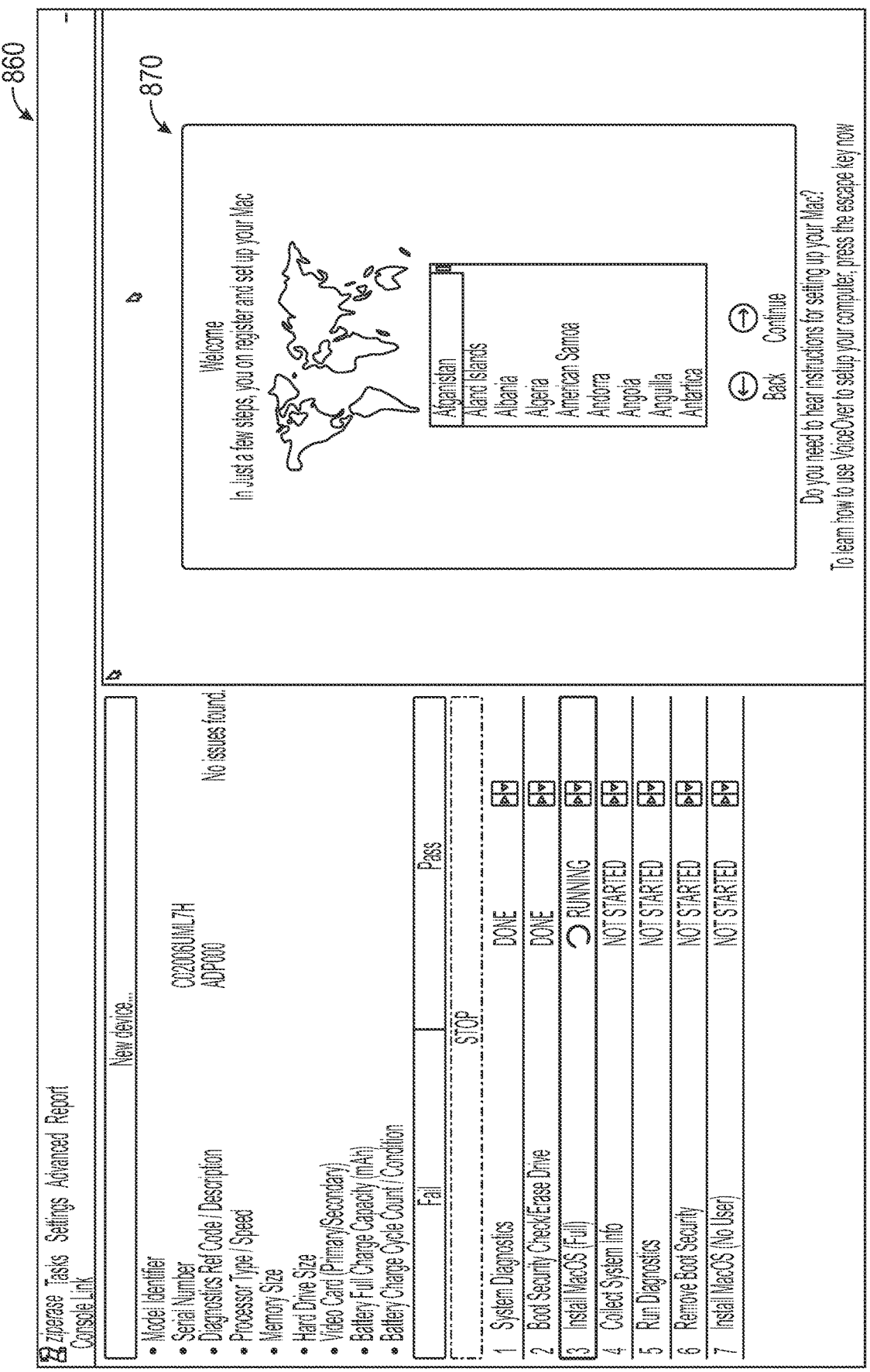

As those having ordinary skill in the art will appreciate with the benefit of this specification, the HID and OCR process described herein can also be extended to configure an installed operating system for one or more target units 104. For example, FIG. 7F and FIG. 7G illustrates an exemplary image 870 of an Apple personal computer has been output by the relevant target console unit. In some embodiments, target unit interaction installation program 750 may be utilized to configure the language and region requirement(s) of a reinstalled operating system on one or more target units. In the exemplary image 870 illustrated in FIG. 7F, target unit interaction installation in program 750 may be utilized to select the region in which the computer should be registered in the case of an installed or reinstalled operating system in a similar manner to selecting option image elements as disclosed herein. In the exemplary image 870 illustrated in FIG. 7G, target unit interaction installation program 750 may be utilized to accept the "Terms and Conditions" of the reinstalled operating system in a similar manner to selecting option image elements as disclosed herein. In this example, in some embodiments, a user may perform certain functions utilizing user interface 860 to access and manipulate one or more target console units, such as the exemplary target units disclosed herein with reference to FIG. 7F.

Embodiments of the subject matter described in this document may be implemented in a computing system that includes a back-end component, e.g., as a data server, or that includes a middleware component, e.g., an application server, or that includes a front-end component, e.g., a client computer having a graphical user interface or a Web browser through which a user may interact with an implementation of the subject matter described in this document, or any combination of one or more such back-end, middleware, or front-end components. In one or more embodiments, the components of the system may be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks). For example, specially programmed computing systems with associated devices may be configured to operate in the distributed network environment, communicating with one another over one or more suitable data communication networks (e.g., the Internet, satellite, etc.) and utilizing one or more suitable data communication protocols/modes. For example, as those of ordinary skill in the art also understand, there are many packet protocols. Some of the more well-known packet protocols include such as, without limitation, IPX/SPX, X.25, AX.25, AppleTalk™, TCP/IP (e.g., HTTP), and SNA. Other suitable data communication protocols/modes include near-field wireless communication (NFC), RFID, Narrow Band Internet of Things (NBIOT), 3G, 4G, 5G, GSM, GPRS, WiFi, WiMax, CDMA, satellite, ZigBee, and other suitable communication modes. In one or more embodiments, the NFC may represent a short-range wireless communications technology in which NFC-enabled devices are "swiped," "bumped," "tapped" or otherwise moved in close proximity to facilitate communications.

The operations described in this document may be implemented as operations performed by a data processing apparatus on data stored on one or more computer-readable storage devices or received from other sources. The term "data processing system" encompasses all kinds of apparatus, devices, and machines for processing data, including by way of example a programmable processor, a computer, a server, a system on a chip, or multiple ones, or combinations, of the foregoing. The apparatus may include special purpose logic circuitry, e.g., an FPGA (field programmable gate array) or an ASIC (application-specific integrated circuit). The apparatus may also include, in addition to hardware, code that creates an execution environment for the computer program in question, e.g., code that constitutes processor firmware, a protocol stack, a database management system, an operating system, a cross-platform runtime environment, a virtual machine, or a combination of one or more of them. The apparatus and execution environment may realize various different computing model infrastructures, such as web services, distributed computing and grid computing infrastructures.

Embodiments of the present disclosure may be implemented in hardware, firmware, software, or any combination thereof. Embodiments of the present disclosure may also be implemented as instructions applied by a machine-readable medium, which may be read and executed by one or more processors. A machine-readable medium may include any mechanism for storing or transmitting information in a form readable by a machine (e.g., a computing device). For example, a machine-readable medium may include random access memory (RAM), one or more processing resources such as a central processing unit (CPU) or hardware or software control logic, ROM, magnetic disk storage media, optical storage media, flash memory devices, electrical, optical, acoustical or other forms of propagated signals (e.g., carrier waves, infrared signals, digital signals, etc.), and others.

The processes and logic flows described in this document may be performed by one or more programmable processors executing one or more computer programs to perform actions by operating on input data and generating output. The processes and logic flows may also be performed by, and apparatus may also be implemented as, special purpose logic circuitry, e.g., an FPGA (field programmable gate array) or an ASIC (application-specific integrated circuit).

Processors suitable for the execution of a computer program include, by way of example, both general and special purpose microprocessors, and any one or more processors of any kind of digital computer. In one or more embodiments, the one or more processors may be implemented as a Complex Instruction Set Computer (CISC) or Reduced Instruction Set Computer (RISC) processors; x86 instruction set compatible processors, multi-core, or any other microprocessor or central processing unit (CPU). In various implementations, the one or more processors may be dual-core processor(s), dual-core mobile processor(s), and so forth. Generally, a processor will receive instructions and data from a read-only memory or a random access memory or both. The essential elements of a computer are a processor for performing actions in accordance with instructions and one or more memory devices for storing instructions and data. Generally, a computer will also include, or be operatively coupled to receive data from or transfer data to, or both, one or more mass storage devices for storing data, e.g., magnetic, magneto-optical disks, or optical disks. However, a computer need not have such devices. Moreover, a computer may be embedded in another device, e.g., a mobile telephone, a personal digital assistant (PDA), a mobile audio or video player, a game console, a Global Positioning System (GPS) receiver, or a portable storage device (e.g., a universal serial bus (USB) flash drive), to name just a few.

Devices suitable for storing computer program instructions and data include all forms of non-volatile memory, media and memory devices, including by way of example semiconductor memory devices, e.g., EPROM, EEPROM, and flash memory devices; magnetic disks, e.g., internal hard disks or removable disks; magneto-optical disks; and CD-ROM and DVD-ROM disks. The processor and the memory may be supplemented by, or incorporated in, special purpose logic circuitry.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores," may be stored on a tangible, machine readable medium and supplied to various customers or manufacturing facilities to load into the fabrication machines that make the logic or processor. In one or more embodiments, an exemplary specifically programmed browser application may be configured to receive and display graphics, text, multimedia, and the like, employing virtually any web based language, including, but not limited to Standard Generalized Markup Language (SMGL), such as HyperText Markup Language (HTML), a wireless application protocol (WAP), a Handheld Device Markup Language (HDML), such as Wireless Markup Language (WML), WMLScript, XML, JavaScript, and the like. In one or more embodiments, a user device may be specifically programmed by either Java, .Net, QT, C, C++ and/or other suitable programming language. Of note, various embodiments described herein may, of course, be implemented using any appropriate hardware and/or computing software languages (e.g., C++, Objective-C, Swift, Java, JavaScript, Python, Perl, QT, etc.).

Various embodiments may be implemented using software components, hardware components, or a combination of both. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

Examples of hardware elements used in one or more embodiments may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth.

For example, in one or more embodiments, one or more of exemplary inventive computer-based systems of the present disclosure may include or be incorporated, partially or entirely into at least one personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), wearable device, mobile internet device (MID), messaging device, data communication device, and so forth.

In one or more embodiments, exemplary inventive computer-based systems and/or exemplary inventive computer-based devices of the present disclosure may be configured to output to distinct, specifically programmed graphical user interface implementations of the present disclosure (e.g., a desktop, a web app., etc.). In various implementations of the present disclosure, a final output may be displayed on a displaying screen which may be, without limitation, a screen of a computer, a screen of a mobile device, or the like. In various implementations, the display may be a holographic display. In various implementations, the display may be a transparent surface that may receive a visual projection. Such projections may convey various forms of information, images, and/or objects. For example, such projections may be a visual overlay for a mobile augmented reality (MAR) application.

To provide for interaction with a user, embodiments of the subject matter described in this document may be implemented on a computer having a display device, e.g., a CRT (cathode ray tube) or LCD (liquid crystal display) monitor, for displaying information to the user and a keyboard and a pointing device, e.g., a mouse or a trackball, by which the user may provide input to the computer. Other kinds of devices may be used to provide for interaction with a user as well; for example, feedback provided to the user may be any form of sensory feedback, e.g., visual feedback, auditory feedback, or tactile feedback; and input from the user may be received in any form, including acoustic, speech, or tactile input. In addition, a computer may interact with a user by sending documents to and receiving documents from a device that is used by the user; for example, by sending web pages to a web browser on a user's client device in response to requests received from the web browser.

In one or more embodiments, the exemplary inventive computer-based systems and/or the exemplary inventive computer-based devices of the present disclosure may be configured to securely store and/or transmit data via one or networks disclosed herein to one or more DMS systems 106, 116 by utilizing one or more of encryption techniques (e.g., private/public key pair, Triple Data Encryption Standard (3DES), block cipher algorithms (e.g., IDEA, RC2, RC5, CAST and Skipjack), cryptographic hash algorithms (e.g., MD5, RIPEMD-160, RTR0, SHA-1, SHA-2, Tiger (TTH), WHIRLPOOL, RNGs).

In one or more embodiments, as detailed herein, one or more of exemplary inventive computer-based systems of the present disclosure may obtain, manipulate, transfer, store, transform, generate, and/or output any digital object and/or data unit (e.g., from inside and/or outside of a particular application) that may be in any suitable form such as, without limitation, a file, a contact, a task, an email, a tweet, a map, an entire application (e.g., a calculator), etc. In one or more embodiments, as detailed herein, one or more of exemplary inventive computer-based systems of the present disclosure may be implemented across one or more of various computer platforms such as, but not limited to: (1) AmigaOS, AmigaOS 4, (2) FreeBSD, NetBSD, OpenBSD, (3) Linux, (4) Microsoft Windows, (5) OpenVMS, (6) OS X (Mac OS), (7) OS/2, (8) Solaris, (9) Tru64 UNIX, (10) VM, (11) Android, (12) Bada, (13) BlackBerry OS, (14) Firefox OS, (15) iOS, (16) Embedded Linux, (17) Palm OS, (18) Symbian, (19) Tizen, (20) WebOS, (21) Windows Mobile, (22) Windows Phone, (23) Adobe AIR, (24) Adobe Flash, (25) Adobe Shockwave, (26) Binary Runtime Environment for Wireless (BREW), (27) Cocoa (API), (28) Cocoa Touch, (29) Java Platforms, (30) JavaFX, (31) JavaFX Mobile, (32) Microsoft XNA, (33) Mono, (34) Mozilla Prism, XUL and XULRunner, (35) .NET Framework, (36) Silverlight, (37) Open Web Platform, (38) Oracle Database, (39) Qt, (40) SAP NetWeaver, (41) Smartface, (42) Vexi, and (43) Windows Runtime.

In one or more embodiments, exemplary inventive computer-based systems, and/or exemplary inventive computer-based devices of the present disclosure may be configured to utilize hardwired circuitry that may be used in place of or in combination with software instructions to implement features consistent with principles of the disclosure. Thus, implementations of these one more embodiments consistent with principles of the disclosure are not limited to any specific combination of hardware circuitry and software. For example, various embodiments may be embodied in many different ways as a software component such as, without limitation, a stand-alone software package, a combination of software packages, or it can be a software package incorporated as a "tool" in a larger software product.

At least some aspects of the present disclosure will now be described with reference to the following numbered clauses.

1. A system may include: a computing device associated with a plurality of users including, a plurality of processors, a video input interface device configured to receive output data transmitted from a target unit, a human interface device configured to emulate a plurality of computer input devices and transmit a plurality of interaction commands provided by the plurality of processors to the target unit, and a data storage device, and the target unit including, a video output interface device, an I/O interface device configured to receive emulated computer input device commands from the computing device to supplement a unit device with additional functionality, where the computing device is configured to control the target unit to reconfigure a plurality of settings associated with the target unit based on the plurality of interaction commands transmitted from the human interface device.

2. The system according to clause 1, where the video input device includes a video capture card and a camera.

3. The system according to clause 1 or 2, where the plurality of computer input devices is one of comprise at least one of a keyboard, mouse, digital pointer, trackball, touch pad, or touchscreen or gaming controller.

4. The system according to clause 1, 2 or 3, where the plurality of interaction commands comprise a plurality of hexadecimal strings.

5. The system according to clause 1, 2, 3 or 4, where the plurality of processors are configured to analyze the output data transmitted from the target unit using a plurality of video analysis techniques to confirm whether the target unit is connected to the user device such that the plurality of interaction commands can control the target unit.

6. The system according to clause 1, 2, 3, 4 or 5, where the plurality of interaction commands comprise a plurality of human interaction device commands.

7. The system according to clause 1, 2, 3, 4, 5 or 6, where the one or more visual techniques include OCR, image comparison, or key marker recognition.

8. The system according to clause 1, 2, 3, 4, 5, 6 or 7, where the computing device is configured to control the target unit to provide one or more image screens, and wherein the one or more processors are configured to analyze the image data included in the one or more image screens to search for key words.

9. The system according to clause 1, 2, 3, 4, 5, 6, 7 or 8, where the at least one processor is configured to store target unit data in one or more memory units included in the computing device.

10. A method may include:
providing, by at least one processor, a computing device associated with a plurality of user,
where the computing devices comprises a video input interface, a human interface device, a data storage device, and one or more processors;
receiving, using the video input interface, output data transmitted from a target unit;
analyzing, by the at least one processor, the output data to confirm a communicable connection between the computing device associated with the plurality of users and the target unit;
transmitting, by the at least one processor, a plurality of interaction commands configured to: emulate a plurality of computer input devices, and control the target unit to provide a plurality of graphical user interface displays;
transmitting, by the at least one processor, the plurality of interaction commands to an application or operating system to obtain desired a configuration state, desired target unit information, and desired effect;
determining, by the at least one processor, a plurality of identifying key words associated with the plurality of graphical user interface displays provided by the target unit based on a comparison between a set of known key words and a plurality of image elements associated with the plurality of interaction commands;
dynamically determining, by the at least one processor, a configuration screen image based on an identification of the plurality of identifying key words associated with the plurality of graphical user interface displays, wherein the configuration screen image comprises a plurality of interactive image elements that operate to reconfigure the target unit;
automatically selecting, by the at least one processor, a configuration setting associated with the plurality of interactive image elements based on the configurations screen image; and
executing, by the at least one processor, a plurality of ameliorative actions associated with the configuration setting.

11. The method according to clause 10, where the video input device includes a video capture card and a camera.

12. The method according to clause 10 or 11, where the human interface device includes one of a USB-C interface or a general purpose IO, where the general purpose IO includes one of a usb-c interface, Apple lightening interface, micousb interface, rs-232 interface, or ps2 interface.

13. The method according to clause 10, 11 or 12, where the plurality of interaction commands include a plurality of hexadecimal strings.

14. The method according to clause 10, 11, 12 or 13, where the plurality of interaction commands include a plurality of human interaction device commands.

15. The method according to clause 10, 11, 12, 13 or 14, further including, analyzing, by the at least one processor, the output data transmitted from the target unit using a plurality of video analysis techniques to confirm a communicable connection between the computing device and the target unit.

16. The method according to clause 10, 11, 12, 13, 14 or 15, where the plurality of video analysis techniques include OCR, image comparison, or key marker recognition.

17. The method according to clause 10, 11, 12, 13, 14, 15 or 16, further including analyzing, by the at least one processor, the image data included in the one or more provided image screens to search for key words.

18. The method according to clause 10, 11, 12, 13, 14, 15, 17 or 18, further including storing, by at least one of the one or more processors, target unit data in one or more memory devices included in the data storage device.

19. A computer program product may include: a computer readable storage medium, that is not a transitory signal, having program code embodied therein, the program code executable by at a processor for: receiving, from a video input interface included in a computing device, output data transmitted from a target unit; analyzing, by at least one processor, the output data to confirm a communicable connection between the computing device and the target unit; receiving, by the at least one processor and from a human interface device included in the computing device, a plurality of interaction commands configured to emulate a plurality of computer input devices and control the target unit to provide one or more image screens; determining, by the at least one processor, a plurality of identifying key words included in one of the one or more screen images provided by the target unit based on a comparison between a set of known key words and image elements included in the one or more screen images; dynamically determining, by the at least one processor, a configuration screen image based upon the identification of key identifying key words included in the one or more screen images that includes one or more interactive image elements that operate to reconfigure the target unit; automatically selecting, by the at least one processor, a configuration setting included in one of the one or more interactive image elements; and executing, by the at least one processor, the configuration setting.

20. The computer program product according to clause 19, further including storing, by the at least processor, target unit data in one or more memory devices included in the data storage device.

While a number of embodiments of the present disclosure have been described, it is understood that these embodiments are illustrative only, and not restrictive, and that many modifications may become apparent to those of ordinary skill in the art, including that the inventive methodologies, the inventive systems, and the inventive devices described herein can be utilized in any combination with each other. Further still, the various steps may be carried out in any desired order (and any desired steps may be added and/or any desired steps may be eliminated).

We claim:

1. A system for controlling a target unit, the system comprising:
    a computing device associated with a plurality of users comprising:
        a plurality of processors;
        a video input interface device configured to receive output data transmitted from a target unit, wherein the video input interface device includes a video capture card and a camera capable of analyzing the output data to confirm a communicable connection between the computing device associated with the plurality of users and the target unit;
        a human interface device configured to emulate a plurality of computer input devices and transmit a plurality of interaction commands provided by the plurality of processors to the target unit;
        a data storage device;
    the target unit comprising; and
        an I/O interface device configured to receive emulated computer input device commands from the computing device to supplement a unit device with additional functionality,
    wherein the computing device is configured to control the target unit to reconfigure a plurality of settings associated with the target unit based on the plurality of interaction commands transmitted from the human interface device.

2. The system of claim 1, wherein the video input interface device includes at least one video capture card and at least one camera.

3. The system of claim 1, wherein the plurality of computer input devices comprise at least one of a keyboard, mouse, digital pointer, trackball, touch pad, or touchscreen or gaming controller.

4. The system of claim 1, wherein the plurality of interaction commands comprise a plurality of hexadecimal strings.

5. The system of claim 1, wherein the plurality of processors are configured to analyze the output data transmitted from the target unit using a plurality of video analysis techniques to confirm whether the target unit is connected to the user device such that the plurality of interaction commands can control the target unit.

6. The system of claim 1, wherein the plurality of interaction commands comprise a plurality of human interaction device commands.

7. The system of claim 5, wherein the one or more visual techniques include OCR, image comparison, or key marker recognition.

8. The system of claim 1, wherein the computing device is configured to control the target unit to provide one or more image screens, and wherein the one or more processors are configured to analyze the image data included in the one or more image screens to search for key words.

9. The system of claim 1, wherein the at least one processor is configured to store target unit data in one or more memory units included in the computing device.

10. A computer-implemented method for controlling a target unit comprising:
    providing, by at least one processor, a computing device associated with a plurality of user,
        wherein the computing devices comprises a video input interface, a human interface device, a data storage device, and one or more processors;
    receiving, using the video input interface, output data transmitted from a target unit,
        wherein the video input interface includes a video capture card and a camera;
    analyzing, by the at least one processor, the output data to confirm a communicable connection between the computing device associated with the plurality of users and the target unit;
    transmitting, by the at least one processor, a plurality of interaction commands configured to:
    emulate a plurality of computer input devices, and
    control the target unit to provide a plurality of graphical user interface displays;
    transmitting, by the at least one processor, the plurality of interaction commands to an application or operating system to obtain desired a configuration state, desired target unit information, and desired effect
    determining, by the at least one processor, a plurality of identifying key words associated with the plurality of graphical user interface displays provided by the target unit based on a comparison between a set of known key words and a plurality of image elements associated with the plurality of interaction commands;
    dynamically determining, by the at least one processor, a configuration screen image based on an identification of the plurality of identifying key words associated with the plurality of graphical user interface displays, wherein the configuration screen image comprises a plurality of interactive image elements that operate to reconfigure the target unit;

automatically selecting, by the at least one processor, a configuration setting associated with the plurality of interactive image elements based on the configurations screen image; and executing, by the at least one processor, a plurality of ameliorative actions associated with the configuration setting.

11. The computer-implemented method of claim 10, wherein the video input device includes at least one video capture card and at least one camera.

12. The computer-implemented method of claim 10, wherein the human interface device includes one of a USB-C interface or a general purpose IO,
wherein the general purpose IO includes one of a usb-c interface, mico-usb interface, rs-232 interface, or ps2 interface.

13. The computer-implemented method of claim 10, wherein the plurality of interaction commands include a plurality of hexadecimal strings.

14. The computer-implemented method of claim 10, wherein the plurality of interaction commands comprise a plurality of human interaction device commands.

15. The method of claim 10 further comprising,
analyzing, by the at least one processor, the output data transmitted from the target unit using a plurality of video analysis techniques to confirm a communicable connection between the computing device and the target unit.

16. The method of claim 15, wherein the plurality of video analysis techniques comprise OCR, image comparison, or key marker recognition.

17. The method of claim 10 further comprising,
analyzing, by the at least one processor, the image data included in the one or more provided image screens to search for key words.

18. The method of claim 10, further comprising:
storing, by at least one of the one or more processors, target unit data in one or more memory devices included in the data storage device.

19. A computer program product comprising a computer readable storage medium, that is not a transitory signal, having program code embodied therein, the program code executable by at a processor for:

receiving, from a video input interface included in a computing device, output data transmitted from a target unit;

wherein the video input interface includes a video capture card and a camera;

analyzing, by at least one processor, the output data to confirm a communicable connection between the computing device and the target unit;

receiving, by the at least one processor and from a human interface device included in the computing device, a plurality of interaction commands configured to emulate a plurality of computer input devices and control the target unit to provide one or more image screens;

determining, by the at least one processor, a plurality of identifying key words included in one of the one or more screen images provided by the target unit based on a comparison between a set of known key words and image elements included in the one or more screen images;

dynamically determining, by the at least one processor, a configuration screen image based upon the identification of key identifying key words included in the one or more screen images that includes one or more interactive image elements that operate to reconfigure the target unit;

automatically selecting, by the at least one processor, a configuration setting included in one of the one or more interactive image elements; and executing, by the at least one processor, the configuration setting.

20. The computer program product of claim 19, further comprising storing, by the at least processor, target unit data in one or more memory devices included in the data storage device.

* * * * *